US008935302B2

(12) United States Patent
Flynn et al.

(10) Patent No.: US 8,935,302 B2
(45) Date of Patent: Jan. 13, 2015

(54) APPARATUS, SYSTEM, AND METHOD FOR DATA BLOCK USAGE INFORMATION SYNCHRONIZATION FOR A NON-VOLATILE STORAGE VOLUME

(75) Inventors: David Flynn, Sandy, UT (US); David Atkisson, Draper, UT (US); Drex Dixon, South Jordan, UT (US); Jonathan Flynn, West Jordan, UT (US); Brandon Hansen, Highland, UT (US)

(73) Assignee: Intelligent Intellectual Property Holdings 2 LLC, Wilmington, DE (US)

( * ) Notice: Subject to any disclaimer, the term of this patent is extended or adjusted under 35 U.S.C. 154(b) by 450 days.

(21) Appl. No.: 12/711,113

(22) Filed: Feb. 23, 2010

(65) Prior Publication Data

US 2010/0211737 A1 Aug. 19, 2010

Related U.S. Application Data

(63) Continuation-in-part of application No. 11/952,109, filed on Dec. 6, 2007, now Pat. No. 8,296,337, and a continuation-in-part of application No. 11/952,113, filed on Dec. 6, 2007, now Pat. No. 8,261,005.

(60) Provisional application No. 60/873,111, filed on Dec. 6, 2006, provisional application No. 60/974,470, filed on Sep. 22, 2007.

(51) Int. Cl.
*G06F 17/30* (2006.01)
*G06F 3/06* (2006.01)
(Continued)

(52) U.S. Cl.
CPC .............. *G06F 3/064* (2013.01); *G06F 3/0616* (2013.01); *G06F 3/0652* (2013.01);
(Continued)

(58) Field of Classification Search
USPC ......... 707/813, 610, 661, 674, 814, 816, 817, 707/818, 819, 820, 999.206, 999.204; 711/111; 709/227
See application file for complete search history.

(56) References Cited

U.S. PATENT DOCUMENTS 4,571,674 A 2/1986 Hartung
5,043,871 A 8/1991 Nishigaki et al.
(Continued)

FOREIGN PATENT DOCUMENTS

CN 1771495 5/2006
EP 1418502 5/2004
(Continued)

OTHER PUBLICATIONS

Wu, Michael, eNVy: A Non-Volatile, Main Memory Storage System, Oct. 1, 1994.
(Continued)

*Primary Examiner* — Syling Yen
(74) *Attorney, Agent, or Firm* — Stoel Rives LLP

(57) ABSTRACT

An apparatus, system, and method are disclosed for data block usage information synchronization for a non-volatile storage volume. The method includes referencing first data block usage information for data blocks of a non-volatile storage volume managed by a storage manager. The first data block usage information is maintained by the storage manager. The method also includes synchronizing second data block usage information managed by a storage controller with the first data block usage information maintained by the storage manager. The storage manager maintains the first data block usage information separate from second data block usage information managed by the storage controller.

37 Claims, 15 Drawing Sheets

(51) Int. Cl.
*G06F 9/52* (2006.01)
*G06F 11/10* (2006.01)
*G06F 12/02* (2006.01)
*G06F 13/28* (2006.01)
*G06F 13/40* (2006.01)
*G06F 21/78* (2013.01)
*H04L 12/403* (2006.01)
*H04L 29/08* (2006.01)

(52) U.S. Cl.
CPC ............... *G06F 3/0688* (2013.01); *G06F 9/52* (2013.01); *G06F 11/108* (2013.01); *G06F 12/0246* (2013.01); *G06F 13/28* (2013.01); *G06F 13/4022* (2013.01); *G06F 21/78* (2013.01); *H04L 12/403* (2013.01); *G06F 2211/103* (2013.01); *G06F 2212/7205* (2013.01); *G06F 2212/7208* (2013.01); *H04L 67/1097* (2013.01)
USPC .......... 707/813; 707/610; 707/661; 707/674; 707/814; 707/816; 707/817; 707/818; 707/819; 707/820; 709/227; 711/111

(56) References Cited

U.S. PATENT DOCUMENTS

| | | |
|---|---|---|
| 5,193,184 A | 3/1993 | Belsan et al. |
| 5,261,068 A | 11/1993 | Gaskins et al. |
| 5,307,497 A | 4/1994 | Feigenbaum et al. |
| 5,325,509 A | 6/1994 | Lautzenheiser |
| 5,392,427 A | 2/1995 | Barrett et al. |
| 5,404,485 A | 4/1995 | Ban |
| 5,434,994 A | 7/1995 | Shaheen et al. |
| 5,438,671 A | 8/1995 | Miles |
| 5,469,555 A | 11/1995 | Ghosh et al. |
| 5,499,354 A | 3/1996 | Aschoff et al. |
| 5,504,882 A | 4/1996 | Chai |
| 5,535,399 A | 7/1996 | Blitz et al. |
| 5,553,261 A | 9/1996 | Hasbun et al. |
| 5,586,291 A | 12/1996 | Lasker et al. |
| 5,594,883 A | 1/1997 | Pricer |
| 5,596,736 A | 1/1997 | Kerns |
| 5,598,370 A | 1/1997 | Niijima et al. |
| 5,651,133 A | 7/1997 | Burkes et al. |
| 5,680,579 A | 10/1997 | Young et al. |
| 5,682,497 A | 10/1997 | Robinson |
| 5,682,499 A | 10/1997 | Bakke et al. |
| 5,701,434 A | 12/1997 | Nakagawa |
| 5,745,792 A | 4/1998 | Jost |
| 5,754,563 A | 5/1998 | White |
| 5,754,567 A | 5/1998 | Norman |
| 5,787,486 A | 7/1998 | Chin et al. |
| 5,802,602 A | 9/1998 | Rahman et al. |
| 5,809,527 A | 9/1998 | Cooper et al. |
| 5,809,543 A | 9/1998 | Byers et al. |
| 5,845,329 A | 12/1998 | Onishi et al. |
| 5,930,815 A | 7/1999 | Estakhri et al. |
| 5,957,158 A | 9/1999 | Volz et al. |
| 5,960,462 A | 9/1999 | Solomon et al. |
| 6,000,019 A | 12/1999 | Dykstal et al. |
| 6,014,724 A | 1/2000 | Jenett |
| 6,073,232 A | 6/2000 | Kroeker et al. |
| 6,101,601 A | 8/2000 | Matthews et al. |
| 6,170,039 B1 | 1/2001 | Kishida |
| 6,170,047 B1 | 1/2001 | Dye |
| 6,173,381 B1 | 1/2001 | Dye |
| 6,185,654 B1 | 2/2001 | Van Doren |
| 6,209,088 B1 | 3/2001 | Reneris |
| 6,236,593 B1 | 5/2001 | Hong et al. |
| 6,256,642 B1 | 7/2001 | Krueger et al. |
| 6,279,069 B1 | 8/2001 | Robinson et al. |
| 6,289,413 B1 | 9/2001 | Rogers et al. |
| 6,330,688 B1 | 12/2001 | Brown |
| 6,336,174 B1 | 1/2002 | Li et al. |
| 6,356,986 B1 | 3/2002 | Solomon et al. |
| 6,370,631 B1 | 4/2002 | Dye |
| 6,385,710 B1 | 5/2002 | Goldman et al. |
| 6,404,647 B1 | 6/2002 | Minne |
| 6,412,080 B1 | 6/2002 | Fleming et al. |
| 6,418,478 B1 | 7/2002 | Ignatius et al. |
| 6,507,911 B1 | 1/2003 | Langford |
| 6,523,102 B1 | 2/2003 | Dye et al. |
| 6,564,285 B1 | 5/2003 | Mills et al. |
| 6,587,915 B1 | 7/2003 | Kim |
| 6,601,211 B1 | 7/2003 | Norman |
| 6,625,685 B1 | 9/2003 | Cho et al. |
| 6,629,112 B1 | 9/2003 | Shank |
| 6,658,438 B1 | 12/2003 | Moore et al. |
| 6,671,757 B1 | 12/2003 | Multer et al. |
| 6,715,027 B2 | 3/2004 | Kim et al. |
| 6,751,155 B2 | 6/2004 | Gorobets |
| 6,754,774 B2 | 6/2004 | Gruner et al. |
| 6,775,185 B2 | 8/2004 | Fujisawa et al. |
| 6,779,088 B1 | 8/2004 | Benveniste et al. |
| 6,785,776 B2 | 8/2004 | Arimilli et al. |
| 6,785,785 B2 | 8/2004 | Piccirillo et al. |
| 6,877,076 B1 | 4/2005 | Cho et al. |
| 6,880,049 B2 | 4/2005 | Gruner et al. |
| 6,883,069 B2 | 4/2005 | Yoshida |
| 6,883,079 B1 | 4/2005 | Priborsky |
| 6,938,133 B2 | 8/2005 | Johnson et al. |
| 6,957,158 B1 | 10/2005 | Hancock et al. |
| 6,959,369 B1 | 10/2005 | Ashton et al. |
| 6,981,070 B1 | 12/2005 | Luk et al. |
| 6,996,676 B2 | 2/2006 | Megiddo |
| 7,010,652 B2 | 3/2006 | Piccirillo et al. |
| 7,010,662 B2 | 3/2006 | Aasheim et al. |
| 7,013,376 B2 | 3/2006 | Hooper, III |
| 7,013,379 B1 | 3/2006 | Testardi |
| 7,035,974 B2 | 4/2006 | Shang |
| 7,043,599 B1 | 5/2006 | Ware et al. |
| 7,047,366 B1 | 5/2006 | Ezra |
| 7,050,337 B2 | 5/2006 | Iwase et al. |
| 7,058,769 B1 | 6/2006 | Danilak |
| 7,076,599 B2 | 7/2006 | Aasheim et al. |
| 7,082,495 B2 | 7/2006 | DeWhitt |
| 7,082,512 B2 | 7/2006 | Aasheim et al. |
| 7,085,879 B2 | 8/2006 | Aasheim et al. |
| 7,089,391 B2 | 8/2006 | Geiger et al. |
| 7,093,101 B2 | 8/2006 | Aasheim et al. |
| 7,096,321 B2 | 8/2006 | Modha |
| 7,130,956 B2 | 10/2006 | Rao |
| 7,130,957 B2 | 10/2006 | Rao |
| 7,167,953 B2 | 1/2007 | Megiddo |
| 7,171,536 B2 | 1/2007 | Chang et al. |
| 7,173,852 B2 | 2/2007 | Gorobets et al. |
| 7,181,572 B2 | 2/2007 | Walmsley |
| 7,194,577 B2 | 3/2007 | Johnson et al. |
| 7,194,740 B1 | 3/2007 | Frank et al. |
| 7,203,815 B2 | 4/2007 | Haswell |
| 7,215,580 B2 | 5/2007 | Gorobets |
| 7,219,238 B2 | 5/2007 | Saito et al. |
| 7,243,203 B2 | 7/2007 | Scheuerlein |
| 7,246,179 B2 | 7/2007 | Camara |
| 7,254,686 B2 | 8/2007 | Islam |
| 7,260,820 B1 | 8/2007 | Waldspurger et al. |
| 7,275,135 B2 | 9/2007 | Coulson |
| 7,280,536 B2 | 10/2007 | Testardi |
| 7,305,520 B2 | 12/2007 | Voigt |
| 7,340,558 B2 | 3/2008 | Lee et al. |
| 7,340,566 B2 | 3/2008 | Voth |
| 7,356,651 B2 | 4/2008 | Liu et al. |
| 7,360,015 B2 | 4/2008 | Matthews et al. |
| 7,366,808 B2 | 4/2008 | Kano et al. |
| 7,395,384 B2 | 7/2008 | Sinclair |
| 7,398,348 B2 | 7/2008 | Moore et al. |
| 7,437,510 B2 | 10/2008 | Rosenbluth et al. |
| 7,447,847 B2 | 11/2008 | Louie et al. |
| 7,450,420 B2 | 11/2008 | Sinclair et al. |
| 7,464,221 B2 | 12/2008 | Nakamura et al. |
| 7,487,235 B2 | 2/2009 | Andrews et al. |
| 7,487,320 B2 | 2/2009 | Bansal |
| 7,516,267 B2 | 4/2009 | Coulson et al. |

(56) References Cited

U.S. PATENT DOCUMENTS

| | | |
|---|---|---|
| 7,526,614 B2 | 4/2009 | van Riel |
| 7,529,905 B2 | 5/2009 | Sinclair |
| 7,536,491 B2 | 5/2009 | Kano et al. |
| 7,552,271 B2 | 6/2009 | Sinclair |
| 7,580,287 B2 | 8/2009 | Aritome |
| 7,603,532 B2 | 10/2009 | Rajan et al. |
| 7,610,348 B2 | 10/2009 | Kisley et al. |
| 7,620,773 B2 | 11/2009 | Nicholson et al. |
| 7,640,390 B2 | 12/2009 | Iwamura et al. |
| 7,644,239 B2 | 1/2010 | Ergan et al. |
| 7,660,911 B2 | 2/2010 | McDaniel |
| 7,660,941 B2 | 2/2010 | Lee et al. |
| 7,664,239 B2 | 2/2010 | Groff et al. |
| 7,669,019 B2 | 2/2010 | Fujibayashi et al. |
| 7,676,628 B1 | 3/2010 | Compton et al. |
| 7,702,873 B2 | 4/2010 | Greiss et al. |
| 7,721,059 B2 | 5/2010 | Mylly et al. |
| 7,725,628 B1 | 5/2010 | Phan |
| 7,831,783 B2 | 11/2010 | Pandit et al. |
| 7,873,782 B2 | 1/2011 | Terry et al. |
| 7,873,803 B2 | 1/2011 | Cheng |
| 7,904,647 B2 | 3/2011 | El-Batal et al. |
| 7,913,051 B1 | 3/2011 | Todd et al. |
| 7,917,803 B2 | 3/2011 | Stefanus et al. |
| 7,984,230 B2 | 7/2011 | Nasu et al. |
| 8,214,583 B2 | 7/2012 | Sinclair |
| 2002/0069318 A1 | 6/2002 | Chow et al. |
| 2002/0103819 A1* | 8/2002 | Duvillier et al. ............... 707/206 |
| 2002/0161855 A1 | 10/2002 | Manczak et al. |
| 2002/0181134 A1 | 12/2002 | Bunker et al. |
| 2003/0061296 A1 | 3/2003 | Craddock |
| 2003/0140051 A1 | 7/2003 | Fujiwara et al. |
| 2003/0145230 A1 | 7/2003 | Chiu et al. |
| 2003/0149753 A1 | 8/2003 | Lamb |
| 2003/0163630 A1 | 8/2003 | Aasheim et al. |
| 2003/0198084 A1 | 10/2003 | Fujisawa et al. |
| 2004/0003002 A1 | 1/2004 | Adelmann |
| 2004/0093463 A1 | 5/2004 | Shang |
| 2004/0117586 A1* | 6/2004 | Estakhri et al. ............... 711/203 |
| 2004/0148360 A1 | 7/2004 | Mehra et al. |
| 2004/0186946 A1 | 9/2004 | Lee |
| 2004/0205177 A1 | 10/2004 | Levy et al. |
| 2004/0268359 A1 | 12/2004 | Hanes |
| 2005/0002263 A1 | 1/2005 | Iwase et al. |
| 2005/0015539 A1 | 1/2005 | Horii et al. |
| 2005/0027951 A1 | 2/2005 | Piccirillo et al. |
| 2005/0120177 A1 | 6/2005 | Black |
| 2005/0141313 A1 | 6/2005 | Gorobets et al. |
| 2005/0177672 A1 | 8/2005 | Rao |
| 2005/0177687 A1 | 8/2005 | Rao |
| 2005/0193166 A1 | 9/2005 | Johnson et al. |
| 2005/0216653 A1 | 9/2005 | Aasheim et al. |
| 2005/0240713 A1 | 10/2005 | Wu |
| 2005/0246510 A1 | 11/2005 | Retnamma et al. |
| 2005/0257017 A1 | 11/2005 | Yagi |
| 2005/0273476 A1 | 12/2005 | Wertheimer et al. |
| 2006/0004955 A1 | 1/2006 | Ware et al. |
| 2006/0020744 A1 | 1/2006 | Sinclair et al. |
| 2006/0020745 A1 | 1/2006 | Conley et al. |
| 2006/0026339 A1 | 2/2006 | Rostampour |
| 2006/0026385 A1 | 2/2006 | Dinechin et al. |
| 2006/0059326 A1 | 3/2006 | Aasheim |
| 2006/0075057 A1 | 4/2006 | Gildea |
| 2006/0085626 A1 | 4/2006 | Roberson et al. |
| 2006/0129778 A1 | 6/2006 | Clark et al. |
| 2006/0136657 A1 | 6/2006 | Rudelic et al. |
| 2006/0136685 A1 | 6/2006 | Griv et al. |
| 2006/0143396 A1 | 6/2006 | Cabot |
| 2006/0149893 A1 | 7/2006 | Barfuss et al. |
| 2006/0179263 A1 | 8/2006 | Song et al. |
| 2006/0184722 A1 | 8/2006 | Sinclair |
| 2006/0190552 A1 | 8/2006 | Henze et al. |
| 2006/0224849 A1 | 10/2006 | Islam et al. |
| 2006/0236061 A1 | 10/2006 | Koclanes |
| 2006/0248387 A1 | 11/2006 | Nicholson |
| 2006/0265636 A1 | 11/2006 | Hummler |
| 2006/0271740 A1 | 11/2006 | Mark et al. |
| 2007/0005928 A1 | 1/2007 | Trika et al. |
| 2007/0016699 A1 | 1/2007 | Minami |
| 2007/0016754 A1 | 1/2007 | Testardi |
| 2007/0033325 A1 | 2/2007 | Sinclair |
| 2007/0033326 A1 | 2/2007 | Sinclair |
| 2007/0033327 A1 | 2/2007 | Sinclair |
| 2007/0033362 A1 | 2/2007 | Sinclair |
| 2007/0043900 A1 | 2/2007 | Yun |
| 2007/0050548 A1 | 3/2007 | Bali et al. |
| 2007/0050571 A1 | 3/2007 | Nakamura |
| 2007/0061508 A1* | 3/2007 | Zweighaft ............... 711/111 |
| 2007/0088666 A1 | 4/2007 | Saito |
| 2007/0118676 A1 | 5/2007 | Kano et al. |
| 2007/0118713 A1 | 5/2007 | Guterman et al. |
| 2007/0124540 A1 | 5/2007 | van Riel |
| 2007/0136555 A1 | 6/2007 | Sinclair |
| 2007/0143532 A1 | 6/2007 | Gorobets et al. |
| 2007/0143560 A1 | 6/2007 | Gorobets |
| 2007/0143566 A1 | 6/2007 | Gorobets |
| 2007/0143567 A1 | 6/2007 | Gorobets |
| 2007/0150689 A1 | 6/2007 | Pandit et al. |
| 2007/0156998 A1 | 7/2007 | Gorobets |
| 2007/0168698 A1 | 7/2007 | Coulson et al. |
| 2007/0198770 A1 | 8/2007 | Horii et al. |
| 2007/0204128 A1 | 8/2007 | Lee et al. |
| 2007/0208790 A1 | 9/2007 | Reuter et al. |
| 2007/0233937 A1 | 10/2007 | Coulson |
| 2007/0260608 A1 | 11/2007 | Hertzberg et al. |
| 2007/0261030 A1* | 11/2007 | Wadhwa ............... 717/127 |
| 2007/0263514 A1 | 11/2007 | Iwata et al. |
| 2007/0266037 A1 | 11/2007 | Terry et al. |
| 2007/0274150 A1 | 11/2007 | Gorobets |
| 2007/0300008 A1 | 12/2007 | Rogers |
| 2008/0010395 A1 | 1/2008 | Mylly et al. |
| 2008/0052377 A1 | 2/2008 | Light |
| 2008/0052477 A1 | 2/2008 | Lee et al. |
| 2008/0091876 A1 | 4/2008 | Fujibayashi et al. |
| 2008/0109090 A1 | 5/2008 | Esmaili et al. |
| 2008/0120469 A1 | 5/2008 | Kornegay |
| 2008/0126507 A1 | 5/2008 | Wilkinson |
| 2008/0126700 A1 | 5/2008 | El-Batal et al. |
| 2008/0140737 A1 | 6/2008 | Garst et al. |
| 2008/0229045 A1 | 9/2008 | Qi |
| 2008/0235443 A1 | 9/2008 | Chow et al. |
| 2008/0243966 A1 | 10/2008 | Croisettier et al. |
| 2008/0263259 A1 | 10/2008 | Sadovsky et al. |
| 2008/0263305 A1 | 10/2008 | Shu et al. |
| 2008/0263569 A1 | 10/2008 | Shu et al. |
| 2009/0043952 A1* | 2/2009 | Estakhri et al. ............... 711/103 |
| 2009/0070526 A1 | 3/2009 | Tetrick |
| 2009/0083485 A1 | 3/2009 | Cheng |
| 2009/0125700 A1 | 5/2009 | Kisel |
| 2009/0150599 A1 | 6/2009 | Bennett |
| 2009/0150641 A1 | 6/2009 | Flynn et al. |
| 2009/0248763 A1 | 10/2009 | Rajan |
| 2009/0276588 A1 | 11/2009 | Murase |
| 2009/0287887 A1 | 11/2009 | Matsuki et al. |
| 2009/0292861 A1 | 11/2009 | Kanevsky et al. |
| 2009/0307424 A1 | 12/2009 | Galloway et al. |
| 2010/0005228 A1 | 1/2010 | Fukutomi et al. |
| 2010/0076936 A1* | 3/2010 | Rajan ............... 707/677 |
| 2010/0095059 A1 | 4/2010 | Kisley et al. |
| 2010/0169542 A1 | 7/2010 | Sinclair |
| 2010/0205231 A1* | 8/2010 | Cousins ............... 707/823 |
| 2010/0205331 A1 | 8/2010 | Phan et al. |
| 2010/0235597 A1 | 9/2010 | Arakawa |
| 2010/0262738 A1 | 10/2010 | Swing et al. |
| 2010/0262740 A1 | 10/2010 | Borchers et al. |
| 2010/0262757 A1 | 10/2010 | Sprinkle et al. |
| 2010/0262758 A1 | 10/2010 | Swing et al. |
| 2010/0262759 A1 | 10/2010 | Borchers et al. |
| 2010/0262760 A1 | 10/2010 | Swing et al. |
| 2010/0262761 A1 | 10/2010 | Borchers et al. |
| 2010/0262762 A1 | 10/2010 | Borchers et al. |
| 2010/0262766 A1 | 10/2010 | Sprinkle et al. |
| 2010/0262767 A1 | 10/2010 | Borchers et al. |
| 2010/0262773 A1 | 10/2010 | Borchers et al. |

(56) References Cited

U.S. PATENT DOCUMENTS

| | | | |
|---|---|---|---|
| 2010/0262894 | A1 | 10/2010 | Swing et al. |
| 2010/0262979 | A1 | 10/2010 | Borchers et al. |
| 2011/0022819 | A1 | 1/2011 | Post et al. |

FOREIGN PATENT DOCUMENTS

| | | |
|---|---|---|
| EP | 1814039 | 3/2009 |
| GB | 0123416.0 | 9/2001 |
| JP | 424848 | 8/1992 |
| JP | 8153014 | 6/1996 |
| JP | 200259525 | 9/2000 |
| JP | 2009122850 | 6/2009 |
| WO | WO94/19746 | 9/1994 |
| WO | WO95/18407 | 7/1995 |
| WO | WO96/12225 | 4/1996 |
| WO | 0201365 | 1/2002 |
| WO | WO2004099989 | 11/2004 |
| WO | 2005103878 A2 | 11/2005 |
| WO | 2006062511 A1 | 6/2006 |
| WO | 2006065626 A1 | 6/2006 |
| WO | WO2008130799 | 10/2008 |

OTHER PUBLICATIONS

PCT/US2007/086691, International Search Report and Written Opinion, May 8, 2008.
PCT/US2007/086691, International Preliminary Report on Patentability, Feb. 16, 2009.
PCT/US2007/086701, International Search Report and Written Opinion, Jun. 5, 2008.
PCT/US2007/086701, International Preliminary Report on Patentability, Mar. 16, 2009.
2380.2.6 Final Office Action, U.S. Appl. No. 11/952,109, Nov. 29, 2011.
2380.2.7CN, Second Office Action, CN Application No. 200780051020.X Jul. 6, 2011.
Actel fusion FPGAs supporting Intelligent Peripheral Management Interface (IPMI) Applications, Oct. 1, 2006.
P200905PCT, PCT/US2011/025885, International Search Report and Written Opinion, Sep. 28, 2011.
ASPMC_660, Asine Group, http://www.asinegroup.com/products/aspmc660.html, copyright 2002, downloaded on Nov. 18, 2009.
BiTMICRO Introduces E-Disk PMC Flash Disk Module at Military & Aerospace Electronics East, May 18, 2004, BiTMICRO, http://www.bitmicro.com/press_news_releases_20040518_prt.php.
NAND Flash 101: An Introduction to NAND Flash and How to Design It in to Your Next Product, Micron, pp. 1-28, Micron Technology Nov. 2006.
Data Management Software (DMS) for AMD Simultaneous Read/Write Flash Memory Devices, Spansion, Jul. 2003.
Garfinkel, One Big File Is Not Enough: A Critical Evaluation of the Dominant Free-Space Sanitization Technique, Jun. 2006, pp. 135-151.
ELNEC, NAND Flash Memories and Programming NAND Flash Memories Using ELNEC Device Programmers, Application Note, Mar. 2007, pp. 1-32.
PCT/US2008059048, International Search Report and Written Opinion, Aug. 25, 2008.
PCT/US2007/086691, 2380.2.6pct, International Search Report and Written Opinion, Aug. 5, 2008.
PCT/US2007/086691, 2380.2.6pct, International Preliminary Report on Patentability, Feb. 16, 2009.
PCT/US2007/086701, 2380.2.7pct, International Search Report and Written Opinion, Jun. 5, 2008.
PCT/US2007/086701, 2380.2.7pct, International Preliminary Report on Patentability, Mar. 16, 2009.
P. Gutmann, Secure Deletion of Data from Magnetic and Solid-State Memory, Proceedings of the Sixth USENIX Security Symposium, Jul. 1996, 14 pages, XP-002190890, San Jose, California.
2380.2.7 Office Action, U.S. Appl. No. 11/952,112, Dec. 15, 2010.
2380.2.6CN Office Action, CN Application No. 200780050970.0, Oct. 28, 2010.
2380.2.7EP Office Action, EP Application No. 07865345.8, Nov. 17, 2010.
2380.2.7CN Office Action, CN Application No. 200780051020.X, Nov. 11, 2010.
Ari, Gottwals, Henze, "Performance Boosting and Workload Isolation in Storage Area Networks with SANcache", Hewlett Packard Laboratories, Proceedings of the 23rd IEEE/ 14th NASA Goddard Conference on Mass Storage Systems Technologies (MSST 2006), May 2006, pp. 263-273.
Plank, James S, "A Tutorial on Reed-Solomon coding for Fault Tolerance in RAID-like Systems", Dept. of computer Science, Univ. of Tennessee, Sep. 1997, pp. 995-1012.
Morgenstern, David, "Is there a Flash Memory RAID in your Future?", Nov. 2006.
"File System Primer", http://wiki.novell.com/index.php/File_System_Primer, Jul. 2006.
"Method for fault tolerance in nonvolatile storage", Ip.com, IPCOM000042269D, Feb. 2005.
Dan, Singer, Implementing MLC NAND Flash for Cost-Effective, High-Capacity Memory, M-systems White paper, Sep. 2003.
Introduction to Samsungs Linux Flash File System—RFS, Samsung Electronics, Nov. 2006.
Mesnier, Ganger, Riedel, "Object-Based Storage", IEEE Comm Magazine, Aug. 2003.
Hensbergen, "Dynamic Policy Disk Caching for Storage Networking", Nov. 2006.
WIPO, International Search Report and Written Opinion for PCT/US2011/65927, mailed Aug. 28, 2012.
State Intellectual Property Office, Office Action, CN Application No. 200780050983.8, issued May 18, 2011.
State Intellectual Property Office, Third Office Action, CN Application No. 200780050970.0, issued Jan. 5, 2012.
United States Patent Office, Office Action, U.S. Appl. No. 11/952,113, Mar. 6, 2012.
State Intellectual Property Office, Third Office Action, CN Application No. 200780051020.X, issued Nov. 7, 2011.
United States Patent Office, Office Action, U.S. Appl. No. 11/952,109, mailed May 1, 2012.
European Patent Office, Office Action, EP Application No. 07865345.8, issued Nov. 17, 2010.
European Patent Office, Office Action, EP Application No. 07865345.8, issued Jan. 3, 2012.
Kawaguchi, "A Flash-Memory Based File System", Advanced Research Laboratory, Hitachi, Ltd. (1995).
Gal, "A Transactional Flash File System for Microcontrollers," 2005 USENIX Annual Technical Conference.
WIPO, PCT/US2007/025048, International Preliminary Report on Patentability, mailed Jun. 10, 2009.
WIPO, PCT/US2007/025048, International Search Report and Written Opinion, mailed May 27, 2008.
WIPO, PCT/US2008/059048, International Preliminary Report on Patentability, mailed Jun. 10, 2009.
WIPO, PCT/US2007/086687, International Preliminary Report on Patentability, issued Mar. 18, 2009.
WIPO, PCT/US2007/086687, International Search Report and Written Opinion, mailed Sep. 5, 2008.
WIPO, PCT/US2007/086688, International Preliminary Report on Patentability, issued Mar. 16, 2009.
Sears, "Stasis: Flexible Transactional Storage," OSDI '06: 7th USENIX Symposium on Operating Systems Design and Implementation, published Nov. 6, 2006.
Rosenblum, "The Design and Implementation of a Log-Structured File System," 1992.
Seltzer, "Transaction Support in a Log-Structured File System", Harvard University Division of Applied Sciences, published Jan. 1, 1993 (Chapter 5, pp. 52-69).
Seltzer, "Transaction Support in Read Optimized and Write Optimized File Systems", Proceedings of the 16th VLDB Conference, Brisbane, Australia, published Jan. 1, 1990.
Seltzer, "File System Performance and Transaction Support", University of California at Berkeley, published Jan. 1, 1992.

(56) References Cited

OTHER PUBLICATIONS

Barrall et al., U.S. Appl. No. 60/625,495, "Dynamically Expandable and Contractible Fault-Tolerant Storage System Permitting Variously Sized Storage Devices and Method," filed Nov. 5, 2004.
Barrall et al., U.S. Appl. No. 60/718,768, "Dynamically Adaptable Fault-Tolerant Storage System," filed Sep. 20, 2005.
Terry et al., U.S. Appl. No. 60/797,127, "Filesystem-aware Block Storage System, Apparatus, and Method," filed May 3, 2006.
Tal, "NAND vs. NOR Flash Technology", M-Systems, published Feb. 1, 2002.
Ranaweera, 05-270RO, SAT: Write Same (10) command (41h), T10/05, Jul. 7, 2005, www.t10.org/ftp/t10/document.05/05-270r0.pdf, last visited Apr. 11, 2013.
WIPO, International Preliminary Report on Patentability for PCT/US2010/048325, mailed Mar. 13, 2012.
WIPO, International Search Report and Written Opinion for PCT/US2010/048325, Jun. 13, 2011.
Dan, "Implementing MLC NAND Flash for Cost-Effective, High-Capacity Memory," M-Systems, White Paper, 91-SR-014-02-8L, Rev 1.1, Sep. 2003.
USPTO, Office Action for U.S. Appl. No. 12/986,117, mailed Apr. 4, 2013.
United States Patent and Trademark Office, Office Action for U.S. Appl. No. 12/879,004, mailed Feb. 25, 2013.
Microsoft, Data Set Management Commands Proposal for ATA8-ACS2, published Oct. 5, 2007, Rev. 3.
Brandon, Jr., "Sparse Matrices in CS Education," Journal of Computing Sciences in Colleges, vol. 24 Issue 5, May 2009, pp. 93-98.
Huffman, "Non-Volatile Memory Host Controller Interface," Apr. 14, 2008, 65 pgs.
Johnson, "An Introduction to Block Device Drivers," Jan. 1, 1995.
USPTO, Office Action for U.S. Appl. No. 13/607,486 mailed Jan. 10, 2013.
USPTO, Office Action for U.S. Appl. No. 13/607,486 mailed May 2, 2013.
USPTO, Notice of Allowance for U.S. Appl. No. 12/986,117 Mailed Jun. 5, 2013.
USPTO, Office Action for U.S. Appl. No. 12/986,117, mailed Jun. 25, 2013.
WIPO, International Search Report and Written Opinion for PCT/US2007/86691, mailed Feb. 16, 2006.
WIPO, International Preliminary Report of Patentability for PCT/US2007/086691, mailed Feb. 16, 2009.
WIPO, International Search Report and Written Opinion for PCT/US2012/029722, mailed Oct. 30, 2012.
Wright, "Extending ACID Semantics to the File System", ACM Transactions on Storage, vol. 3, No. 2, published May 1, 2011, pp. 1-40.

* cited by examiner

APPARATUS, SYSTEM, AND METHOD FOR DATA BLOCK USAGE INFORMATION SYNCHRONIZATION FOR A NON-VOLATILE STORAGE VOLUME

CROSS-REFERENCES TO RELATED APPLICATIONS

This application is a continuation-in-part of and claims priority to U.S. patent application Ser. No. 11/952,109 entitled "APPARATUS, SYSTEM, AND METHOD FOR MANAGING DATA FROM A REQUESTING DEVICE WITH AN EMPTY DATA TOKEN DIRECTIVE" filed on Dec. 6, 2007 for David Flynn, et al. and U.S. patent application Ser. No. 11/952,113 entitled "APPARATUS, SYSTEM, AND METHOD FOR MANAGING DATA IN A STORAGE DEVICE WITH AN EMPTY DATA TOKEN DIRECTIVE" filed on Dec. 6, 2007 for David Flynn, et al., which are incorporated herein by reference and which claim the benefit of U.S. Provisional Patent Application No. 60/873,111 entitled "Elemental Blade System" and filed on Dec. 6, 2006 for David Flynn, et al. and U.S. Provisional Patent Application No. 60/974,470 entitled "Apparatus, System, and Method for Object-Oriented Solid-State Storage" and filed on Sep. 22, 2007 for David Flynn, et al., which are incorporated herein by reference.

FIELD OF THE INVENTION

This invention relates to block storage on a non-volatile storage volume and more particularly relates to data block usage information synchronization for a non-volatile storage volume.

BACKGROUND

Description of the Related Art

Many conventional storage devices treat storage block addresses received from a storage client as logical block addresses having a one-to-one direct mapping to a corresponding physical addresses on a storage media where data is actually stored. For storage devices that maintain a mapping from a logical block address to an arbitrary physical address, conventional storage clients (operating systems, file systems, volume mangers, and the like) have begun to communicate when data on physical media corresponding to a logical block address no longer needs to be retained. This unused data block usage information enables deallocation of the corresponding physical blocks, and/or stops preserving the data in the corresponding physical blocks. As a result, data on the storage device corresponding to logical blocks that are not in use by a storage client, is no longer unnecessarily preserved by the storage device. Without this capability, unused data blocks must be preserved by the storage device as used data blocks, which slows performance and requires additional unnecessary overhead to maintain.

However, certain storage clients are not designed to communicate unused data block usage information. Additionally, certain storage clients that have the ability to communicate unused data block usage information do so ineffectively or lack the ability to communicate unused data block usage information for certain storage configurations. In addition, in certain storage configurations, even though the unused block usage information is communicated, the information is not passed on to the storage device.

SUMMARY

The present invention has been developed in response to the present state of the art, and in particular, in response to the problems and needs in the art that have not yet been fully solved by currently available storage systems. Accordingly, the present invention has been developed to provide an apparatus, system, and method for data block usage information synchronization for a non-volatile storage volume that overcome many or all of the above-discussed shortcomings in the art.

The method for data block usage information synchronization for a non-volatile storage volume includes referencing first data block usage information for data blocks of a non-volatile storage volume managed by a storage manager. The first data block usage information is maintained by the storage manager. The method also includes synchronizing second data block usage information managed by a storage controller with the first data block usage information maintained by the storage manager. The storage manager maintains the first data block usage information separate from second data block usage information managed by the storage controller.

In one embodiment, the method includes determining one or more unused blocks from the first data block usage information and sending a message directly to the storage controller directly managing the non-volatile storage volume. The message indicates to the storage controller unused blocks identified by the storage manager. The storage controller deallocates the unused blocks identified by the storage manager in response to the message. In one embodiment, synchronizing second data block usage information further includes deallocating blocks identified by the storage controller as in use (or used) corresponding to one or more unused blocks identified by the storage manager based on the first data block usage information.

In certain embodiments, synchronizing second data block usage information further includes determining that the storage controller identifies one or more unused blocks indicated by the first data block usage information as used blocks and deallocating the used blocks identified by the storage controller corresponding to the one or more unused blocks. In one embodiment, the method includes updating the first data block usage information based on storage operations that modify the first data block usage information. The storage operations are executed by the storage controller subsequent to referencing the first data block usage information and executed by the storage controller prior to synchronizing the second data block usage information.

In one embodiment, referencing the first data block usage information further includes referencing the first data block usage information by way of a storage Application Programming Interface ("API") of the storage manager. In one embodiment, the non-volatile storage volume includes a live volume actively servicing storage requests.

In one embodiment, the storage controller includes a redundant array of independent drives ("RAID") controller storing data in a RAID configuration on two or more storage devices. In this embodiment, synchronizing second data block usage information synchronizes second data block usage information managed for the two or more storage devices with the first data block usage information. The two or more storage devices are managed by the RAID controller. In one embodiment, the method further includes determining a RAID configuration of the RAID controller and synchronizing second data block usage information managed for the two or more storage devices with the first data block usage information based on the determined RAID configuration.

In one embodiment, the RAID controller manages one or more sub-controllers, each sub-controller storing data on one or more of the two or more storage devices. In certain embodiments, the RAID configuration includes a RAID 0 configuration that stores data as a stripe across the two or more storage devices. In this embodiment, synchronizing second data block usage information includes identifying a first portion of the first data block usage information corresponding to data blocks stored on a first storage device. The method also includes identifying a second portion of the first data block usage information corresponding to data blocks stored on a second storage device. The method also includes synchronizing second data block usage information managed for the first storage device with the first portion of the first data block usage information. The method also includes synchronizing second data block usage information managed for the second storage device with the second portion of the first data block usage information.

In one embodiment, the RAID configuration includes a RAID 1 configuration that mirrors data stored on a first storage device to a second storage device. In this embodiment, synchronizing second data block usage information includes synchronizing second data block usage information managed for the first storage device with the first data block usage information. The method also includes synchronizing the second data block usage information managed for the second storage device with the first data block usage information.

In one embodiment, the RAID configuration includes a RAID 5 configuration that stores data as a stripe across three or more storage devices. The stripe includes two or more data strides and a distributed parity data stride. Each data stride is stored on a storage device and each data stride includes one or more data blocks. In this embodiment, synchronizing second data block usage information includes determining that each data stride in the stripe comprises no used blocks based on the first data block usage information. The method also includes synchronizing second data block usage information managed by the RAID controller for the stripe by designating data blocks of the second data block usage information corresponding to the stripe as unused.

In one embodiment, the RAID configuration includes a RAID 10 configuration that mirrors a stride of data between two or more storage devices using a RAID 1 configuration and that stores stripes of data across two or more storage device sets using a RAID 0 configuration. In this embodiment, synchronizing second data block usage information includes identifying a first portion of the first data block usage information corresponding to data blocks stored in a first stride managed by the RAID controller. The method also includes identifying a second portion of the first data block usage information corresponding to data blocks stored in a second stride managed by the RAID controller. The method also includes synchronizing second data block usage information managed for the first stride with the first portion of the first data block usage information. The method also includes synchronizing second data block usage information managed for the second stride with the second portion of the first data block usage information.

A computer program product is also provided for data management on non-volatile storage media managed by a storage manager. The computer program product includes referencing a block map defining data block usage information for data blocks of non-volatile storage media managed by a storage manager. The block map is maintained by the storage manager. The computer program product also includes sending a message directly to a storage controller managing the non-volatile storage media. The message identifies to the storage controller one or more unused blocks identified by the block map. In one embodiment, the computer program product includes determining one or more unused blocks from the block map.

In one embodiment, the computer program product includes deallocating used blocks identified by the storage controller corresponding to the one or more unused blocks identified by the storage manager in response to the message. In certain embodiments, the computer program product includes determining that the storage controller identifies the one or more unused blocks as used blocks and the computer program product deallocates the used blocks identified by the storage controller corresponding to the one or more unused blocks in response to the message.

In one embodiment, determining one or more unused blocks from the block map includes monitoring storage operations on data blocks represented by the block map. The storage operations are executed by the storage controller subsequent to referencing the block map and executed by the storage controller prior to deallocating the one or more unused blocks in response to the message. In this embodiment, determining one or more unused blocks from the block map includes recording data block usage information for the storage operations that change unused blocks of the block map to used blocks. In a further embodiment, recording data block usage information for the storage operations further includes recording the data block usage information in an in-flight block map. In this embodiment, the computer program product includes combining the block map and the in-flight block map to identify the one or more unused blocks of the data blocks.

In one embodiment, the computer program product includes obtaining a lock on a logical-to-physical map managed by the storage controller prior to determining one or more unused blocks from the block map and releasing the lock on the logical-to-physical map subsequent to the storage controller deallocating the unused blocks. The storage controller stores data on the non-volatile storage media using an append-only writing process and recovers storage space on the non-volatile storage media using a storage space recovery process that re-uses non-volatile storage media storing blocks that have become unused blocks.

In one embodiment, the message complies with an interface operable to communicate storage information between the storage manager and the storage controller. The message includes a notification passing the unused blocks identified by the storage manager to the storage controller. The notification includes no requirement for action by the storage controller in accordance with the interface. In certain embodiments, the message complies with an interface operable to communicate storage information between the storage manager and the storage controller and includes a directive passing the unused blocks identified by the storage manager to the storage controller. The directive requires the storage controller to erase the non-volatile storage media comprising the unused blocks in accordance with the interface.

In one embodiment, the message complies with an interface operable to communicate storage information between the storage manager and the storage controller and the message includes a purge instruction passing the unused blocks identified by the storage manager to the storage controller. The purge instruction requires the storage controller to erase the non-volatile storage media comprising the unused blocks and to overwrite the unused blocks in accordance with the interface.

In one embodiment, the storage controller includes a redundant array of independent drives ("RAID") controller storing data in a RAID configuration on two or more storage devices managed by the RAID controller. In certain embodiments, sending a message to the storage controller includes sending one or more messages communicating the unused blocks identified by the storage manager to one or more sub-controllers.

In one embodiment, the RAID configuration includes a RAID 0 configuration that stores data as a stripe across the two or more storage devices. In this embodiment, the computer program product further includes identifying a first portion of the block map corresponding to data blocks stored on a first storage device managed by the RAID controller. The computer program product also includes identifying a second portion of the block map corresponding to data blocks stored on a second storage device managed by the RAID controller. Sending a message to the storage controller includes sending a first message to the RAID controller. The first message identifies one or more unused blocks on the first storage device identified by the first portion of the block map. Sending a message also includes sending a second message to the RAID controller. The second message identifies one or more unused blocks on the second storage device identified by the second portion of the block map.

In one embodiment, the RAID configuration includes a RAID 1 configuration that mirrors data stored on a first storage device to a second storage device. Sending a message to the storage controller includes sending a first message to the RAID controller managing the first storage device. The first message identifies one or more unused blocks on the first storage device identified by the block map. Sending a message to the storage controller also includes sending a second message to the RAID controller managing the second storage device. The second message identifies one or more unused blocks on the second storage device identified by the block map.

In one embodiment, the RAID configuration includes a RAID 5 configuration that stores data as a stripe across three or more storage devices. The stripe includes two or more data strides and a distributed parity data stride. Each data stride is stored on a storage device and each data stride includes one or more data blocks. In this embodiment, the computer program product further includes determining that each data stride in the stripe comprises no used blocks based on the block map. Sending a message to the storage controller includes sending a message to the RAID controller. The message designates data blocks corresponding to the stripe as unused.

In one embodiment, the RAID configuration includes a RAID 10 configuration that that mirrors a stride of data between two or more storage devices using a RAID 1 configuration and that stores stripes of data across two or more storage device sets using a RAID 0 configuration. In this embodiment, the computer program product further includes identifying a first portion of the block map corresponding to data blocks stored in a first stride managed by the RAID controller. The computer program product may also include identifying a second portion of the block map corresponding to data blocks stored in a second stride managed by the RAID controller. Sending a message to the storage controller includes sending a first message to the RAID controller managing the first stride. The message identifies one or more unused blocks in the first stride identified by the first portion of the block map. Sending a message to the storage controller also includes sending a second message to the RAID controller managing the second stride. The second message identifies one or more unused blocks in the second stride identified by the second portion of the block map.

A system and method are also presented for data block usage information synchronization for a non-volatile storage volume managed by a storage manager that includes the necessary components and steps to execute the functions described above in relation to the computer program product. In addition, the system includes a block usage synchronizer that, in one embodiment, is initiated in response to one or more predetermined events. In certain embodiments, the block usage synchronizer is initiated at a predetermined time interval.

Furthermore, the method includes calling a function of a storage Application Programming Interface ("API") to reference a block map defining data block usage information for a set of data blocks of a non-volatile storage volume, such as a flash storage volume. The block map is maintained by a storage manager. The non-volatile storage volume is exclusively managed by a storage controller configured to use a logical-to-physical address translation layer that translates logical block addresses received from a storage client to physical block addresses on the non-volatile storage volume. In one embodiment, the non-volatile storage volume includes one or more non-volatile storage media. In certain embodiments, the storage API includes a defragmentation API for block-oriented storage devices.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
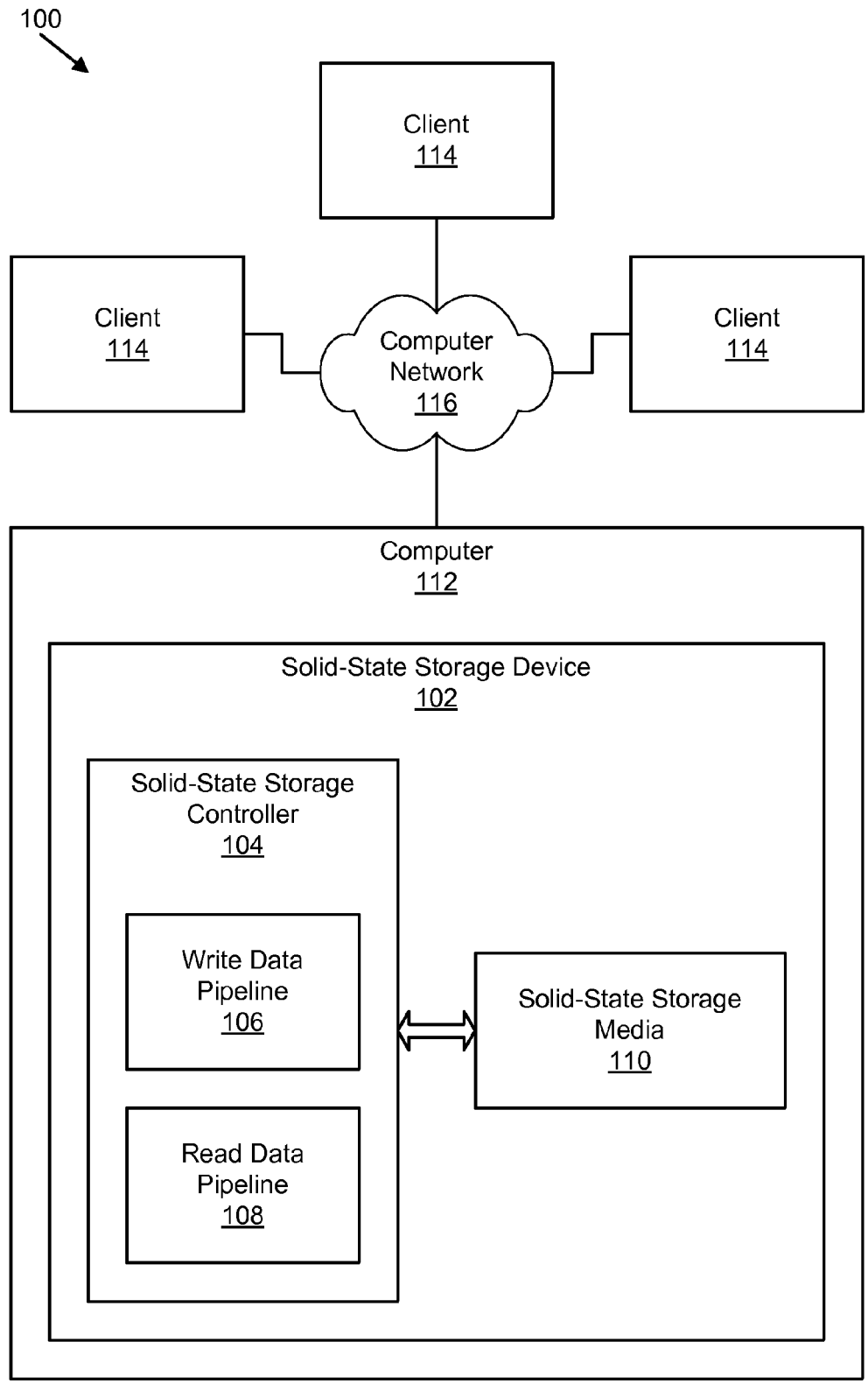
FIG. 1 is a schematic block diagram illustrating one embodiment of a system for data block usage information synchronization for a non-volatile storage volume in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable media.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer readable medium may take any form capable of storing machine-readable instructions on a digital processing apparatus memory device. A computer readable medium may be embodied by a compact disk, digital-video disk, a magnetic tape, a Bernoulli drive, a magnetic disk, a punch card, flash memory (NAND or NOR), other types of solid-state memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Solid-State Storage System

FIG. 1 is a schematic block diagram illustrating one embodiment of a system 100 for improving performance in a solid-state storage device in accordance with the present invention. The system 100 includes a solid-state storage device 102, a solid-state storage controller 104, a write data pipeline 106, a read data pipeline 108, a solid-state storage media 110, a computer 112, a client 114, and a computer network 116, which are described below.

The system 100 includes at least one solid-state storage device 102. In another embodiment, the system 100 includes two or more solid-state storage devices 102. Each solid-state storage device 102 may include non-volatile, solid-state storage media 110, such as flash memory, nano random access memory ("nano RAM or NRAM"), magneto-resistive RAM ("MRAM"), dynamic RAM ("DRAM"), phase change RAM ("PRAM"), etc. The solid-state storage device 102 is described in more detail with respect to FIGS. 2 and 3. The solid-state storage device 102 is depicted in a computer 112 connected to a client 114 through a computer network 116. In one embodiment, the solid-state storage device 102 is internal to the computer 112 and is connected using a system bus, such as a peripheral component interconnect express ("PCI-e") bus, a Serial Advanced Technology Attachment ("serial ATA") bus, or the like. In another embodiment, the solid-state storage device 102 is external to the computer 112 and is connected, a universal serial bus ("USB") connection, an Institute of Electrical and Electronics Engineers ("IEEE") 1394 bus ("FireWire"), or the like. In other embodiments, the solid-state storage device 102 is connected to the computer 112 using a peripheral component interconnect ("PCI") express bus using external electrical or optical bus extension or bus networking solution such as Infiniband or PCI Express Advanced Switching ("PCIe-AS"), or the like.

In various embodiments, the solid-state storage device 102 may be in the form of a dual-inline memory module ("DIMM"), a daughter card, or a micro-module. In another embodiment, the solid-state storage device 102 is an element within a rack-mounted blade. In another embodiment, the solid-state storage device 102 is contained within a package that is integrated directly onto a higher level assembly (e.g. mother board, lap top, graphics processor). In another embodiment, individual components comprising the solid-state storage device 102 are integrated directly onto a higher level assembly without intermediate packaging.

The solid-state storage device 102 includes one or more solid-state storage controllers 104, each may include a write data pipeline 106 and a read data pipeline 108 and each includes a solid-state storage media 110, which are described in more detail below with respect to FIGS. 2 and 3.

The system 100 includes one or more computers 112 connected to the solid-state storage device 102. A computer 112 may be a host, a server, a storage controller of a storage area network ("SAN"), a workstation, a personal computer, a laptop computer, a handheld computer, a supercomputer, a computer cluster, a network switch, router, or appliance, a database or storage appliance, a data acquisition or data capture system, a diagnostic system, a test system, a robot, a portable electronic device, a wireless device, or the like. In another embodiment, a computer 112 may be a client and the solid-state storage device 102 operates autonomously to service data requests sent from the computer 112. In this embodiment, the computer 112 and solid-state storage device 102 may be connected using a computer network, system bus, or other communication means suitable for connection between a computer 112 and an autonomous solid-state storage device 102.

In one embodiment, the system 100 includes one or more clients 114 connected to one or more computer 112 through one or more computer networks 116. A client 114 may be a host, a server, a storage controller of a SAN, a workstation, a personal computer, a laptop computer, a handheld computer, a supercomputer, a computer cluster, a network switch, router, or appliance, a database or storage appliance, a data acquisition or data capture system, a diagnostic system, a test system, a robot, a portable electronic device, a wireless device, or the like. The computer network 116 may include the Internet, a wide area network ("WAN"), a metropolitan area network ("MAN"), a local area network ("LAN"), a token ring, a wireless network, a fiber channel network, a SAN, network attached storage ("NAS"), ESCON, or the like, or any combination of networks. The computer network 116 may also include a network from the IEEE 802 family of network technologies, such Ethernet, token ring, WiFi, WiMax, and the like.

The computer network 116 may include servers, switches, routers, cabling, radios, and other equipment used to facilitate networking computers 112 and clients 114. In one embodiment, the system 100 includes multiple computers 112 that communicate as peers over a computer network 116. In another embodiment, the system 100 includes multiple solid-state storage devices 102 that communicate as peers over a computer network 116. One of skill in the art will recognize other computer networks 116 comprising one or more computer networks 116 and related equipment with single or redundant connection between one or more clients 114 or other computer with one or more solid-state storage devices 102 or one or more solid-state storage devices 102 connected to one or more computers 112. In one embodiment, the system 100 includes two or more solid-state storage devices 102 connected through the computer network 116 to a client 114 without a computer 112.

Solid-State Storage Device

Figure 2:
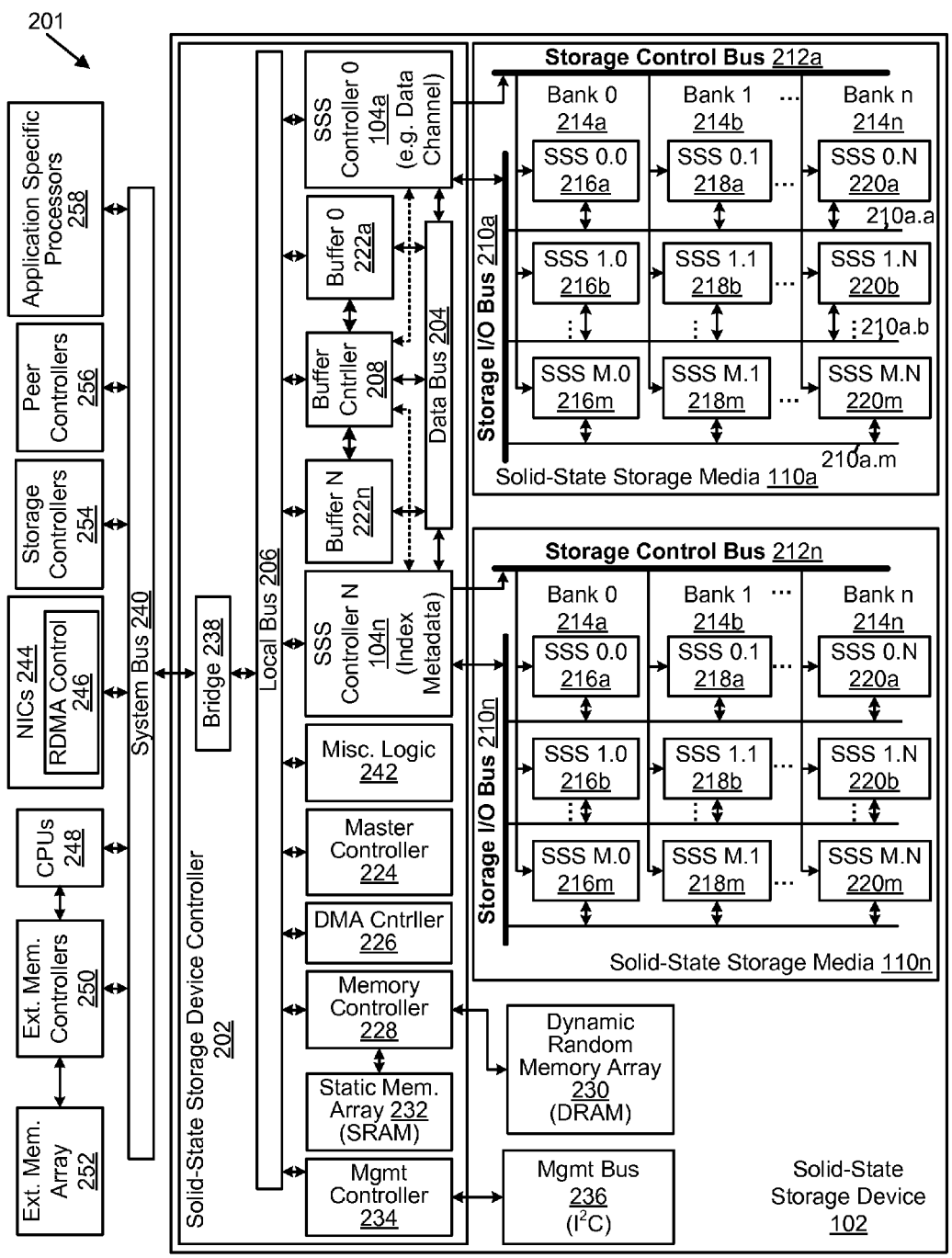
FIG. 2 is a schematic block diagram illustrating one embodiment of a solid-state storage device controller in a solid-state storage device in accordance with the present invention.

FIG. 2 is a schematic block diagram illustrating one embodiment 201 of a solid-state storage device controller 202 that includes a write data pipeline 106 and a read data pipeline 108 in a solid-state storage device 102 in accordance with the present invention. The solid-state storage device controller 202 may be embodied as hardware, as software, or as a combination of hardware and software. The solid-state storage device controller 202 may include a number of solid-state storage controllers 0-N 104a-n, each controlling solid-state storage media 110. In the depicted embodiment, two solid-state controllers are shown: solid-state controller 0 104a and solid-state storage controller N 104n, and each controls solid-state storage media 110a-n. In the depicted embodiment, solid-state storage controller 0 104a controls a data channel so that the attached solid-state storage media 110a stores data. Solid-state storage controller N 104n controls an index metadata channel associated with the stored data and the associated solid-state storage media 110n stores index metadata. In an alternate embodiment, the solid-state storage device controller 202 includes a single solid-state controller 104a with a single solid-state storage media 110a. In another embodiment, there are a plurality of solid-state storage controllers 104a-n and associated solid-state storage media 110a-n. In one embodiment, one or more solid-state controllers 104a-104n-1, coupled to their associated solid-state storage media 110a-110n-1, control data while at least one solid-state storage controller 104n, coupled to its associated solid-state storage media 110n, controls index metadata.

In one embodiment, at least one solid-state controller 104 is field-programmable gate array ("FPGA") and controller functions are programmed into the FPGA. In a particular embodiment, the FPGA is a Xilinx® FPGA. In another embodiment, the solid-state storage controller 104 comprises components specifically designed as a solid-state storage controller 104, such as an application-specific integrated circuit ("ASIC") or custom logic solution. Each solid-state storage controller 104 typically includes a write data pipeline 106 and a read data pipeline 108, which are describe further in relation to FIG. 3. In another embodiment, at least one solid-state storage controller 104 is made up of a combination FPGA, ASIC, and custom logic components.

Solid-State Storage

The solid-state storage media 110 is an array of non-volatile solid-state storage elements 216, 218, 220, arranged in banks 214, and accessed in parallel through a bi-directional storage input/output ("I/O") bus 210. The storage I/O bus 210, in one embodiment, is capable of unidirectional communication at any one time. For example, when data is being written to the solid-state storage media 110, data cannot be read from the solid-state storage media 110. In another embodiment, data can flow both directions simultaneously. However bi-directional, as used herein with respect to a data bus, refers to a data pathway that can have data flowing in only one direction at a time, but when data flowing one direction on the bi-directional data bus is stopped, data can flow in the opposite direction on the bi-directional data bus.

A solid-state storage element (e.g. SSS 0.0 216a) is typically configured as a chip (a package of one or more dies) or a die on a circuit board. As depicted, a solid-state storage element (e.g. 216a) operates independently or semi-independently of other solid-state storage elements (e.g. 218a) even if these several elements are packaged together in a chip package, a stack of chip packages, or some other package element. As depicted, a column of solid-state storage elements 216, 218, 220 is designated as a bank 214. As depicted, there may be "n" banks 214a-n and "m" solid-state storage elements 216a-m, 218a-m, 220a-m per bank in an array of n×m solid-state storage elements 216, 218, 220 in a solid-state storage media 110. In one embodiment, a solid-state storage media 110a includes twenty solid-state storage elements per bank (e.g. 216a-m in bank 214a, 218 a-m in bank 214b, 220a-m in bank 214n, where m=22) with eight banks (e.g. 214a-n where n=8) and a solid-state storage media 110n includes two solid-state storage elements (e.g. 216a-m where m=2) per bank 214 with one bank 214a. There is no requirement that two solid-state storage media 110a, 110n have the same number of solid-state storage elements and/or same number of banks 214. In one embodiment, each solid-state storage element 216, 218, 220 is comprised of a single-level cell ("SLC") devices. In another embodiment, each solid-state storage element 216, 218, 220 is comprised of multi-level cell ("MLC") devices.

In one embodiment, solid-state storage elements for multiple banks that share a common storage I/O bus 210a row (e.g. 216b, 218b, 220b) are packaged together. In one embodiment, a solid-state storage element 216, 218, 220 may have one or more dies per chip with one or more chips stacked vertically and each die may be accessed independently. In another embodiment, a solid-state storage element (e.g. SSS 0.0 216a) may have one or more virtual dies per die and one or more dies per chip and one or more chips stacked vertically and each virtual die may be accessed independently. In another embodiment, a solid-state storage element SSS 0.0 216a may have one or more virtual dies per die and one or more dies per chip with some or all of the one or more dies stacked vertically and each virtual die may be accessed independently.

In one embodiment, two dies are stacked vertically with four stacks per group to form eight storage elements (e.g. SSS 0.0-SSS 0.8) 216a-220a, each in a separate bank 214a-n. In another embodiment, 20 storage elements (e.g. SSS 0.0-SSS 20.0) 216 form a virtual bank 214a so that each of the eight virtual banks has 20 storage elements (e.g. SSS0.0-SSS 20.8). Data is sent to the solid-state storage media 110 over the storage I/O bus 210 to all storage elements of a particular group of storage elements (SSS 0.0-SSS 0.8) 216a, 218a, 220a. The storage control bus 212a is used to select a particular bank (e.g. Bank-0 214a) so that the data received over the storage I/O bus 210 connected to all banks 214 is written just to the selected bank 214a.

In certain embodiments, the storage control bus 212 and storage I/O bus 210 are used together by the solid-state controller 104 to communicate addressing information, storage element command information, and data to be stored. Those of skill in the art recognize that this address, data, and command information may be communicated using one or the other of these buses 212, 210, or using separate buses for each type of control information. In one embodiment, addressing information, storage element command information, and storage data travel on the storage I/O bus 210 and the storage control bus 212 carries signals for activating a bank as well as identifying whether the data on the storage I/O bus 210 lines constitute addressing information, storage element command information, or storage data.

For example, a control signal on the storage control bus 212 such as "command enable" may indicate that the data on the storage I/O bus 210 lines is a storage element command such as program, erase, reset, read, and the like. A control signal on the storage control bus 212 such as "address enable" may indicate that the data on the storage I/O bus 210 lines is addressing information such as erase block identifier, page identifier, and optionally offset within the page within a particular storage element. Finally, an absence of a control signal on the storage control bus 212 for both "command enable" and "address enable" may indicate that the data on the storage I/O bus 210 lines is storage data that is to be stored on the storage element at a previously addressed erase block, physical page, and optionally offset within the page of a particular storage element.

In one embodiment, the storage I/O bus 210 is comprised of one or more independent I/O buses ("IIOBa-m" comprising 210a.a-m, 210n.a-m) wherein the solid-state storage elements within each row share one of the independent I/O buses across each solid-state storage element 216, 218, 220 in parallel so that all banks 214 are accessed simultaneously. For example, one IIOB 210a.a of the storage I/O bus 210 may access a first solid-state storage element 216a, 218a, 220a of each bank 214a-n simultaneously. A second IIOB 210a.b of the storage I/O bus 210 may access a second solid-state storage element 216b, 218b, 220b of each bank 214a-n simultaneously. Each row of solid-state storage elements 216, 218, 220 is accessed simultaneously. In one embodiment, where solid-state storage elements 216, 218, 220 are multi-level (physically stacked), all physical levels of the solid-state storage elements 216, 218, 220 are accessed simultaneously. As used herein, "simultaneously" also includes near simultaneous access where devices are accessed at slightly different intervals to avoid switching noise. Simultaneously is used in this context to be distinguished from a sequential or serial access wherein commands and/or data are sent individually one after the other.

Typically, banks 214*a-n* are independently selected using the storage control bus 212. In one embodiment, a bank 214 is selected using a chip enable or chip select. Where both chip select and chip enable are available, the storage control bus 212 may select one level of a multi-level solid-state storage element 216, 218, 220 using either of the chip select signal and the chip enable signal. In other embodiments, other commands are used by the storage control bus 212 to individually select one level of a multi-level solid-state storage element 216, 218, 220. Solid-state storage elements 216, 218, 220 may also be selected through a combination of control and of address information transmitted on storage I/O bus 210 and the storage control bus 212.

In one embodiment, each solid-state storage element 216, 218, 220 is partitioned into erase blocks and each erase block is partitioned into pages. A typical page is 2000 bytes ("2 kB"). In one example, a solid-state storage element (e.g. SSS0.0) includes two registers and can program two pages so that a two-register solid-state storage element has a page size of 4 kB. A single bank 214*a* of 20 solid-state storage elements 216*a-m* would then have an 80 kB capacity of pages accessed with the same address going out of the storage I/O bus 210.

This group of pages in a bank 214 of solid-state storage elements 216, 218, 220 of 80 kB may be called a logical or virtual page. Similarly, an erase block of each storage element 216*a-m* of a bank 214*a* may be grouped to form a logical erase block. In one embodiment, erasing a logical erase block causes a physical erase block of each storage element 216*a-m* of a bank 214*a* to be erased. In one embodiment, an erase block of pages within a solid-state storage element 216, 218, 220 is erased when an erase command is received within a solid-state storage element 216, 218, 220. In another embodiment, a single physical erase block on each storage element (e.g. SSS M.N) collectively forms a logical erase block for the solid-state storage media 110*a*. In such an embodiment, erasing a logical erase block comprises erasing an erase block at the same address within each storage element (e.g. SSS M.N) in the solid-state storage array 110*a*. Whereas the size and number of erase blocks, pages, planes, or other logical and physical divisions within a solid-state storage element 216, 218, 220 may change over time with advancements in technology, it is to be expected that many embodiments consistent with new configurations are possible and are consistent with the general description herein.

In one embodiment, data is written in packets to the storage elements. The solid-state controller 104 uses the storage I/O bus 210 and storage control bus 212 to address a particular bank 214, storage element 216, 218, 220, physical erase block, physical page, and optionally offset within a physical page for writing the data packet. In one embodiment, the solid-state controller 104 sends the address information for the data packet by way of the storage I/O bus 210 and signals that the data on the storage I/O bus 210 is address data by way of particular signals set on the storage control bus 212. The solid-state controller 104 follows the transmission of the address information with transmission of the data packet of data that is to be stored. The physical address contains enough information for the solid-state storage element 216, 218, 220 to direct the data packet to the designated location within the page.

In one embodiment, the storage I/O bus 210*a.a* connects to each storage element in a row of storage elements (e.g. SSS 0.0-SSS 0.N 216*a*, 218*a*, 220*a*). In such an embodiment, the solid-state controller 104*a* activates a desired bank 214*a* using the storage control bus 212*a*, such that data on storage I/O bus 210*a.a* reaches the proper page of a single storage element (e.g. SSS 0.0 216*a*).

In addition, in certain embodiments, the solid-state controller 104*a* simultaneously activates the same bank 214*a* using the storage control bus 212*a*, such that different data (a different data packet) on storage I/O bus 210*a.b* reaches the proper page of a single storage element on another row (e.g. SSS 1.0 216*b*). In this manner, multiple physical pages of multiple storage elements 216, 218, 220 may be written to simultaneously within a single bank 214 to store a logical page.

Similarly, a read command may require a command on the storage control bus 212 to select a single bank 214*a* and the appropriate page within that bank 214*a*. In one embodiment, a read command reads an entire physical page from each storage element, and because there are multiple solid-state storage elements 216, 218, 220 in parallel in a bank 214, an entire logical page is read with a read command. However, the read command may be broken into subcommands, as will be explained below with respect to bank interleave. A logical page may also be accessed in a write operation.

In one embodiment, a solid-state controller 104 may send an erase block erase command over all the lines of the storage I/O bus 210 to erase a physical erase block having a particular erase block address. In addition, the solid-state controller 104 may simultaneously activate a single bank 214 using the storage control bus 212 such that each physical erase block in the single activated bank 214 is erased as part of a logical erase block.

In another embodiment, the solid-state controller 104 may send an erase block erase command over all the lines of the storage I/O bus 210 to erase a physical erase block having a particular erase block address on each storage element 216, 218, 220 (SSS 0.0-SSS M.N). These particular physical erase blocks together may form a logical erase block. Once the address of the physical erase blocks is provided to the storage elements 216, 218, 220, the solid-state controller 104 may initiate the erase command on a bank 214*a* by bank 214*b* by bank 214*n* basis (either in order or based on some other sequence). Other commands may also be sent to a particular location using a combination of the storage I/O bus 210 and the storage control bus 212. One of skill in the art will recognize other ways to select a particular storage location using the bi-directional storage I/O bus 210 and the storage control bus 212.

In one embodiment, the storage controller 104 sequentially writes data on the solid-state storage media 110 in a log structured format and within one or more physical structures of the storage elements, the data is sequentially stored on the solid-state storage media 110. Sequentially writing data involves the storage controller 104 streaming data packets into storage write buffers for storage elements, such as a chip (a package of one or more dies) or a die on a circuit board. When the storage write buffers are full, the data packets are programmed to a designated virtual or logical page ("LP"). Data packets then refill the storage write buffers and, when full, the data packets are written to the next LP. The next virtual page may be in the same bank 214*a* or another bank (e.g. 214*b*). This process continues, LP after LP, typically until a virtual or logical erase block ("LEB") is filled. LPs and LEBs are described in more detail below.

In another embodiment, the streaming may continue across LEB boundaries with the process continuing, LEB after LEB. Typically, the storage controller 104 sequentially stores data packets in an LEB by order of processing. In one embodiment, where a write data pipeline 106 is used, the storage controller 104 stores packets in the order that they come out of the write data pipeline 106. This order may be a result of data segments arriving from a requesting device mixed with packets of valid data that are being read from another storage location as valid data is being recovered from another LEB during a recovery operation.

The sequentially stored data, in one embodiment, can serve as a log to reconstruct data indexes and other metadata using information from data packet headers. For example, in one embodiment, the storage controller 104 may reconstruct a storage index by reading headers to determine the data structure to which each packet belongs and sequence information to determine where in the data structure the data or metadata belongs. The storage controller 104, in one embodiment, uses physical address information for each packet and timestamp or sequence information to create a mapping between the physical locations of the packets and the data structure identifier and data segment sequence. Timestamp or sequence information is used by the storage controller 104 to replay the sequence of changes made to the index and thereby reestablish the most recent state.

In one embodiment, erase blocks are time stamped or given a sequence number as packets are written and the timestamp or sequence information of an erase block is used along with information gathered from container headers and packet headers to reconstruct the storage index. In another embodiment, timestamp or sequence information is written to an erase block when the erase block is recovered.

In a read, modify, write operation, data packets associated with the logical structure are located and read in a read operation. Data segments of the modified structure that have been modified are not written to the location from which they are read. Instead, the modified data segments are again converted to data packets and then written to the next available location in the virtual page currently being written. Index entries for the respective data packets are modified to point to the packets that contain the modified data segments. The entry or entries in the index for data packets associated with the same logical structure that have not been modified will include pointers to original location of the unmodified data packets. Thus, if the original logical structure is maintained, for example to maintain a previous version of the logical structure, the original logical structure will have pointers in the index to all data packets as originally written. The new logical structure will have pointers in the index to some of the original data packets and pointers to the modified data packets in the virtual page that is currently being written.

In a copy operation, the index includes an entry for the original logical structure mapped to a number of packets stored on the solid-state storage media 110. When a copy is made, a new logical structure is created and a new entry is created in the index mapping the new logical structure to the original packets. The new logical structure is also written to the solid-state storage media 110 with its location mapped to the new entry in the index. The new logical structure packets may be used to identify the packets within the original logical structure that are referenced in case changes have been made in the original logical structure that have not been propagated to the copy and the index is lost or corrupted. In another embodiment, the index includes a logical entry for a logical block.

Beneficially, sequentially writing packets facilitates a more even use of the solid-state storage media 110 and allows the solid-storage device controller 202 to monitor storage hot spots and level usage of the various virtual pages in the solid-state storage media 110. Sequentially writing packets also facilitates a powerful, efficient garbage collection system, which is described in detail below. One of skill in the art will recognize other benefits of sequential storage of data packets.

The system 100 may comprise a log-structured storage system or log-structured array similar to a log-structured file system and the order that data is stored may be used to recreate an index. Typically an index that includes a logical-to-physical mapping is stored in volatile memory. The index is referred to as a logical-to-physical map herein. If the index is corrupted or lost, the index may be reconstructed by addressing the solid-state storage media 110 in the order that the data was written. Within a logical erase block ("LEB"), data is typically stored sequentially by filling a first logical page, then a second logical page, etc. until the LEB is filled. The solid-state storage controller 104 then chooses another LEB and the process repeats. By maintaining an order that the LEBs were written to and by knowing that each LEB is written sequentially, the index can be rebuilt by traversing the solid-state storage media 110 in order from beginning to end. In other embodiments, if part of the index is stored in non-volatile memory, such as on the solid-state storage media 110, the solid-state storage controller 104 may only need to replay a portion of the solid-state storage media 110 to rebuild a portion of the index that was not stored in non-volatile memory. One of skill in the art will recognize other benefits of sequential storage of data packets.

Solid-State Storage Device Controller

In various embodiments, the solid-state storage device controller 202 also includes a data bus 204, a local bus 206, a buffer controller 208, buffers 0-N 222a-n, a master controller 224, a direct memory access ("DMA") controller 226, a memory controller 228, a dynamic memory array 230, a static random memory array 232, a management controller 234, a management bus 236, a bridge 238 to a system bus 240, and miscellaneous logic 242, which are described below. In other embodiments, the system bus 240 is coupled to one or more network interface cards ("NICs") 244, some of which may include remote DMA ("RDMA") controllers 246, one or more central processing unit ("CPU") 248, one or more external memory controllers 250 and associated external memory arrays 252, one or more storage controllers 254, peer controllers 256, and application specific processors 258, which are described below. The components 244-258 connected to the system bus 240 may be located in the computer 112 or may be other devices.

In one embodiment, the solid-state storage controller(s) 104 communicate data to the solid-state storage media 110 over a storage I/O bus 210. In a certain embodiment where the solid-state storage is arranged in banks 214 and each bank 214 includes multiple storage elements 216, 218, 220 accessible in parallel, the storage I/O bus 210 comprises an array of busses, one for each row of storage elements 216, 218, 220 spanning the banks 214. As used herein, the term "storage I/O bus" may refer to one storage I/O bus 210 or an array of data independent busses 204. In one embodiment, each storage I/O bus 210 accessing a row of storage elements (e.g. 216a, 218a, 220a) may include a logical-to-physical mapping for storage divisions (e.g. erase blocks) accessed in a row of storage elements 216a, 218a, 220a. This mapping allows a logical address mapped to a physical address of a storage division to be remapped to a different storage division if the first storage division fails, partially fails, is inaccessible, or has some other problem. Remapping is explained further in relation to the remapping module 430 of FIG. 4.

Data may also be communicated to the solid-state storage controller(s) 104 from a requesting device 155 through the system bus 240, bridge 238, local bus 206, buffer(s) 222, and finally over a data bus 204. The data bus 204 typically is connected to one or more buffers 222*a-n* controlled with a buffer controller 208. The buffer controller 208 typically controls transfer of data from the local bus 206 to the buffers 222 and through the data bus 204 to the pipeline input buffer 306 and output buffer 330. The buffer controller 208 typically controls how data arriving from a requesting device 155 can be temporarily stored in a buffer 222 and then transferred onto a data bus 204, or vice versa, to account for different clock domains, to prevent data collisions, etc. The buffer controller 208 typically works in conjunction with the master controller 224 to coordinate data flow. As data arrives, the data will arrive on the system bus 240, be transferred to the local bus 206 through a bridge 238.

Typically the data is transferred from the local bus 206 to one or more data buffers 222 as directed by the master controller 224 and the buffer controller 208. The data then flows out of the buffer(s) 222 to the data bus 204, through a solid-state controller 104, and on to the solid-state storage media 110 such as NAND flash or other storage media. In one embodiment, data and associated out-of-band metadata ("metadata") arriving with the data is communicated using one or more data channels comprising one or more solid-state storage controllers 104*a*-104*n*-1 and associated solid-state storage media 110*a*-110*n*-1 while at least one channel (solid-state storage controller 104*n*, solid-state storage media 110*n*) is dedicated to in-band metadata, such as index information and other metadata generated internally to the solid-state storage device 102.

The local bus 206 is typically a bidirectional bus or set of busses that allows for communication of data and commands between devices internal to the solid-state storage device controller 202 and between devices internal to the solid-state storage device 102 and devices 244-258 connected to the system bus 240. The bridge 238 facilitates communication between the local bus 206 and system bus 240. One of skill in the art will recognize other embodiments such as ring structures or switched star configurations and functions of buses 240, 206, 204 and bridges 238.

The system bus 240 is typically a bus of a computer 112 or other device in which the solid-state storage device 102 is installed or connected. In one embodiment, the system bus 240 may be a PCI-e bus, a Serial Advanced Technology Attachment ("serial ATA") bus, parallel ATA, or the like. In another embodiment, the system bus 240 is an external bus such as small computer system interface ("SCSI"), FireWire, Fiber Channel, USB, PCIe-AS, or the like. The solid-state storage device 102 may be packaged to fit internally to a device or as an externally connected device.

The solid-state storage device controller 202 includes a master controller 224 that controls higher-level functions within the solid-state storage device 102. The master controller 224, in various embodiments, controls data flow by interpreting requests, directs creation of indexes to map identifiers associated with data to physical locations of associated data, coordinating DMA requests, etc. Many of the functions described herein are controlled wholly or in part by the master controller 224.

In one embodiment, the master controller 224 uses embedded controller(s). In another embodiment, the master controller 224 uses local memory such as a dynamic memory array 230 (dynamic random access memory "DRAM"), a static memory array 232 (static random access memory "SRAM"), etc. In one embodiment, the local memory is controlled using the master controller 224. In another embodiment, the master controller 224 accesses the local memory via a memory controller 228. In another embodiment, the master controller 224 runs a Linux server and may support various common server interfaces, such as the World Wide Web, hyper-text markup language ("HTML"), etc. In another embodiment, the master controller 224 uses a nano-processor. The master controller 224 may be constructed using programmable or standard logic, or any combination of controller types listed above. The master controller 224 may be embodied as hardware, as software, or as a combination of hardware and software. One skilled in the art will recognize many embodiments for the master controller 224.

In one embodiment, where the storage controller 152/ solid-state storage device controller 202 manages multiple data storage devices/solid-state storage media 110*a*-*n*, the master controller 224 divides the work load among internal controllers, such as the solid-state storage controllers 104*a*-*n*. For example, the master controller 224 may divide a data structure to be written to the data storage devices (e.g. solid-state storage media 110*a*-*n*) so that a portion of the data structure is stored on each of the attached data storage devices. This feature is a performance enhancement allowing quicker storage and access to a data structure. In one embodiment, the master controller 224 is implemented using an FPGA. In another embodiment, the firmware within the master controller 224 may be updated through the management bus 236, the system bus 240 over a network connected to a NIC 244 or other device connected to the system bus 240.

In one embodiment, the master controller 224 emulates block storage such that a computer 112 or other device connected to the storage device/solid-state storage device 102 views the storage device/solid-state storage device 102 as a block storage device and sends data to specific physical addresses in the storage device/solid-state storage device 102. The master controller 224 then divides up the blocks and stores the data blocks. The master controller 224 then maps the blocks and physical address sent with the block to the actual locations determined by the master controller 224. The mapping is stored in the index. Typically, for block emulation, a block device application program interface ("API") is provided in a driver in the computer 112, client 114, or other device wishing to use the storage device/solid-state storage device 102 as a block storage device.

In another embodiment, the master controller 224 coordinates with NIC controllers 244 and embedded RDMA controllers 246 to deliver just-in-time RDMA transfers of data and command sets. NIC controller 244 may be hidden behind a non-transparent port to enable the use of custom drivers. Also, a driver on a client 114 may have access to the computer network 116 through an I/O memory driver using a standard stack API and operating in conjunction with NICs 244.

In one embodiment, the master controller 224 is also a redundant array of independent drive ("RAID") controller. Where the data storage device/solid-state storage device 102 is networked with one or more other data storage devices/ solid-state storage devices 102, the master controller 224 may be a RAID controller for single tier RAID, multi-tier RAID, progressive RAID, etc. The master controller 224 may also allow some objects and other data structures to be stored in a RAID array and other data structures to be stored without RAID. In another embodiment, the master controller 224 may be a distributed RAID controller element. In another embodiment, the master controller 224 may comprise many RAID, distributed RAID, and other functions as described elsewhere.

In one embodiment, the master controller 224 coordinates with single or redundant network managers (e.g. switches) to establish routing, to balance bandwidth utilization, failover, etc. In another embodiment, the master controller 224 coordinates with integrated application specific logic (via local bus 206) and associated driver software. In another embodiment, the master controller 224 coordinates with attached application specific processors 258 or logic (via the external system bus 240) and associated driver software. In another embodiment, the master controller 224 coordinates with remote application specific logic (via the computer network 116) and associated driver software. In another embodiment, the master controller 224 coordinates with the local bus 206 or external bus attached hard disk drive ("HDD") storage controller.

In one embodiment, the master controller 224 communicates with one or more storage controllers 254 where the storage device/solid-state storage device 102 may appear as a storage device connected through a SCSI bus, Internet SCSI ("iSCSI"), fiber channel, etc. Meanwhile the storage device/solid-state storage device 102 may autonomously manage objects or other data structures and may appear as an object file system or distributed object file system. The master controller 224 may also be accessed by peer controllers 256 and/or application specific processors 258.

In another embodiment, the master controller 224 coordinates with an autonomous integrated management controller to periodically validate FPGA code and/or controller software, validate FPGA code while running (reset) and/or validate controller software during power on (reset), support external reset requests, support reset requests due to watchdog timeouts, and support voltage, current, power, temperature, and other environmental measurements and setting of threshold interrupts. In another embodiment, the master controller 224 manages garbage collection to free erase blocks for reuse. In another embodiment, the master controller 224 manages wear leveling. In another embodiment, the master controller 224 allows the data storage device/solid-state storage device 102 to be partitioned into multiple virtual devices and allows partition-based media encryption. In yet another embodiment, the master controller 224 supports a solid-state storage controller 104 with advanced, multi-bit ECC correction. One of skill in the art will recognize other features and functions of a master controller 224 in a storage controller 152, or more specifically in a solid-state storage device 102.

In one embodiment, the solid-state storage device controller 202 includes a memory controller 228 which controls a dynamic random memory array 230 and/or a static random memory array 232. As stated above, the memory controller 228 may be independent or integrated with the master controller 224. The memory controller 228 typically controls volatile memory of some type, such as DRAM (dynamic random memory array 230) and SRAM (static random memory array 232). In other examples, the memory controller 228 also controls other memory types such as electrically erasable programmable read only memory ("EEPROM"), etc. In other embodiments, the memory controller 228 controls two or more memory types and the memory controller 228 may include more than one controller. Typically, the memory controller 228 controls as much SRAM 232 as is feasible and by DRAM 230 to supplement the SRAM 232.

In one embodiment, the logical-to-physical index is stored in memory 230, 232 and then periodically off-loaded to a channel of the solid-state storage media 110n or other non-volatile memory. One of skill in the art will recognize other uses and configurations of the memory controller 228, dynamic memory array 230, and static memory array 232.

In one embodiment, the solid-state storage device controller 202 includes a DMA controller 226 that controls DMA operations between the storage device/solid-state storage device 102 and one or more external memory controllers 250 and associated external memory arrays 252 and CPUs 248. Note that the external memory controllers 250 and external memory arrays 252 are called external because they are external to the storage device/solid-state storage device 102. In addition the DMA controller 226 may also control RDMA operations with requesting devices through a NIC 244 and associated RDMA controller 246.

In one embodiment, the solid-state storage device controller 202 includes a management controller 234 connected to a management bus 236. Typically the management controller 234 manages environmental metrics and status of the storage device/solid-state storage device 102. The management controller 234 may monitor device temperature, fan speed, power supply settings, etc. over the management bus 236. The management controller 234 may support the reading and programming of erasable programmable read only memory ("EEPROM") for storage of FPGA code and controller software. Typically the management bus 236 is connected to the various components within the storage device/solid-state storage device 102. The management controller 234 may communicate alerts, interrupts, etc. over the local bus 206 or may include a separate connection to a system bus 240 or other bus. In one embodiment the management bus 236 is an Inter-Integrated Circuit ("I²C") bus. One of skill in the art will recognize other related functions and uses of a management controller 234 connected to components of the storage device/solid-state storage device 102 by a management bus 236.

In one embodiment, the solid-state storage device controller 202 includes miscellaneous logic 242 that may be customized for a specific application. Typically where the solid-state device controller 202 or master controller 224 is/are configured using a FPGA or other configurable controller, custom logic may be included based on a particular application, customer requirement, storage requirement, etc.

Data Pipeline

Figure 3:
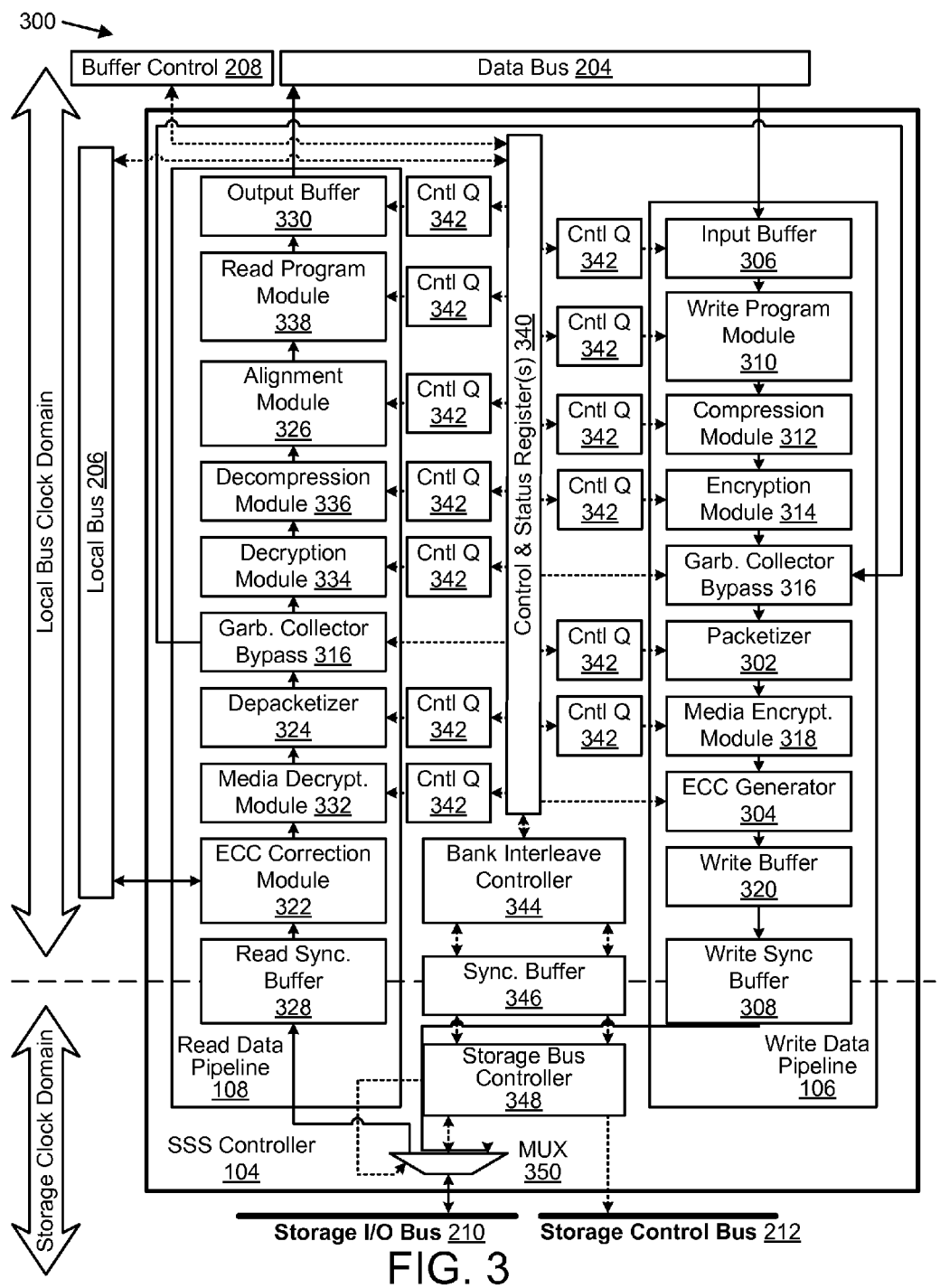
FIG. 3 is a schematic block diagram illustrating one embodiment of a solid-state storage controller with a write data pipeline and a read data pipeline in a solid-state storage device in accordance with the present invention.

FIG. 3 is a schematic block diagram illustrating one embodiment 300 of a solid-state storage controller 104 with a write data pipeline 106 and a read data pipeline 108 in a solid-state storage device 102 in accordance with the present invention. The embodiment 300 includes a data bus 204, a local bus 206, and buffer control 208, which are substantially similar to those described in relation to the solid-state storage device controller 202 of FIG. 2. The write data pipeline 106 includes a packetizer 302 and an error-correcting code ("ECC") generator 304. In other embodiments, the write data pipeline 106 includes an input buffer 306, a write synchronization buffer 308, a write program module 310, a compression module 312, an encryption module 314, a garbage collector bypass 316 (with a portion within the read data pipeline 108), a media encryption module 318, and a write buffer 320. The read data pipeline 108 includes a read synchronization buffer 328, an ECC correction module 322, a depacketizer 324, an alignment module 326, and an output buffer 330. In other embodiments, the read data pipeline 108 may include a media decryption module 332, a portion of the garbage collector bypass 316, a decryption module 334, a decompression module 336, and a read program module 338. The solid-state storage controller 104 may also include control and status registers 340 and control queues 342, a bank interleave controller 344, a synchronization buffer 346, a storage bus controller 348, and a multiplexer ("MUX") 350. The components of the solid-state controller 104 and associated write data pipeline 106 and read data pipeline 108 are described below. In other embodiments, synchronous solid-state storage media 110 may be used and synchronization buffers 308 328 may be eliminated.

Write Data Pipeline

The write data pipeline 106 includes a packetizer 302 that receives a data or metadata segment to be written to the solid-state storage, either directly or indirectly through another write data pipeline 106 stage, and creates one or more packets sized for the solid-state storage media 110. The data or metadata segment is typically part of a data structure such as an object, but may also include an entire data structure. In another embodiment, the data segment is part of a block of data, but may also include an entire block of data. Typically, a set of data such as a data structure is received from a computer 112, client 114, or other computer or device and is transmitted to the solid-state storage device 102 in data segments streamed to the solid-state storage device 102 or computer 112. A data segment may also be known by another name, such as data parcel, but as referenced herein includes all or a portion of a data structure or data block.

Each data structure is stored as one or more packets. Each data structure may have one or more container packets. Each packet contains a header. The header may include a header type field. Type fields may include data, attribute, metadata, data segment delimiters (multi-packet), data structures, data linkages, and the like. The header may also include information regarding the size of the packet, such as the number of bytes of data included in the packet. The length of the packet may be established by the packet type. The header may include information that establishes the relationship of the packet to a data structure. An example might be the use of an offset in a data packet header to identify the location of the data segment within the data structure. One of skill in the art will recognize other information that may be included in a header added to data by a packetizer 302 and other information that may be added to a data packet.

Each packet includes a header and possibly data from the data or metadata segment. The header of each packet includes pertinent information to relate the packet to the data structure to which the packet belongs. For example, the header may include an object identifier or other data structure identifier and offset that indicates the data segment, object, data structure or data block from which the data packet was formed. The header may also include a logical address used by the storage bus controller 348 to store the packet. The header may also include information regarding the size of the packet, such as the number of bytes included in the packet. The header may also include a sequence number that identifies where the data segment belongs with respect to other packets within the data structure when reconstructing the data segment or data structure. The header may include a header type field. Type fields may include data, data structure attributes, metadata, data segment delimiters (multi-packet), data structure types, data structure linkages, and the like. One of skill in the art will recognize other information that may be included in a header added to data or metadata by a packetizer 302 and other information that may be added to a packet.

The write data pipeline 106 includes an ECC generator 304 that that generates one or more error-correcting codes ("ECC") for the one or more packets received from the packetizer 302. The ECC generator 304 typically uses an error correcting algorithm to generate ECC check bits which are stored with the one or more data packets. The ECC codes generated by the ECC generator 304 together with the one or more data packets associated with the ECC codes comprise an ECC chunk. The ECC data stored with the one or more data packets is used to detect and to correct errors introduced into the data through transmission and storage. In one embodiment, packets are streamed into the ECC generator 304 as un-encoded blocks of length N. A syndrome of length S is calculated, appended and output as an encoded block of length N+S. The value of N and S are dependent upon the characteristics of the algorithm which is selected to achieve specific performance, efficiency, and robustness metrics. In one embodiment, there is no fixed relationship between the ECC blocks and the packets; the packet may comprise more than one ECC block; the ECC block may comprise more than one packet; and a first packet may end anywhere within the ECC block and a second packet may begin after the end of the first packet within the same ECC block. In one embodiment, ECC algorithms are not dynamically modified. In one embodiment, the ECC data stored with the data packets is robust enough to correct errors in more than two bits.

Beneficially, using a robust ECC algorithm allowing more than single bit correction or even double bit correction allows the life of the solid-state storage media 110 to be extended. For example, if flash memory is used as the storage medium in the solid-state storage media 110, the flash memory may be written approximately 100,000 times without error per erase cycle. This usage limit may be extended using a robust ECC algorithm. Having the ECC generator 304 and corresponding ECC correction module 322 onboard the solid-state storage device 102, the solid-state storage device 102 can internally correct errors and has a longer useful life than if a less robust ECC algorithm is used, such as single bit correction. However, in other embodiments the ECC generator 304 may use a less robust algorithm and may correct single-bit or double-bit errors. In another embodiment, the solid-state storage device 110 may comprise less reliable storage such as multi-level cell ("MLC") flash in order to increase capacity, which storage may not be sufficiently reliable without more robust ECC algorithms.

In one embodiment, the write pipeline 106 includes an input buffer 306 that receives a data segment to be written to the solid-state storage media 110 and stores the incoming data segments until the next stage of the write data pipeline 106, such as the packetizer 302 (or other stage for a more complex write data pipeline 106) is ready to process the next data segment. The input buffer 306 typically allows for discrepancies between the rate data segments are received and processed by the write data pipeline 106 using an appropriately sized data buffer. The input buffer 306 also allows the data bus 204 to transfer data to the write data pipeline 106 at rates greater than can be sustained by the write data pipeline 106 in order to improve efficiency of operation of the data bus 204. Typically when the write data pipeline 106 does not include an input buffer 306, a buffering function is performed elsewhere, such as in the solid-state storage device 102 but outside the write data pipeline 106, in the computer 112, such as within a network interface card ("NIC"), or at another device, for example when using remote direct memory access ("RDMA").

In another embodiment, the write data pipeline 106 also includes a write synchronization buffer 308 that buffers packets received from the ECC generator 304 prior to writing the packets to the solid-state storage media 110. The write synch buffer 308 is located at a boundary between a local clock domain and a solid-state storage clock domain and provides buffering to account for the clock domain differences. In other embodiments, synchronous solid-state storage media 110 may be used and synchronization buffers 308 328 may be eliminated.

In one embodiment, the write data pipeline 106 also includes a media encryption module 318 that receives the one or more packets from the packetizer 302, either directly or indirectly, and encrypts the one or more packets using an encryption key unique to the solid-state storage device 102 prior to sending the packets to the ECC generator 304. Typically, the entire packet is encrypted, including the headers. In another embodiment, headers are not encrypted. In this document, encryption key is understood to mean a secret encryption key that is managed externally from a solid-state storage controller 104.

The media encryption module 318 and corresponding media decryption module 332 provide a level of security for data stored in the solid-state storage media 110. For example, where data is encrypted with the media encryption module 318, if the solid-state storage media 110 is connected to a different solid-state storage controller 104, solid-state storage device 102, or server, the contents of the solid-state storage media 110 typically could not be read without use of the same encryption key used during the write of the data to the solid-state storage media 110 without significant effort.

In a typical embodiment, the solid-state storage device 102 does not store the encryption key in non-volatile storage and allows no external access to the encryption key. The encryption key is provided to the solid-state storage controller 104 during initialization. The solid-state storage device 102 may use and store a non-secret cryptographic nonce that is used in conjunction with an encryption key. A different nonce may be stored with every packet. Data segments may be split between multiple packets with unique nonces for the purpose of improving protection by the encryption algorithm.

The encryption key may be received from a client 114, a server, key manager, or other device that manages the encryption key to be used by the solid-state storage controller 104. In another embodiment, the solid-state storage media 110 may have two or more partitions and the solid-state storage controller 104 behaves as though it was two or more solid-state storage controllers 104, each operating on a single partition within the solid-state storage media 110. In this embodiment, a unique media encryption key may be used with each partition.

In another embodiment, the write data pipeline 106 also includes an encryption module 314 that encrypts a data or metadata segment received from the input buffer 306, either directly or indirectly, prior sending the data segment to the packetizer 302, the data segment encrypted using an encryption key received in conjunction with the data segment. The encryption keys used by the encryption module 314 to encrypt data may not be common to all data stored within the solid-state storage device 102 but may vary on an per data structure basis and received in conjunction with receiving data segments as described below. For example, an encryption key for a data segment to be encrypted by the encryption module 314 may be received with the data segment or may be received as part of a command to write a data structure to which the data segment belongs. The solid-state storage device 102 may use and store a non-secret cryptographic nonce in each data structure packet that is used in conjunction with the encryption key. A different nonce may be stored with every packet. Data segments may be split between multiple packets with unique nonces for the purpose of improving protection by the encryption algorithm.

The encryption key may be received from a client 114, a computer 112, key manager, or other device that holds the encryption key to be used to encrypt the data segment. In one embodiment, encryption keys are transferred to the solid-state storage controller 104 from one of a solid-state storage device 102, computer 112, client 114, or other external agent which has the ability to execute industry standard methods to securely transfer and protect private and public keys.

In one embodiment, the encryption module 314 encrypts a first packet with a first encryption key received in conjunction with the packet and encrypts a second packet with a second encryption key received in conjunction with the second packet. In another embodiment, the encryption module 314 encrypts a first packet with a first encryption key received in conjunction with the packet and passes a second data packet on to the next stage without encryption. Beneficially, the encryption module 314 included in the write data pipeline 106 of the solid-state storage device 102 allows data structure-by-data structure or segment-by-segment data encryption without a single file system or other external system to keep track of the different encryption keys used to store corresponding data structures or data segments. Each requesting device 155 or related key manager independently manages encryption keys used to encrypt only the data structures or data segments sent by the requesting device 155.

In one embodiment, the encryption module 314 may encrypt the one or more packets using an encryption key unique to the solid-state storage device 102. The encryption module 314 may perform this media encryption independently, or in addition to the encryption described above. Typically, the entire packet is encrypted, including the headers. In another embodiment, headers are not encrypted. The media encryption by the encryption module 314 provides a level of security for data stored in the solid-state storage media 110. For example, where data is encrypted with media encryption unique to the specific solid-state storage device 102, if the solid-state storage media 110 is connected to a different solid-state storage controller 104, solid-state storage device 102, or computer 112, the contents of the solid-state storage media 110 typically could not be read without use of the same encryption key used during the write of the data to the solid-state storage media 110 without significant effort.

In another embodiment, the write data pipeline 106 includes a compression module 312 that compresses the data for metadata segment prior to sending the data segment to the packetizer 302. The compression module 312 typically compresses a data or metadata segment using a compression routine known to those of skill in the art to reduce the storage size of the segment. For example, if a data segment includes a string of 512 zeros, the compression module 312 may replace the 512 zeros with code or token indicating the 512 zeros where the code is much more compact than the space taken by the 512 zeros.

In one embodiment, the compression module 312 compresses a first segment with a first compression routine and passes along a second segment without compression. In another embodiment, the compression module 312 compresses a first segment with a first compression routine and compresses the second segment with a second compression routine. Having this flexibility within the solid-state storage device 102 is beneficial so that clients 114 or other devices writing data to the solid-state storage device 102 may each specify a compression routine or so that one can specify a compression routine while another specifies no compression. Selection of compression routines may also be selected according to default settings on a per data structure type or data structure class basis. For example, a first data structure of a specific data structure may be able to override default compression routine settings and a second data structure of the same data structure class and data structure type may use the default compression routine and a third data structure of the same data structure class and data structure type may use no compression.

In one embodiment, the write data pipeline 106 includes a garbage collector bypass 316 that receives data segments from the read data pipeline 108 as part of a data bypass in a garbage collection system. A garbage collection system typically marks packets that are no longer valid, typically because the packet is marked for deletion or has been modified and the modified data is stored in a different location. At some point, the garbage collection system determines that a particular section of storage may be recovered. This determination may be due to a lack of available storage capacity, the percentage of data marked as invalid reaching a threshold, a consolidation of valid data, an error detection rate for that section of storage reaching a threshold, or improving performance based on data distribution, etc. Numerous factors may be considered by a garbage collection algorithm to determine when a section of storage is to be recovered.

Once a section of storage has been marked for recovery, valid packets in the section typically must be relocated. The garbage collector bypass 316 allows packets to be read into the read data pipeline 108 and then transferred directly to the write data pipeline 106 without being routed out of the solid-state storage controller 104. In one embodiment, the garbage collector bypass 316 is part of an autonomous garbage collector system that operates within the solid-state storage device 102. This allows the solid-state storage device 102 to manage data so that data is systematically spread throughout the solid-state storage media 110 to improve performance, data reliability and to avoid overuse and underuse of any one location or area of the solid-state storage media 110 and to lengthen the useful life of the solid-state storage media 110.

The garbage collector bypass 316 coordinates insertion of segments into the write data pipeline106 with other segments being written by clients 114 or other devices. In the depicted embodiment, the garbage collector bypass 316 is before the packetizer 302 in the write data pipeline 106 and after the depacketizer 324 in the read data pipeline 108, but may also be located elsewhere in the read and write data pipelines 106, 108. The garbage collector bypass 316 may be used during a flush of the write pipeline 108 to fill the remainder of the virtual page in order to improve the efficiency of storage within the solid-state storage media 110 and thereby reduce the frequency of garbage collection.

In one embodiment, the write data pipeline 106 includes a write buffer 320 that buffers data for efficient write operations. Typically, the write buffer 320 includes enough capacity for packets to fill at least one virtual page in the solid-state storage media 110. This allows a write operation to send an entire page of data to the solid-state storage media 110 without interruption. By sizing the write buffer 320 of the write data pipeline 106 and buffers within the read data pipeline 108 to be the same capacity or larger than a storage write buffer within the solid-state storage media 110, writing and reading data is more efficient since a single write command may be crafted to send a full virtual page of data to the solid-state storage media 110 instead of multiple commands.

While the write buffer 320 is being filled, the solid-state storage media 110 may be used for other read operations. This is advantageous because other solid-state devices with a smaller write buffer or no write buffer may tie up the solid-state storage when data is written to a storage write buffer and data flowing into the storage write buffer stalls. Read operations will be blocked until the entire storage write buffer is filled and programmed. Another approach for systems without a write buffer or a small write buffer is to flush the storage write buffer that is not full in order to enable reads. Again this is inefficient because multiple write/program cycles are required to fill a page.

For depicted embodiment with a write buffer 320 sized larger than a virtual page, a single write command, which includes numerous subcommands, can then be followed by a single program command to transfer the page of data from the storage write buffer in each solid-state storage element 216, 218, 220 to the designated page within each solid-state storage element 216, 218, 220. This technique has the benefits of eliminating partial page programming, which is known to reduce data reliability and durability and freeing up the destination bank for reads and other commands while the buffer fills.

In one embodiment, the write buffer 320 is a ping-pong buffer where one side of the buffer is filled and then designated for transfer at an appropriate time while the other side of the ping-pong buffer is being filled. In another embodiment, the write buffer 320 includes a first-in first-out ("FIFO") register with a capacity of more than a virtual page of data segments. One of skill in the art will recognize other write buffer 320 configurations that allow a virtual page of data to be stored prior to writing the data to the solid-state storage media 110.

In another embodiment, the write buffer 320 is sized smaller than a virtual page so that less than a page of information could be written to a storage write buffer in the solid-state storage media 110. In the embodiment, to prevent a stall in the write data pipeline 106 from holding up read operations, data is queued using the garbage collection system that needs to be moved from one location to another as part of the garbage collection process. In case of a data stall in the write data pipeline 106, the data can be fed through the garbage collector bypass 316 to the write buffer 320 and then on to the storage write buffer in the solid-state storage media 110 to fill the pages of a virtual page prior to programming the data. In this way a data stall in the write data pipeline 106 would not stall reading from the solid-state storage device 102.

In another embodiment, the write data pipeline 106 includes a write program module 310 with one or more user-definable functions within the write data pipeline 106. The write program module 310 allows a user to customize the write data pipeline 106. A user may customize the write data pipeline 106 based on a particular data requirement or application. Where the solid-state storage controller 104 is an FPGA, the user may program the write data pipeline 106 with custom commands and functions relatively easily. A user may also use the write program module 310 to include custom functions with an ASIC, however, customizing an ASIC may be more difficult than with an FPGA. The write program module 310 may include buffers and bypass mechanisms to allow a first data segment to execute in the write program module 310 while a second data segment may continue through the write data pipeline 106. In another embodiment, the write program module 310 may include a processor core that can be programmed through software.

Note that the write program module 310 is shown between the input buffer 306 and the compression module 312, however, the write program module 310 could be anywhere in the write data pipeline 106 and may be distributed among the various stages 302-320. In addition, there may be multiple write program modules 310 distributed among the various states 302-320 that are programmed and operate independently. In addition, the order of the stages 302-320 may be altered. One of skill in the art will recognize workable alterations to the order of the stages 302-320 based on particular user requirements.

Read Data Pipeline

The read data pipeline 108 includes an ECC correction module 322 that determines if a data error exists in ECC blocks a requested packet received from the solid-state storage media 110 by using ECC stored with each ECC block of the requested packet. The ECC correction module 322 then corrects any errors in the requested packet if any error exists and the errors are correctable using the ECC. For example, if the ECC can detect an error in six bits but can only correct three bit errors, the ECC correction module 322 corrects ECC blocks of the requested packet with up to three bits in error. The ECC correction module 322 corrects the bits in error by changing the bits in error to the correct one or zero state so that the requested data packet is identical to when it was written to the solid-state storage media 110 and the ECC was generated for the packet.

If the ECC correction module 322 determines that the requested packets contains more bits in error than the ECC can correct, the ECC correction module 322 cannot correct the errors in the corrupted ECC blocks of the requested packet and sends an interrupt. In one embodiment, the ECC correction module 322 sends an interrupt with a message indicating that the requested packet is in error. The message may include information that the ECC correction module 322 cannot correct the errors or the inability of the ECC correction module 322 to correct the errors may be implied. In another embodiment, the ECC correction module 322 sends the corrupted ECC blocks of the requested packet with the interrupt and/or the message.

In one embodiment, a corrupted ECC block or portion of a corrupted ECC block of the requested packet that cannot be corrected by the ECC correction module 322 is read by the master controller 224, corrected, and returned to the ECC correction module 322 for further processing by the read data pipeline 108. In one embodiment, a corrupted ECC block or portion of a corrupted ECC block of the requested packet is sent to the device requesting the data. The requesting device 155 may correct the ECC block or replace the data using another copy, such as a backup or mirror copy, and then may use the replacement data of the requested data packet or return it to the read data pipeline 108. The requesting device 155 may use header information in the requested packet in error to identify data required to replace the corrupted requested packet or to replace the data structure to which the packet belongs. In another embodiment, the solid-state storage controller 104 stores data using some type of RAID and is able to recover the corrupted data. In another embodiment, the ECC correction module 322 sends an interrupt and/or message and the receiving device fails the read operation associated with the requested data packet. One of skill in the art will recognize other options and actions to be taken as a result of the ECC correction module 322 determining that one or more ECC blocks of the requested packet are corrupted and that the ECC correction module 322 cannot correct the errors.

The read data pipeline 108 includes a depacketizer 324 that receives ECC blocks of the requested packet from the ECC correction module 322, directly or indirectly, and checks and removes one or more packet headers. The depacketizer 324 may validate the packet headers by checking packet identifiers, data length, data location, etc. within the headers. In one embodiment, the header includes a hash code that can be used to validate that the packet delivered to the read data pipeline 108 is the requested packet. The depacketizer 324 also removes the headers from the requested packet added by the packetizer 302. The depacketizer 324 may directed to not operate on certain packets but pass these forward without modification. An example might be a container label that is requested during the course of a rebuild process where the header information is required for index reconstruction. Further examples include the transfer of packets of various types destined for use within the solid-state storage device 102. In another embodiment, the depacketizer 324 operation may be packet type dependent.

The read data pipeline 108 includes an alignment module 326 that receives data from the depacketizer 324 and removes unwanted data. In one embodiment, a read command sent to the solid-state storage media 110 retrieves a packet of data. A device requesting the data may not require all data within the retrieved packet and the alignment module 326 removes the unwanted data. If all data within a retrieved page is requested data, the alignment module 326 does not remove any data.

The alignment module 326 re-formats the data as data segments of a data structure in a form compatible with a device requesting the data segment prior to forwarding the data segment to the next stage. Typically, as data is processed by the read data pipeline 108, the size of data segments or packets changes at various stages. The alignment module 326 uses received data to format the data into data segments suitable to be sent to the requesting device 155 and joined to form a response. For example, data from a portion of a first data packet may be combined with data from a portion of a second data packet. If a data segment is larger than a data requested by the requesting device 155, the alignment module 326 may discard the unwanted data.

In one embodiment, the read data pipeline 108 includes a read synchronization buffer 328 that buffers one or more requested packets read from the solid-state storage media 110 prior to processing by the read data pipeline 108. The read synchronization buffer 328 is at the boundary between the solid-state storage clock domain and the local bus clock domain and provides buffering to account for the clock domain differences.

In another embodiment, the read data pipeline 108 includes an output buffer 330 that receives requested packets from the alignment module 326 and stores the packets prior to transmission to the requesting device 155. The output buffer 330 accounts for differences between when data segments are received from stages of the read data pipeline 108 and when the data segments are transmitted to other parts of the solid-state storage controller 104 or to the requesting device 155. The output buffer 330 also allows the data bus 204 to receive data from the read data pipeline 108 at rates greater than can be sustained by the read data pipeline 108 in order to improve efficiency of operation of the data bus 204.

In one embodiment, the read data pipeline 108 includes a media decryption module 332 that receives one or more encrypted requested packets from the ECC correction module 322 and decrypts the one or more requested packets using the encryption key unique to the solid-state storage device 102 prior to sending the one or more requested packets to the depacketizer 324. Typically the encryption key used to decrypt data by the media decryption module 332 is identical to the encryption key used by the media encryption module 318. In another embodiment, the solid-state storage media 110 may have two or more partitions and the solid-state storage controller 104 behaves as though it was two or more solid-state storage controllers 104 each operating on a single partition within the solid-state storage media 110. In this embodiment, a unique media encryption key may be used with each partition.

In another embodiment, the read data pipeline 108 includes a decryption module 334 that decrypts a data segment formatted by the depacketizer 324 prior to sending the data segment to the output buffer 330. The data segment may be decrypted using an encryption key received in conjunction with the read request that initiates retrieval of the requested packet received by the read synchronization buffer 328. The decryption module 334 may decrypt a first packet with an encryption key received in conjunction with the read request for the first packet and then may decrypt a second packet with a different encryption key or may pass the second packet on to the next stage of the read data pipeline 108 without decryption. When the packet was stored with a non-secret cryptographic nonce, the nonce is used in conjunction with an encryption key to decrypt the data packet. The encryption key may be received from a client 114, a computer 112, key manager, or other device that manages the encryption key to be used by the solid-state storage controller 104.

In another embodiment, the read data pipeline 108 includes a decompression module 336 that decompresses a data segment formatted by the depacketizer 324. In one embodiment, the decompression module 336 uses compression information stored in one or both of the packet header and the container label to select a complementary routine to that used to compress the data by the compression module 312. In another embodiment, the decompression routine used by the decompression module 336 is dictated by the device requesting the data segment being decompressed. In another embodiment, the decompression module 336 selects a decompression routine according to default settings on a per data structure type or data structure class basis. A first packet of a first object may be able to override a default decompression routine and a second packet of a second data structure of the same data structure class and data structure type may use the default decompression routine and a third packet of a third data structure of the same data structure class and data structure type may use no decompression.

In another embodiment, the read data pipeline 108 includes a read program module 338 that includes one or more user-definable functions within the read data pipeline 108. The read program module 338 has similar characteristics to the write program module 310 and allows a user to provide custom functions to the read data pipeline 108. The read program module 338 may be located as shown in FIG. 3, may be located in another position within the read data pipeline 108, or may include multiple parts in multiple locations within the read data pipeline 108. Additionally, there may be multiple read program modules 338 within multiple locations within the read data pipeline 108 that operate independently. One of skill in the art will recognize other forms of a read program module 338 within a read data pipeline 108. As with the write data pipeline 106, the stages of the read data pipeline 108 may be rearranged and one of skill in the art will recognize other orders of stages within the read data pipeline 108.

The solid-state storage controller 104 includes control and status registers 340 and corresponding control queues 342. The control and status registers 340 and control queues 342 facilitate control and sequencing commands and subcommands associated with data processed in the write and read data pipelines 106, 108. For example, a data segment in the packetizer 302 may have one or more corresponding control commands or instructions in a control queue 342 associated with the ECC generator 304. As the data segment is packetized, some of the instructions or commands may be executed within the packetizer 302. Other commands or instructions may be passed to the next control queue 342 through the control and status registers 340 as the newly formed data packet created from the data segment is passed to the next stage.

Commands or instructions may be simultaneously loaded into the control queues 342 for a packet being forwarded to the write data pipeline 106 with each pipeline stage pulling the appropriate command or instruction as the respective packet is executed by that stage. Similarly, commands or instructions may be simultaneously loaded into the control queues 342 for a packet being requested from the read data pipeline 108 with each pipeline stage pulling the appropriate command or instruction as the respective packet is executed by that stage. One of skill in the art will recognize other features and functions of control and status registers 340 and control queues 342.

Figure 4:
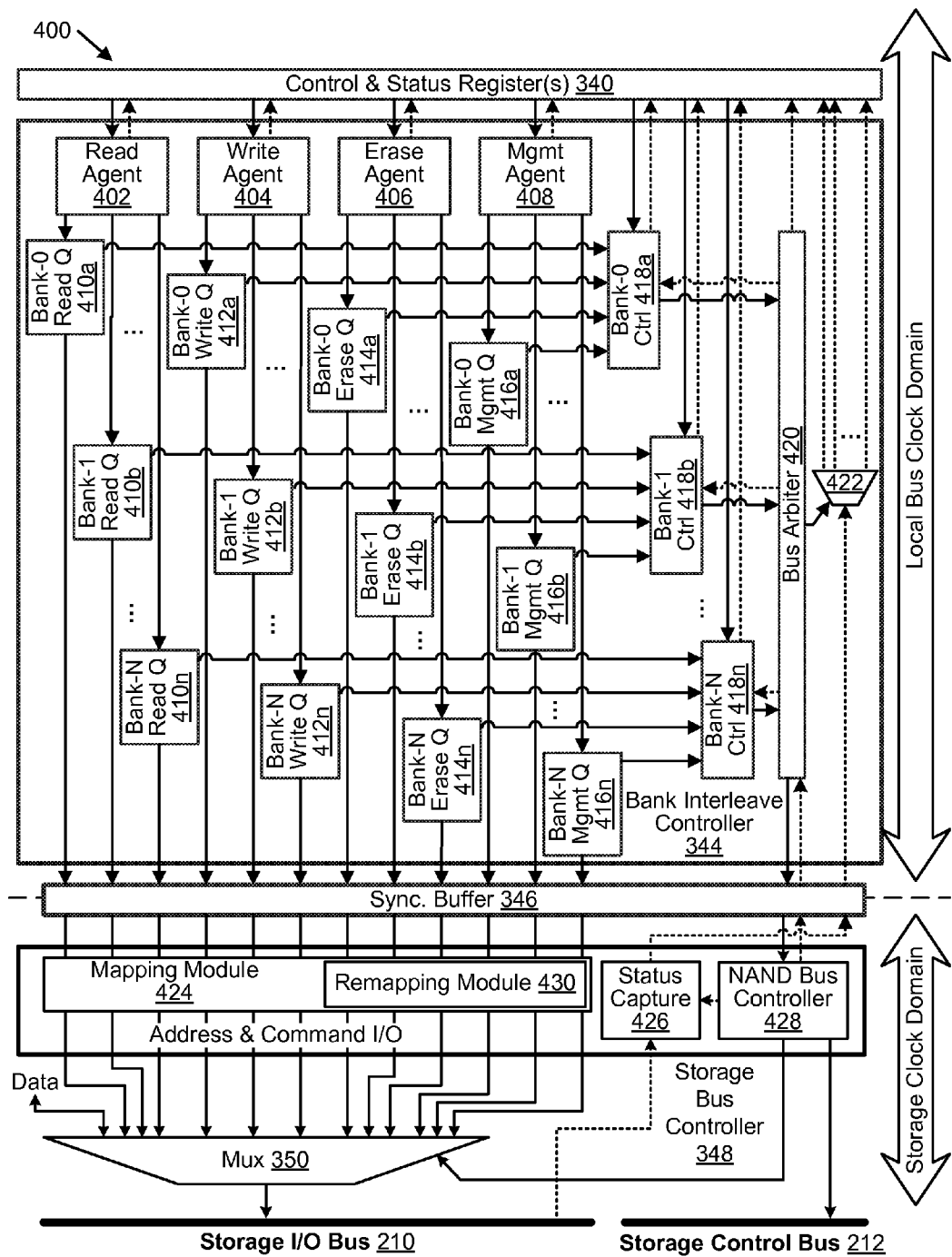
FIG. 4 is a schematic block diagram illustrating one embodiment of a bank interleave controller in the solid-state storage controller in accordance with the present invention.

The solid-state storage controller 104 and or solid-state storage device 102 may also include a bank interleave controller 344, a synchronization buffer 346, a storage bus controller 348, and a multiplexer ("MUX") 350, which are described in relation to FIG. 4.

Bank Interleave

FIG. 4 is a schematic block diagram illustrating one embodiment 400 of a bank interleave controller 344 in the solid-state storage controller 104 in accordance with the present invention. The bank interleave controller 344 is connected to the control and status registers 340 and to the storage I/O bus 210 and storage control bus 212 through the MUX 350, storage bus controller 348, and synchronization buffer 346, which are described below. The bank interleave controller 344 includes a read agent 402, a write agent 404, an erase agent 406, a management agent 408, read queues 410a-n, write queues 412a-n, erase queues 414a-n, and management queues 416a-n for the banks 214 in the solid-state storage media 110, bank controllers 418a-n, a bus arbiter 420, and a status MUX 422, which are described below. The storage bus controller 348 includes a mapping module 424 with a remapping module 430, a status capture module 426, and a NAND bus controller 428, which are described below.

The bank interleave controller 344 directs one or more commands to two or more queues in the bank interleave controller 104 and coordinates among the banks 214 of the solid-state storage media 110 execution of the commands stored in the queues, such that a command of a first type executes on one bank 214a while a command of a second type executes on a second bank 214b. The one or more commands are separated by command type into the queues. Each bank 214 of the solid-state storage media 110 has a corresponding set of queues within the bank interleave controller 344 and each set of queues includes a queue for each command type.

The bank interleave controller 344 coordinates among the banks 214 of the solid-state storage media 110 execution of the commands stored in the queues. For example, a command of a first type executes on one bank 214a while a command of a second type executes on a second bank 214b. Typically the command types and queue types include read and write commands and queues 410, 412, but may also include other commands and queues that are storage media specific. For example, in the embodiment depicted in FIG. 4, erase and management queues 414, 416 are included and would be appropriate for flash memory, NRAM, MRAM, DRAM, PRAM, etc.

For other types of solid-state storage media 110, other types of commands and corresponding queues may be included without straying from the scope of the invention. The flexible nature of an FPGA solid-state storage controller 104 allows flexibility in storage media. If flash memory were changed to another solid-state storage type, the bank interleave controller 344, storage bus controller 348, and MUX 350 could be altered to accommodate the media type without significantly affecting the data pipelines 106, 108 and other solid-state storage controller 104 functions.

In the embodiment depicted in FIG. 4, the bank interleave controller 344 includes, for each bank 214, a read queue 410 for reading data from the solid-state storage media 110, a write queue 412 for write commands to the solid-state storage media 110, an erase queue 414 for erasing an erase block in the solid-state storage, an a management queue 416 for management commands. The bank interleave controller 344 also includes corresponding read, write, erase, and management agents 402, 404, 406, 408. In another embodiment, the control and status registers 340 and control queues 342 or similar components queue commands for data sent to the banks 214 of the solid-state storage media 110 without a bank interleave controller 344.

The agents 402, 404, 406, 408, in one embodiment, direct commands of the appropriate type destined for a particular bank 214a to the correct queue for the bank 214a. For example, the read agent 402 may receive a read command for bank-1 214b and directs the read command to the bank-1 read queue 410b. The write agent 404 may receive a write command to write data to a location in bank-0 214a of the solid-state storage media 110 and will then send the write command to the bank-0 write queue 412a. Similarly, the erase agent 406 may receive an erase command to erase an erase block in bank-1 214b and will then pass the erase command to the bank-1 erase queue 414b. The management agent 408 typically receives management commands, status requests, and the like, such as a reset command or a request to read a configuration register of a bank 214, such as bank-0 214a. The management agent 408 sends the management command to the bank-0 management queue 416a.

The agents 402, 404, 406, 408 typically also monitor status of the queues 410, 412, 414, 416 and send status, interrupt, or other messages when the queues 410, 412, 414, 416 are full, nearly full, non-functional, etc. In one embodiment, the agents 402, 404, 406, 408 receive commands and generate corresponding sub-commands. In one embodiment, the agents 402, 404, 406, 408 receive commands through the control & status registers 340 and generate corresponding sub-commands which are forwarded to the queues 410, 412, 414, 416. One of skill in the art will recognize other functions of the agents 402, 404, 406, 408.

The queues 410, 412, 414, 416 typically receive commands and store the commands until required to be sent to the solid-state storage banks 214. In a typical embodiment, the queues 410, 412, 414, 416 are first-in, first-out ("FIFO") registers or a similar component that operates as a FIFO. In another embodiment, the queues 410, 412, 414, 416 store commands in an order that matches data, order of importance, or other criteria.

The bank controllers 418 typically receive commands from the queues 410, 412, 414, 416 and generate appropriate sub-commands. For example, the bank-0 write queue 412a may receive a command to write a page of data packets to bank-0 214a. The bank-0 controller 418a may receive the write command at an appropriate time and may generate one or more write subcommands for each data packet stored in the write buffer 320 to be written to the page in bank-0 214a. For example, bank-0 controller 418a may generate commands to validate the status of bank 0 214a and the solid-state storage array 216, select the appropriate location for writing one or more data packets, clear the input buffers within the solid-state storage memory array 216, transfer the one or more data packets to the input buffers, program the input buffers into the selected location, verify that the data was correctly programmed, and if program failures occur do one or more of interrupting the master controller 224, retrying the write to the same physical location, and retrying the write to a different physical location. Additionally, in conjunction with example write command, the storage bus controller 348 will cause the one or more commands to multiplied to each of the each of the storage I/O buses 210a-n with the logical address of the command mapped to a first physical addresses for storage I/O bus 210a, and mapped to a second physical address for storage I/O bus 210b, and so forth as further described below.

Typically, bus arbiter 420 selects from among the bank controllers 418 and pulls subcommands from output queues within the bank controllers 418 and forwards these to the Storage Bus Controller 348 in a sequence that optimizes the performance of the banks 214. In another embodiment, the bus arbiter 420 may respond to a high level interrupt and modify the normal selection criteria. In another embodiment, the master controller 224 can control the bus arbiter 420 through the control and status registers 340. One of skill in the art will recognize other means by which the bus arbiter 420 may control and interleave the sequence of commands from the bank controllers 418 to the solid-state storage media 110.

The bus arbiter 420 typically coordinates selection of appropriate commands, and corresponding data when required for the command type, from the bank controllers 418 and sends the commands and data to the storage bus controller 348. The bus arbiter 420 typically also sends commands to the storage control bus 212 to select the appropriate bank 214. For the case of flash memory or other solid-state storage media 110 with an asynchronous, bi-directional serial storage I/O bus 210, only one command (control information) or set of data can be transmitted at a time. For example, when write commands or data are being transmitted to the solid-state storage media 110 on the storage I/O bus 210, read commands, data being read, erase commands, management commands, or other status commands cannot be transmitted on the storage I/O bus 210. For example, when data is being read from the storage I/O bus 210, data cannot be written to the solid-state storage media 110.

For example, during a write operation on bank-0 the bus arbiter 420 selects the bank-0 controller 418a which may have a write command or a series of write sub-commands on the top of its queue which cause the storage bus controller 348 to execute the following sequence. The bus arbiter 420 forwards the write command to the storage bus controller 348, which sets up a write command by selecting bank-0 214a through the storage control bus 212, sending a command to clear the input buffers of the solid-state storage elements 110 associated with the bank-0 214a, and sending a command to validate the status of the solid-state storage elements 216, 218, 220 associated with the bank-0 214a. The storage bus controller 348 then transmits a write subcommand on the storage I/O bus 210, which contains the physical addresses including the address of the logical erase block for each individual physical erase solid-stage storage element 216a-m as mapped from the logical erase block address. The storage bus controller 348 then muxes the write buffer 320 through the write sync buffer 308 to the storage I/O bus 210 through the MUX 350 and streams write data to the appropriate page. When the page is full, then storage bus controller 348 causes the solid-state storage elements 216a-m associated with the bank-0 214a to program the input buffer to the memory cells within the solid-state storage elements 216a-m. Finally, the storage bus controller 348 validates the status to ensure that page was correctly programmed.

A read operation is similar to the write example above. During a read operation, typically the bus arbiter 420, or other component of the bank interleave controller 344, receives data and corresponding status information and sends the data to the read data pipeline 108 while sending the status information on to the control and status registers 340. Typically, a read data command forwarded from bus arbiter 420 to the storage bus controller 348 will cause the MUX 350 to gate the read data on storage I/O bus 210 to the read data pipeline 108 and send status information to the appropriate control and status registers 340 through the status MUX 422.

The bus arbiter 420 coordinates the various command types and data access modes so that only an appropriate command type or corresponding data is on the bus at any given time. If the bus arbiter 420 has selected a write command, and write subcommands and corresponding data are being written to the solid-state storage media 110, the bus arbiter 420 will not allow other command types on the storage I/O bus 210. Beneficially, the bus arbiter 420 uses timing information, such as predicted command execution times, along with status information received concerning bank 214 status to coordinate execution of the various commands on the bus with the goal of minimizing or eliminating idle time of the busses.

The master controller 224 through the bus arbiter 420 typically uses expected completion times of the commands stored in the queues 410, 412, 414, 416, along with status information, so that when the subcommands associated with a command are executing on one bank 214a, other subcommands of other commands are executing on other banks 214b-n. When one command is fully executed on a bank 214a, the bus arbiter 420 directs another command to the bank 214a. The bus arbiter 420 may also coordinate commands stored in the queues 410, 412, 414, 416 with other commands that are not stored in the queues 410, 412, 414, 416.

For example, an erase command may be sent out to erase a group of erase blocks within the solid-state storage media 110. An erase command may take 10 to 1000 times more time to execute than a write or a read command or 10 to 100 times more time to execute than a program command. For N banks 214, the bank interleave controller 344 may split the erase command into N commands, each to erase a virtual erase block of a bank 214a. While bank-0 214a is executing an erase command, the bus arbiter 420 may select other commands for execution on the other banks 214b-n. The bus arbiter 420 may also work with other components, such as the storage bus controller 348, the master controller 224, etc., to coordinate command execution among the buses. Coordinating execution of commands using the bus arbiter 420, bank controllers 418, queues 410, 412, 414, 416, and agents 402, 404, 406, 408 of the bank interleave controller 344 can dramatically increase performance over other solid-state storage systems without a bank interleave function.

In one embodiment, the solid-state controller 104 includes one bank interleave controller 344 that serves all of the storage elements 216, 218, 220 of the solid-state storage media 110. In another embodiment, the solid-state controller 104 includes a bank interleave controller 344 for each column of storage elements 216a-m, 218a-m, 220a-m. For example, one bank interleave controller 344 serves one column of storage elements SSS 0.0-SSS M.0 216a, 216b, . . . 216m, a second bank interleave controller 344 serves a second column of storage elements SSS 0.1-SSS M.1 218a, 218b, . . . 218m etc.

Storage-Specific Components

The solid-state storage controller 104 includes a synchronization buffer 346 that buffers commands and status messages sent and received from the solid-state storage media 110. The synchronization buffer 346 is located at the boundary between the solid-state storage clock domain and the local bus clock domain and provides buffering to account for the clock domain differences. The synchronization buffer 346, write synchronization buffer 308, and read synchronization buffer 328 may be independent or may act together to buffer data, commands, status messages, etc. In one embodiment, the synchronization buffer 346 is located where there are the fewest number of signals crossing the clock domains. One skilled in the art will recognize that synchronization between clock domains may be arbitrarily moved to other locations within the solid-state storage device 102 in order to optimize some aspect of design implementation.

The solid-state storage controller 104 includes a storage bus controller 348 that interprets and translates commands for data sent to and read from the solid-state storage media 110 and status messages received from the solid-state storage media 110 based on the type of solid-state storage media 110. For example, the storage bus controller 348 may have different timing requirements for different types of storage, storage with different performance characteristics, storage from different manufacturers, etc. The storage bus controller 348 also sends control commands to the storage control bus 212.

In one embodiment, the solid-state storage controller 104 includes a MUX 350 that comprises an array of multiplexers 350a-n where each multiplexer is dedicated to a row in the solid-state storage array 110. For example, multiplexer 350a is associated with solid-state storage elements 216a, 218a, 220a. MUX 350 routes the data from the write data pipeline 106 and commands from the storage bus controller 348 to the solid-state storage media 110 via the storage I/O bus 210 and routes data and status messages from the solid-state storage media 110 via the storage I/O bus 210 to the read data pipeline 108 and the control and status registers 340 through the storage bus controller 348, synchronization buffer 346, and bank interleave controller 344.

In one embodiment, the solid-state storage controller 104 includes a MUX 350 for each row of solid-state storage elements (e.g. SSS 0.1 216a, SSS 0.2 218a, SSS 0.N 220a). A MUX 350 combines data from the write data pipeline 106 and commands sent to the solid-state storage media 110 via the storage I/O bus 210 and separates data to be processed by the read data pipeline 108 from commands. Packets stored in the write buffer 320 are directed on busses out of the write buffer 320 through a write synchronization buffer 308 for each row of solid-state storage elements (SSS x.0 to SSS x.N 216, 218, 220) to the MUX 350 for each row of solid-state storage elements (SSS x.0 to SSS x.N 216, 218, 220). The commands and read data are received by the MUXes 350 from the storage I/O bus 210. The MUXes 350 also direct status messages to the storage bus controller 348.

The storage bus controller 348 includes a mapping module 424. The mapping module 424 maps a logical address of an erase block to one or more physical addresses of an erase block. For example, a solid-state storage media 110 with an array of twenty storage elements (e.g. SSS 0.0 to SSS M.0 216) per block 214a may have a logical address for a particular erase block mapped to twenty physical addresses of the erase block, one physical address per storage element. Because the storage elements are accessed in parallel, erase blocks at the same position in each storage element in a row of storage elements 216a, 218a, 220a will share a physical address. To select one erase block (e.g. in storage element SSS 0.0 216a) instead of all erase blocks in the row (e.g. in storage elements SSS 0.0, 0.1, . . . 0.N 216a, 218a, 220a), one bank (in this case bank-0 214a) is selected.

This logical-to-physical mapping for erase blocks is beneficial because if one erase block becomes damaged or inaccessible, the mapping can be changed to map to another erase block. This mitigates the loss of losing an entire virtual erase block when one element's erase block is faulty. The remapping module 430 changes a mapping of a logical address of an erase block to one or more physical addresses of a virtual erase block (spread over the array of storage elements). For example, virtual erase block 1 may be mapped to erase block 1 of storage element SSS 0.0 216a, to erase block 1 of storage element SSS 1.0 216b, . . . , and to storage element M.0 216m, virtual erase block 2 may be mapped to erase block 2 of storage element SSS 0.1 218a, to erase block 2 of storage element SSS 1.1 218b, . . . , and to storage element M.1 218m, etc. Alternatively, virtual erase block 1 may be mapped to one erase block from each storage element in an array such that virtual erase block 1 includes erase block 1 of storage element SSS 0.0 216a to erase block 1 of storage element SSS 1.0 216b to storage element M.0 216m, and erase block 1 of storage element SSS 0.1 218a to erase block 1 of storage element SSS 1.1 218b, . . . , and to storage element M.1 218m, for each storage element in the array up to erase block 1 of storage element M.N 220m.

If erase block 1 of a storage element SSS0.0 216a is damaged, experiencing errors due to wear, etc., or cannot be used for some reason, the remapping module 430 could change the logical-to-physical mapping for the logical address that pointed to erase block 1 of virtual erase block 1. If a spare erase block (call it erase block 221) of storage element SSS 0.0 216a is available and currently not mapped, the remapping module 430 could change the mapping of virtual erase block 1 to point to erase block 221 of storage element SSS 0.0 216a, while continuing to point to erase block 1 of storage element SSS 1.0 216b, erase block 1 of storage element SSS 2.0 (not shown) . . . , and to storage element M.0 216m. The mapping module 424 or remapping module 430 could map erase blocks in a prescribed order (virtual erase block 1 to erase block 1 of the storage elements, virtual erase block 2 to erase block 2 of the storage elements, etc.) or may map erase blocks of the storage elements 216, 218, 220 in another order based on some other criteria.

In one embodiment, the erase blocks could be grouped by access time. Grouping by access time, meaning time to execute a command, such as programming (writing) data into pages of specific erase blocks, can level command completion so that a command executed across the erase blocks of a virtual erase block is not limited by the slowest erase block. In other embodiments, the erase blocks may be grouped by wear level, health, etc. One of skill in the art will recognize other factors to consider when mapping or remapping erase blocks.

In one embodiment, the storage bus controller 348 includes a status capture module 426 that receives status messages from the solid-state storage media 110 and sends the status messages to the status MUX 422. In another embodiment, when the solid-state storage media 110 is flash memory, the storage bus controller 348 includes a NAND bus controller 428. The NAND bus controller 428 directs commands from the read and write data pipelines 106, 108 to the correct location in the solid-state storage media 110, coordinates timing of command execution based on characteristics of the flash memory, etc. If the solid-state storage media 110 is another solid-state storage type, the NAND bus controller 428 would be replaced by a bus controller specific to the storage type. One of skill in the art will recognize other functions of a NAND bus controller 428.

Data Block Usage Information Synchronization

Figure 5:
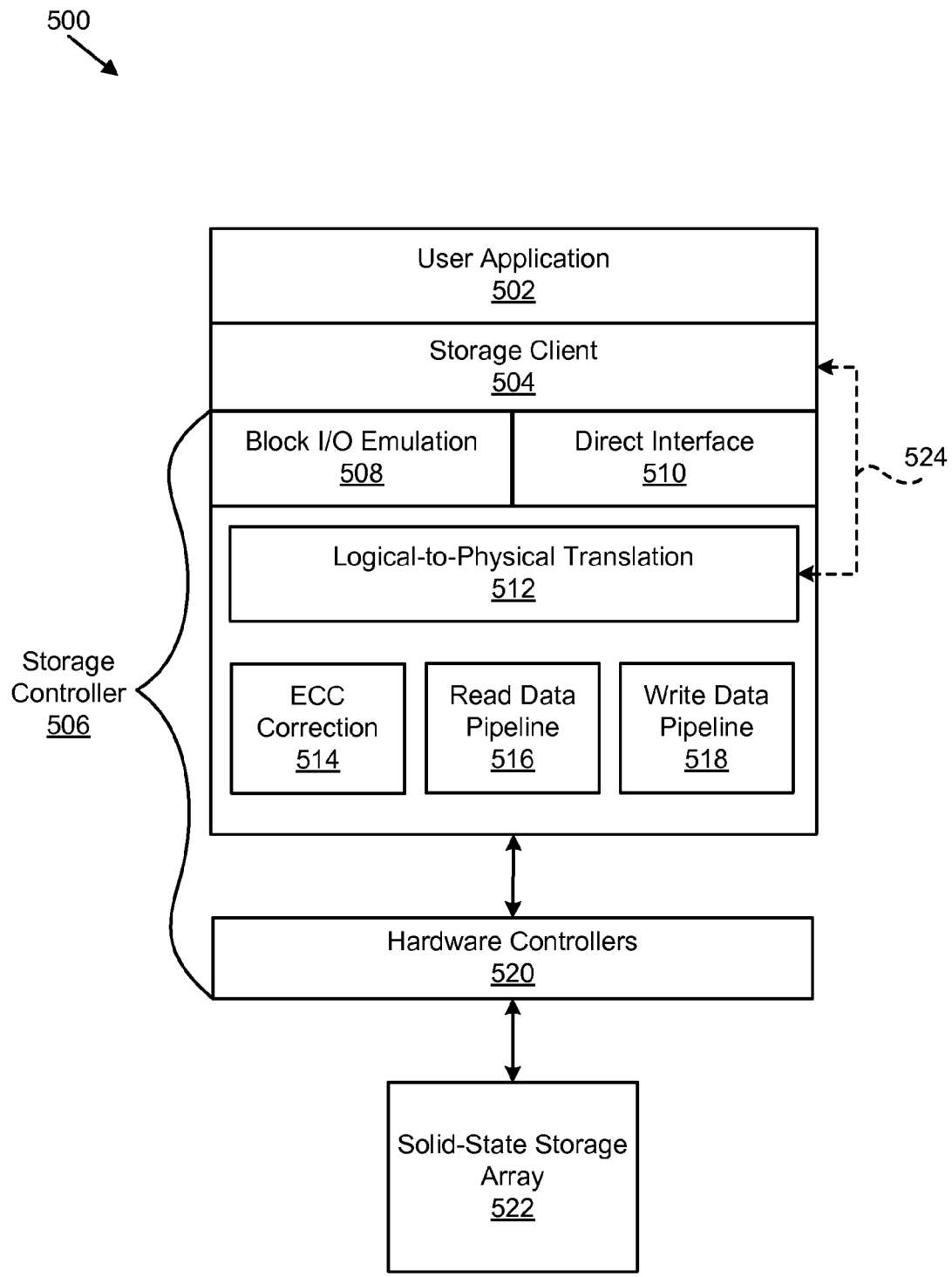
FIG. 5 is a schematic block diagram illustrating a logical representation of a solid-state storage controller in accordance with the present invention.

FIG. 5 is a schematic block diagram illustrating a logical representation 500 of a solid-state storage controller 506 in accordance with the present invention. The storage controller 506 may be similar, in certain embodiments, to the solid-state storage controller 104 depicted in FIG. 1 and FIG. 2 and may include one or more solid-state storage controllers 104. The depicted embodiment shows a user application 502 in communication with a storage client 504. The storage client 504 is in communication with a storage controller 506 that includes a logical-to-physical translation layer 512, an ECC correction module 514, a read data pipeline 516, and a write data pipeline 518.

The storage controller 506 directly manages a solid-state storage array 522. In one embodiment, the storage controller 506 directly manages a solid-state storage array 522 by managing and performing operations on the solid-state storage media 110 in the solid-state storage array 522 without any intervening independent hardware and/or software layers or interfaces. In one embodiment, the storage controller 506 directly manages the solid-state storage media 110 by directly performing storage operations on the solid-state storage media 110. A storage controller 506 that directly manages solid-state storage media 110 may include various hardware and software controllers, drivers, and software, such as the depicted hardware controllers 520.

The non-volatile storage media may be embodied as solid-state storage media 110, a single solid-state storage die, a solid-state storage drive, a hard disk drive, a set of hard disk drives, and the like. The non-volatile storage media may be one or more non-volatile storage volumes embodied as one or more block-oriented volumes comprising non-volatile storage media that stores a plurality of data blocks. In one embodiment, the one or more non-volatile storage volumes are flash storage volumes, each including one or more flash storage media. The non-volatile storage media may also be embodied in one or more virtual or logical volumes formed by a physical volume/partition, or a plurality of physical volumes/partitions. The non-volatile storage media may also be embodied in one or more hybrid or hybrid virtual volumes. The non-volatile storage media may reside in a single solid-state storage device or a plurality of solid-state storage devices. The non-volatile storage media may also reside on other block-oriented devices and systems such as a Storage Area Network ("SAN").

In one embodiment, the depicted hardware controllers 520 may be substantially similar to and include similar functionality as the solid-state controllers 104 and accompanying controllers and modules depicted in FIG. 2 and/or the bank interleave controller 344 and storage bus controller 348 depicted in FIG. 3. Furthermore, the ECC correction module 514 may be substantially similar and include similar functionality to the ECC correction module 322 and/or the ECC generator 304 depicted in FIG. 3. In addition, the read data pipeline 516 and the write data pipeline 518 may be substantially similar to the read data pipeline 108 and the write data pipeline 106 depicted in FIG. 1 and FIG. 3. The solid-state storage array 522 may include an array of solid-state storage banks similar to the solid-state storage media 110 and corresponding solid-state storage banks 214 depicted in FIG. 2.

In one embodiment, the user application 502 is a software application operating on or in conjunction with the storage client 504. The storage client 504 manages files and data and utilizes the functions and features of the storage controller 506 and associated solid-state storage array 522. Representative examples of storage clients include, but are not limited to, a server, a file system, an operating system, a database management system ("DBMS"), a volume manager, and the like. The storage client 504 is in communication with the storage controller 506. In one embodiment, the storage client 504 communicates through an Input/Output (I/O) interface represented by a block I/O emulation layer 508.

Certain conventional block storage devices divide the storage media into volumes or partitions. Each volume or partition may include a plurality of sectors. One or more sectors are organized into a logical block. In certain storage systems, such as those interfacing with the Windows® operating systems, the logical blocks are referred to as clusters. In other storage systems, such as those interfacing with UNIX, Linux, or similar operating systems, the logical blocks are referred to simply as blocks. A logical block or cluster represents a smallest physical amount of storage space on the storage media that is managed by the storage manager. A block storage device may associate n logical blocks available for user data storage across the storage media with a logical block address, numbered from 0 to n. In certain block storage devices, the logical block addresses may range from 0 to n per volume or partition. In conventional block storage devices, a logical block address maps directly to a particular logical block. In conventional block storage devices, each logical block maps to a particular set of physical sectors on the storage media.

However, storage device 102 does not directly or necessarily associate logical block addresses with particular physical blocks. These storage devices 102 may emulate a conventional block storage interface to maintain compatibility with block storage clients 504.

When the storage client 504 communicates through the block I/O emulation layer 508, the storage device 102 appears to the storage client 504 as a conventional block storage device. In one embodiment, the storage controller 506 provides a block I/O emulation layer 508 which serves as a block device interface, or API. In this embodiment, the storage client 504 communicates with the storage device 102 through this block device interface. In one embodiment, the block I/O emulation layer 508 receives commands and logical block addresses from the storage client 504 in accordance with this block device interface. As a result, the block I/O emulation layer 508 provides the storage device 102 compatibility with block storage clients 504.

In one embodiment, a storage client 504 communicates with the storage controller 506 through a direct interface layer 510. In this embodiment, the storage device 102 directly exchanges information specific to non-volatile storage devices. A storage device 102 using direct interface 510 may store data on the solid-state storage media 110 as blocks, sectors, pages, logical blocks, logical pages, erase blocks, logical erase blocks, ECC chunks, logical ECC chunks, or in any other format or structure advantageous to the technical characteristics of the solid-state storage media 110. The storage controller 506 receives a logical address and a command from the storage client 504 and performs the corresponding operation in relation to the non-volatile solid-state storage media 110. The storage controller 506 may support a block I/O emulation layer 508, a direct interface 510, or both a block I/O emulation layer 508 and a direct interface 510.

As described above, certain storage devices, while appearing to a storage client 504 to be a block storage device, do not directly associate particular logical block addresses with particular physical blocks, also referred to in the art as sectors. Such storage devices may use a logical-to-physical translation layer 512. The logical-to-physical translation layer 512 provides a level of abstraction between the logical block addresses used by the storage client 504, and the physical block addresses at which the storage controller 506 stores the data. The logical-to-physical translation layer 512 maps logical block addresses to physical block addresses of data stored on solid-state storage media 110. This mapping allows data to be referenced in a logical address space using logical identifiers, such as a logical block address. A logical identifier does not indicate the physical location of data on the solid-state storage media 110, but is an abstract reference to the data.

The storage controller 506 manages the physical block addresses in the physical address space. In one example, contiguous logical block addresses may in fact be stored in non-contiguous physical block addresses as the logical-to-physical translation layer 512 determines the location on the solid-state storage media 110 to perform data operations.

Furthermore, in one embodiment, the logical address space is substantially larger than the physical address space. This "thinly provisioned" embodiment, allows the number of logical identifiers for data references to greatly exceed the number of possible physical addresses.

In one embodiment, the logical-to-physical translation layer 512 includes a map or index that maps logical block addresses to physical block addresses. The map may be in the form of a b-tree, a content addressable memory ("CAM"), a binary tree, and/or a hash table, and the like. In certain embodiments, the logical-to-physical translation layer 512 is a tree with nodes that represent logical block addresses and comprise corresponding physical block addresses.

As stated above, in conventional block storage devices, a logical block address maps directly to a particular physical block. When a storage client 504 communicating with the conventional block storage device deletes data for a particular logical block address, the storage client 504 may note that the particular logical block address is deleted and can re-use the physical block associated with that deleted logical block address without the need to perform any other action.

Conversely, when a storage client 504, communicating with a storage controller 104 with a logical-to-physical translation layer 512 (a storage controller 104 that does not map a logical block address directly to a particular physical block), deletes a logical block address, the corresponding physical block address remains allocated because the storage client 504 does not communicate the change in used blocks to the storage controller 506. The storage client 504 may not be configured to communicate changes in used blocks (also referred to herein as "data block usage information"). Because the storage client 504 uses the block I/O emulation 508 layer, the storage client 504 may erroneously believe that the storage controller 506 is a conventional storage controller that would not utilize the data block usage information. Or, in certain embodiments, other software layers between the storage client 504 and the storage controller 506 may fail to pass on data block usage information.

Consequently, the storage controller 104 preserves the relationship between the logical block address and a physical address and the data on the storage device 102 corresponding to the physical block. As the number of allocated blocks increases, the performance of the storage controller 104 may suffer depending on the configuration of the storage controller 104.

Specifically, in certain embodiments, the storage controller 506 is configured to store data sequentially, using an append-only writing process, and use a storage space recovery process that re-uses non-volatile storage media storing deallocated/unused logical blocks. Specifically, as described above, the storage controller 506 may sequentially write data on the solid-state storage media 110 in a log structured format and within one or more physical structures of the storage elements, the data is sequentially stored on the solid-state storage media 110.

As a result of storing data sequentially and using an append-only writing process, the storage controller 506 achieves a high write throughput and a high number of I/O operations per second (IOPS). The storage controller 506 includes a storage space recovery, or garbage collection process that re-uses data storage cells to provide sufficient storage capacity. The storage space recovery process reuses storage cells for logical blocks marked as deallocated, invalid, unused, or otherwise designated as available for storage space recovery in the logical-physical translation layer 512.

As described above, the storage space recovery process determines that a particular section of storage may be recovered. Once a section of storage has been marked for recovery, the storage controller 506 may relocate valid blocks in the section. The storage space recovery process, when relocating valid blocks, copies the packets and writes them to another location so that the particular section of storage may be reused as available storage space, typically after an erase operation on the particular section. The storage controller 506 may then use the available storage space to continue sequentially writing data in an append-only fashion. Consequently, the storage controller 104 expends resources and overhead in preserving data in valid blocks. Therefore, physical blocks corresponding to deleted logical blocks may be unnecessarily preserved by the storage controller 104, which expends unnecessary resources in relocating the physical blocks during storage space recovery.

Some storage devices 102 are configured to receive messages or commands notifying the storage device 102 of these unused logical blocks so that the storage device 102 may deallocate the corresponding physical blocks. As used herein, to deallocate a physical block includes marking the physical block as invalid, unused, or otherwise designating the physical block as available for storage space recovery, its contents on storage media no longer needing to be preserved by the storage controller 506. Data block usage information, in reference to the storage controller 506, may also refer to information maintained by the storage controller 506 regarding which physical blocks are allocated and/or deallocated/unallocated and changes in the allocation of physical blocks and/or logical-to-physical block mapping information. Data block usage information, in reference to the storage controller 506, may also refer to information maintained by the storage controller 506 regarding which blocks are in use and which blocks are not in use by a storage client. Use of a block may include storing of data in the block on behalf of the client, reserving the block for use by a client, and the like.

While physical blocks may be deallocated, in certain embodiments, the storage controller 506 may not immediately erase the data on the storage media. An erase operation may be performed later in time. In certain embodiments, the data in a deallocated physical block may be marked as unavailable by the storage controller 506 such that subsequent requests for data in the physical block return a null result or an empty set of data.

One example of a command or message for such deallocation is the "Trim" function of the "Data Set Management" command under the T13 technical committee command set specification. A storage device, upon receiving a Trim command, may deallocate physical blocks for logical blocks whose data is no longer needed by the storage client 504. A storage controller 506 that deallocates physical blocks may achieve better performance and increased storage space, especially storage controllers 506 that write data using certain processes and/or use a similar data storage recovery process as that described above.

Consequently, the performance of the storage controller 506 is enhanced as physical blocks are deallocated when they are no longer needed such as through the Trim command or other similar deallocation commands issued to the storage controller 506. However, certain storage clients 504 such as operating systems or other software layers between the storage controller 506 and the user application 502 are not designed to issue or forward on these commands. For example, a storage client 504 may issue a deallocation command that never reaches the storage controller 104 due to the failure of a software layer to forward the command. Additionally, many storage clients 504 that have the ability to issue deallocation commands do so insufficiently or lack the ability to issue commands for certain storage configurations. For example, in event-driven configurations that issue deallocation commands in response to changes to block usage, when a deallocation command is dropped or lost (such as when a storage device is improperly shut down), the opportunity for the blocks corresponding to the dropped command to be trimmed has already passed until new changes are made which would allow them to be reevaluated as a trim candidate. Furthermore, many storage clients 504 cannot issue deallocation commands for a live storage volume that is actively servicing storage requests due to active storage operations continually modifying the physical blocks and/or a block mapping index such as the logical-physical translation layer 512.

A storage controller 506 whose performance is enhanced with deallocation commands that never receives deallocation commands, may suffer decreased performance as the actions of the storage client 504 unsynchronize its unused logical blocks with the physical blocks of the storage controller 506. Therefore, as depicted in FIG. 5, embodiments of the present invention provide an alternate path 524 for communicating data block usage information from the storage client 504 to the storage controller 506. Those of skill in the art recognize that variations on the embodiments presented herein as examples also come within the scope and intent of the present invention as set forth in the claims. The present invention communicates the data block usage information such that the storage controller 506 can use the data block usage information to operate more efficiently. In one embodiment, the storage controller 506 uses the data block usage information to synchronize the mapping of logical block addresses in the logical-to-physical layer 512 to the mapping maintained by the storage client 504. In another embodiment, the storage controller 506 combines the data block usage information with other metadata in order to more efficiently manage the solid-state storage array 522.

Figure 6:
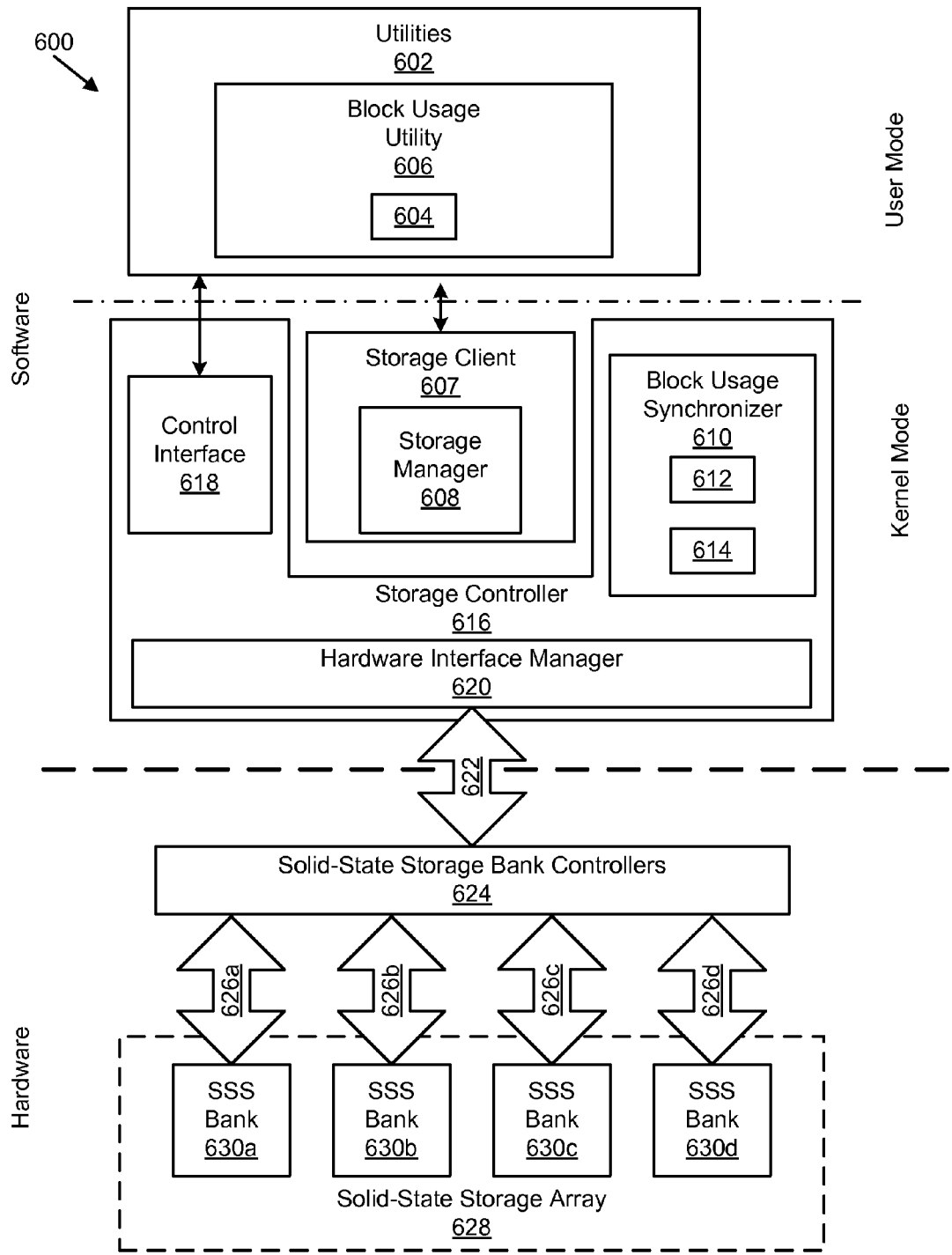
FIG. 6 is a schematic block diagram illustrating one embodiment of a system for data block usage information synchronization for a non-volatile storage volume in accordance with the present invention.

FIG. 6 is a schematic block diagram illustrating one embodiment of a system 600 for data block usage information synchronization for a non-volatile storage volume in accordance with the present invention. The system 600 includes software operating in user mode, the software including utilities 602 with a block usage utility 606. The block usage utility 606 may include a block map 604. As is known in the art, software code in user mode is the non-kernel code in which applications and utilities operate with controlled access to system resources. Programs running in user mode typically cannot access the memory of other programs directly, instead the programs must use API function calls.

The system 600, in certain embodiments, also includes software operating in kernel mode, the software including a storage client 607 with a storage manager 608, and a storage controller 616 that includes a block usage synchronizer 610 with an in-flight block map 612 and a combined block map 614. The storage controller 616 also includes a control interface 618 and a hardware interface manager 620. As is known in the art, code in kernel mode has full access to system resources and runs the kernel and certain device drivers. Kernel mode memory is typically protected from applications running in user mode.

Furthermore, the system 600 also includes a hardware interface 622 to solid-state storage bank controllers 624 operating an interface 626 to solid-state storage banks 630 in a solid-state storage array 628. The solid-state storage array 628 supports read, write or program, and erase operations and may include an array of solid-state storage banks 628 similar to the solid-state storage array 522 depicted in FIG. 5 and the solid-state storage media 110 and corresponding solid-state storage banks 214 depicted in FIG. 2.

The solid-state storage bank controllers 624 may comprise solid-state storage controller firmware and may be similar to and embodied by the solid-state controllers 104 depicted in FIG. 2 and FIG. 3 and similar controllers and hardware depicted in FIG. 2, FIG. 3, and FIG. 4. The hardware interface manager 620 and the hardware interface 622 cooperate to provide DMA data transfers, command queuing, command completion queuing, interrupts, ECC correction, "append only" write functionality, and other functionality similar to that provided by the storage controller 506 of FIG. 5.

The storage controller 616 may also be similar to the storage controller 506 depicted in FIG. 5. Specifically, the storage controller 616, in certain embodiments, registers with the host as a conventional block device driver with the associated device by providing block device emulation, implements a log-structured storage system, maintains the logical-to-physical map, implements storage space recovery, and other functionality similar to that provided by the storage controller 506 of FIG. 5. The storage controller 616 may also include all or a portion of the hardware interface manager 620, the hardware interface 622, and the solid-state storage bank controllers 624.

The storage manager 608 manages the allocation of storage space for data structures that are stored or will be stored in the future on one or more storage devices, including a storage device such as storage device 102. The storage manager 608 determines which logical blocks are in use, which logical blocks are unused, which logical blocks are reserved, and which logical blocks have changed state between used, unused, and reserved to a different state.

Typically, the storage manager 608 associates logical block addresses with files, directories, and/or other storage data structures, such as, but not limited to, objects or other data structures that are stored or will be stored in the future on the non-volatile storage media such as the solid-state storage media 110 discussed above. The storage manager 608 may include, interface with, or be included as part of a file system, DBMS, volume manager, or portions of a storage client 607 or operating system that manage files, objects, and other data structures that require storage capacity to be allocated for non-volatile storage of the data structure. The storage manager 608 may maintain one or more logical address to logical address mappings and/or one or more logical address to physical address mappings for the storage data structures. In the depicted embodiment, the storage manager 608 resides in kernel mode and interfaces with applications operating in user mode. However, in certain embodiments, the storage manager 608 or portions thereof may reside in user mode.

The storage manager 608 maintains, stores, records, provides and/or manages data block usage information for logical blocks that are managed by the storage manager 608. Data block usage information includes information regarding which one or more logical blocks are allocated/used and/or which logical blocks are unallocated/unused.

As used herein, a logical block is allocated when it is considered a valid block, when the logical block stores content corresponding to existing data of a file or other data structure, when the logical block is unavailable for storing other content, when the logical block reserves storage capacity on behalf of one or more storage clients 607, and the like. Likewise, a logical block is unallocated when it is considered an invalid block, when the logical block does not store content corresponding to existing data of a file or other data structure, when the logical block is available for storing other content, when the logical block does not reserve storage capacity on behalf of one or more storage clients 607 and the like.

Data block usage information, in one embodiment, includes free blocks and used blocks. Free blocks are blocks that are unallocated blocks. Unallocated blocks includes blocks that that were previously allocated and have now been freed as well as blocks that have not yet been allocated. The data block usage information may also include the identity of blocks currently allocated. Those of skill in the art recognize that given the number of blocks for a volume and the block sequencing, free blocks can readily be derived from used blocks and vice versa.

Data block usage information may be in the form of metadata. In certain embodiments, the data block usage information maintained by the storage manager 608 is accessible (retrievable and/or referenceable) by utilities 602 or applications 502 separate from the storage manager 608.

These utilities 602, which interface with the storage controller 616 by way of the control interface 618, provide certain management, maintenance, optimization, configuration, and tuning functionality for storage devices coupled to or in communication with a host system. The utilities 602 may include defragmentation utilities, volume reconfiguration utilities, disk performance utilities, and the like.

The utilities 602 may interface with the storage manager 608 to obtain data about a file system, disk, or volume. As stated above, the utilities 602 may read, access, obtain, or otherwise reference the data block usage information maintained by the storage manager 608. Specifically, in one embodiment, the utilities 602 reference the data block usage information by way of a storage Application Programming Interface ("API") of the storage manager 608, through, for example, a function call.

In one embodiment, the storage API is a pre-existing API provided by the storage manager 608 that describes data block usage information for a completely different purpose, and in particular data block usage information for block devices. In one embodiment, the API is a public API for block storage maintenance utilities. In a further embodiment, the storage API is configured for storage media such as a hard disk drive which is a different storage media technology than solid-state storage media 110. In one embodiment, the API is a defragmentation API that block storage maintenance utilities use to defragment hard disk drive volumes.

In one embodiment, the utilities 602 include a block usage utility 606. The block usage utility 606 interacts with the storage manager 608 and communicates data block usage information from the storage manager 608 to the storage controller 616 such that the storage controller 616 can use the data block usage information to operate more efficiently. The block usage utility 606, in the depicted embodiment, operates in user mode as a utility. In other embodiments, all or a portion of the block usage utility 606 operates in kernel mode.

The block usage utility 606 facilitates access to the data block usage information that is managed by the storage manager 608. The block usage utility 606 may directly interface with the storage manager 608 to reference, retrieve, copy, access, and/or obtain a pointer to the data block usage information. Alternatively, the block usage utility 606 cooperates with the storage client 607 to obtain or reference the data block usage information.

The block usage utility 606 provides the data block usage information to the storage controller 616. The storage controller 616 utilizes the data block usage information to operate more efficiently. For example, in one embodiment, the storage controller 616 may use the data block usage information to synchronize a mapping of logical block addresses in the logical-to-physical layer 512 to a mapping maintained by the storage manager 608 and/or storage client 607. Of course, the storage controller 616 may use the data block usage information in other ways as well to improve operation of the storage device 102.

As described above, the data block usage information may include allocated blocks or unallocated blocks. The block usage utility 606 may determine the identity of allocated blocks by using the identity of unallocated blocks and the block usage utility 606 may determine the identity of unallocated blocks by using the identity of allocated blocks. For example, using the volume size and the allocated block information, the block usage utility 606 may determine which blocks are unallocated blocks.

In one embodiment, the block usage utility 606 references the data block usage information directly, such as in a shared memory structure. In a further embodiment, the block usage utility 606 references the data block usage information, in user mode, through an API of the storage client 607 and/or the storage manager 608. The block usage utility 606 may operate as an application or service in user mode or the equivalent functionality may be embedded directly into other modules such as the storage controller 616. In other words, the storage controller 616 may reference block usage information via a block usage utility 606 or directly from the storage client 607 or the storage manager 608. This may be done in one embodiment, by mapping the block usage information user level API into kernel space and calling the user level API directly from the storage controller 616, or by some other similar mechanism.

Those of skill in the art recognize that the data block usage information may be represented and communicated in many forms. For example, in response to the function call, the storage client 607 and/or the storage manager 608 may return a data structure or identifier for a data structure that provides the data block usage information. The data structure storing the data block usage information may include a list, file, object, table, bit map, and the like. One skilled in the art realizes that the data block usage information is not restricted to any particular data structure, but may be embodied as one or more data structures known in the art. Furthermore, the data block usage information may represent used/unused block information for a single logical block, a set of logical blocks, the logical blocks for a particular volume, logical blocks for a set of volumes, and the like.

In one embodiment, a data structure returned by the API function call is a block map 604. The API function call serves as an interface between the storage manager 608 and the block usage utility 606. The block map 604 is a bit map with each bit representing an allocable unit and the binary value for the bit representing whether the allocable unit is an allocated block or an unallocated block. An allocable unit may include a block, one or more blocks, a cluster, or the like. The block map 604 may represent every allocable unit of a volume, a subset of allocable units of a volume, or allocable units corresponding to a particular set of units for a volume such as a set of logical block addresses. For example, the block usage utility 606 may execute a function call to the storage API requesting a block map for ten logical blocks associated with a set of ten logical block addressees. The API may return a 10×1 block bit map indicating an active bit for the logical blocks that are allocated.

In one embodiment, the block usage utility 606 requests, references, or executes a function call for a block map 604 for all logical blocks managed by the storage manager 608. In certain embodiments, the block usage utility 606 requests, references, or executes a function call for a block map 604 for a set or group of logical blocks. For example, the storage manager 608 may provide, through the storage API, a block map 604 defining data block usage information for a storage volume, a group of storage volumes, or for a set of logical blocks in a storage volume. In one embodiment, the storage API receives a contiguous range of logical blocks and returns a block map 604 indicating block usage for that range of logical blocks.

In certain embodiments, the block usage utility 606 calls a block usage function of the storage API designed and intended for use in defragmenting a block-oriented storage device. Instead, the block usage utility 606 uses the same storage API function calls for communicating deallocation messages and/or storage block allocation synchronization within the storage controller 616.

In one embodiment, the storage API is a defragmentation API for block-oriented storage devices. For example, certain utilities 602 may reference data block usage information from the defragmentation API in order to execute block defragmentation operations. Advantageously, this data block usage information is used by the present invention to facilitate block usage synchronization. Re-purposing this defragmentation API for communicating data block usage information to the storage controller 616 enables the present invention to operate in existing storage architectures that provide a defragmentation API but do not support communication of data block usage information for improving operation of storage devices such as storage device 102 that can use the data block usage information for more efficient operation.

The block usage utility 606, operating in user mode, may reference the block map 604 for a set of logical blocks of a volume and communicate the data block usage information from the block map 604 to the storage controller 616. The block usage utility 606 may identify the set of logical blocks by providing the storage API a set of clusters or blocks for a partition/volume. Alternatively, the block usage utility 606 may use other methods to identify the set of logical blocks and/or logical block addresses.

In one embodiment, with the block usage information of the block map 604, the block usage utility 606 sends a Trim command or other deallocation command for the unused blocks. The block usage utility 606 may send the Trim command in response to the storage controller 616 supporting the Trim command. The block usage utility 606 may iterate through the logical block addresses of a volume, selecting a set of logical block addresses to evaluate, and sending messages to the storage controller 616 identifying unused blocks from each set of logical blocks.

Advantageously, the block usage utility 606 may issue deallocation commands using data block usage information obtained directly from the storage manager 608. The storage controller 616 does not need to rely on deallocation commands or notifications issued by other storage software layers. Similarly, the block usage utility 606 may also complement the deallocation methodologies of storage clients 607.

In another embodiment, the block usage utility 606 initiates a block usage synchronizer 610, which is described in greater detail below, to synchronize the data block usage information of the storage controller 616 with the data bock usage information of the storage manager 608. In one embodiment, the block usage utility 606 initiates the block usage synchronizer 610 by way of issuing the Trim command or by simply making a function call.

The block usage utility 606 may initiate the block usage synchronizer 610 in response to one or more predetermined events or at a predetermined time interval. In certain embodiments, the block usage utility 606 operates in such a manner that minimizes the workload on the storage controller 616 and/or computer 112 resources. In addition, the block usage utility 606 may operate such that the synchronization operations of the block usage synchronizer 610 impose a minimal workload on the storage controller 616 and/or computer 112 resources. In certain embodiments the block usage utility 606 minimizes the workload by passing a reference to the block map 604 to the block usage synchronizer 610 operating in kernel mode rather than passing a copy of the block map 604.

The block usage synchronizer 610 facilitates synchronization of the storage manager's 608 data block usage information and the storage controller's 616 data block usage information, which includes, in one embodiment, the physical block allocation mappings managed by the storage controller 616. Therefore, in one embodiment, the block usage synchronizer 610 facilitates synchronization between the physical block allocation mappings managed by the storage controller 616 and the logical block allocation mappings managed by the storage manager 608. In one embodiment, the block usage synchronizer 610 uses the data block usage information to synchronize the mapping of logical block addresses in the logical-to-physical layer 512 (See FIG. 5) to the mapping maintained by the storage client 607.

In the depicted embodiment, the block usage synchronizer 610 executes in kernel mode. In other embodiments, a portion of the block usage synchronizer 610 may execute in user mode. In the depicted embodiment, the block usage synchronizer executes inside of the storage controller 616. However, in alternate embodiments, the block usage synchronizer 610 may execute outside the storage controller 616.

The block usage synchronizer 610 accesses the data block usage information directly by way of the storage API or through the block usage utility 606. In one embodiment, the block usage synchronizer 610 accesses or receives data block usage information from the block usage utility 606 operating in user mode. In another embodiment, the block usage synchronizer 610 calls a function of, references, and/or accesses the data block usage information directly from within kernel mode. For example, the block usage synchronizer 610 may call the storage API directly from kernel mode to reference the block map 604.

Advantageously, the block usage synchronizer 610 may deallocate unused physical blocks and synchronize data block usage information when the storage controller 616 communicates with storage clients 607 that do not issue deallocation commands and without reliance on deallocation commands that may not reach the storage controller 616. Similarly, the block usage synchronizer 610 may also complement the deallocation methods of storage clients 607, operating systems, or file servers to provide more efficient block usage synchronization or to ensure full coverage of the block space.

In certain embodiments, the storage controller 616 manages a live volume actively servicing storage requests. To keep data block usage information current with storage operations on the live volume, the block usage synchronizer 610 may combine the data block usage information with other metadata reflecting added potential changes to data block usage information. In one embodiment, the block usage synchronizer 610 monitors certain storage operations after the block map 604 is referenced. The block usage synchronizer 610 may manage, provide, and/or implement information about the block usage of "in-flight" storage operations not included in the data block usage information. As used herein, "in-flight" storage operations are storage operations whose data block usage information is not included in the data block usage information due to the timing of the storage operations. In-flight operations may include storage operations that modify a logical block and are executed by the storage controller 616 subsequent to, subsequent in time to, or after, the moment in time when the block usage synchronizer 610 and/or the block usage utility 606 references the data block usage information. Similarly, these in-flight storage operations may be executed by the storage controller 616 prior to the moment in time when the block usage synchronizer 610 or storage controller 616 deallocates the unused blocks based on the data block usage information or when the block usage utility 606 communicates the data block usage information to the storage controller 616.

As with the data block usage information, the in-flight information may be represented, stored, and/or communicated in many forms such as a data structure or identifier for a data structure. The data structure storing the in-flight information may include a list, file, object, table, or the like. One skilled in the art realizes that the in-flight information is not restricted to any particular data structure, but may be embodied as one or more data structures known in the art. Furthermore, the in-flight information may represent storage operations, the blocks modified by storage operations, or the like. Examples of the storage operations may include writing data or reserving storage space in previously unused certain logical blocks. In one embodiment, the in-flight information indicates changes to the current set of logical blocks analyzed by the block usage synchronizer 610 and corresponding to the logical blocks represented by the data block usage information.

In one embodiment, the block usage synchronizer 610 maintains the in-flight information as a block map. The block usage synchronizer 610 may use this in-flight block map 612 to update the data block usage information referenced through the storage manager 608. The block usage synchronizer 610 may modify the data block usage information in the in-flight block map 612 for certain storage operations that change unused blocks represented in the block map 604 to used blocks.

For example, if a storage operation in a FIFO command queue is not yet executed when the block usage synchronizer 610 references the block map 604, the block map 604 may become inaccurate because the storage operation may execute before a Trim command issued by the block usage synchronizer 610. To account for in-flight block usage changes, the block usage synchronizer 610 cooperates with the storage controller 616 to maintain the block usage information in the in-flight block map 612. The in-flight block map 612 may be used to update the data block usage information of the block map 604.

In one embodiment, the block usage synchronizer 610 combines the block map 604 and the in-flight block map 612 to produce a combined block map 614 used to identify unused blocks. In certain embodiments, the combined block map 614 is a separate data structure such as a separate bit map of the same size as the block map 604 and in-flight block map 612. Alternatively, the block usage synchronizer 610 merges the in-flight block map 612 into the block map 604 by way of an operation such as an OR binary operation. In such an embodiment, the block map 604 becomes the combined block map 614 instead of using a separate data structure.

By monitoring in-flight data operations with the in-flight block map 612 and building the combined block map 614 the block usage synchronizer 610 has the most current block usage information for performing the block usage synchronization. In addition, the block usage information accurately represents unused blocks as identified by the storage manager 608. In one embodiment, the block usage utility 606 may detect or determine storage operations and thereby maintain, manage, and/or store the in-flight block map 612 and/or the combined block map 614.

Figure 7:
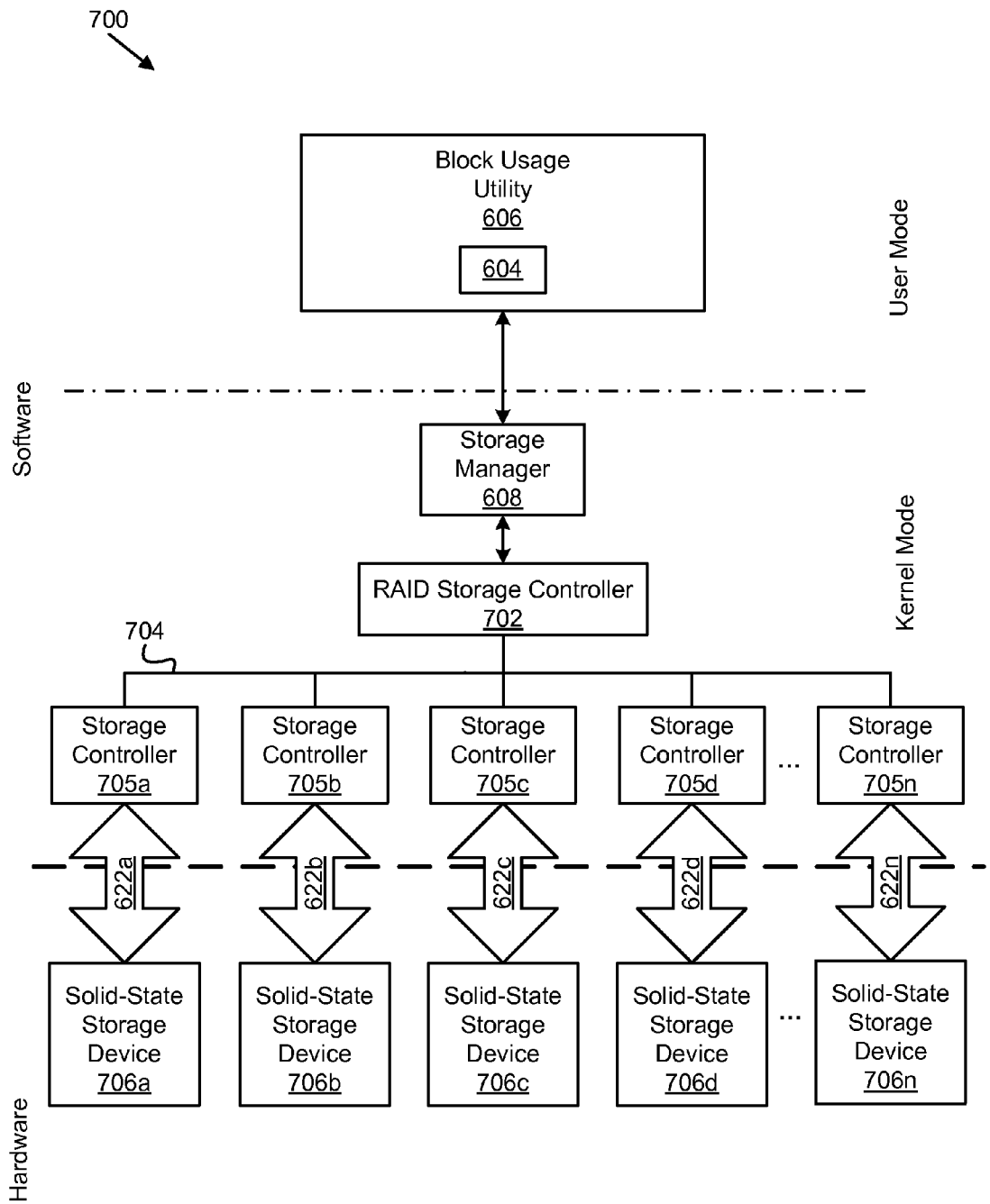
FIG. 7 is a schematic block diagram illustrating one embodiment of a system for data block usage information synchronization for a non-volatile storage volume using a RAID controller in accordance with the present invention.

FIG. 7 is a schematic block diagram illustrating one embodiment of a system 700 for data block usage information synchronization for a non-volatile storage volume using a RAID controller in accordance with the present invention. FIG. 7 includes a block usage utility 606, a block map 604, and a storage manager 608, which may be similar to the block usage utility 606, the block map 604, and the storage manager 608 of FIG. 6. FIG. 7 also includes a RAID storage controller 702 managing a plurality of sub-controllers 705a-n in a RAID configuration 704. Each sub-controller 705 performs storage operations and/or stores data on one or more solid-state storage devices 706 through a hardware interface 622 similar to the hardware interface 622 depicted in FIG. 6.

In one embodiment, the sub-controllers 705 include functionality and features similar to the storage controller 616 described above. However, the sub-controllers 705 may be configured to operate with the RAID storage controller 702. Furthermore, in one embodiment, each sub-controller 705 is configured to manage and operate a single solid-state storage device 706. Alternatively, or in addition, a sub-controller 705 may manage and operate a plurality of solid-state storage devices 706. For example, a single sub-controller 705 may operate a two or more solid-state storage devices 706 in a RAID configuration such as a RAID 0, 1, 5, and or cooperate with the RAID storage controller 702 to implement a composite RAID configuration such as RAID 10 or 01.

Although a RAID storage controller 702 managing a plurality of sub-controllers 705 is depicted in FIG. 7, one of ordinary skill in the art realizes that a single RAID storage controller 702 may also manage a plurality of storage devices 706 in a RAID configuration 704 without using sub-controllers 705. Furthermore, the depicted RAID configuration 704 may comprise a RAID 0, RAID 1, RAID 10 (1+0) or RAID 5 configuration. In addition, the RAID storage controller 702 and sub-controllers 705 may be implemented in hardware, software, or a combination of hardware and software.

In certain RAID configurations 704 (i.e. RAID 1), storage devices 706 may store identical data blocks as other storage devices 706 in the RAID array (such as a mirror storage device). For example, storage device 706b may mirror storage device 706a and storage device 706d may mirror storage device 706c. In other RAID configurations 704, each storage device 706 in the RAID array may store different data blocks than other storage devices in the RAID array such as in a RAID 0, 3, 4, or 5 configuration in which data is striped across storage devices 706. Consequently, certain portions of the data block usage information may pertain to certain storage devices 706. For example, data may be striped across storage device 706a, 706b, 706c and 706d with a stride stored on each storage device 706.

Therefore when data is stored in a RAID configuration 704, the block usage utility 606 ensures that data block usage information is communicated to each storage sub-controller 705 of the RAID in accordance with the RAID configuration 704. For example, for a RAID 1 configuration, the block usage utility 606 communicates the data block usage information to each storage sub-controller 705 participating in the mirroring configuration. Similarly, for a RAID 0 configuration, the block usage utility 606 communicates the applicable portion of data block usage information to each applicable storage sub-controller 705 participating in the stripe configuration. Furthermore, in other embodiments, the block usage synchronizer 610 (see FIG. 6) may ensure that data block usage information is synchronized for each storage device 706 of the RAID array (including mirror storage devices) and that the data block usage information for each storage device 706 is synchronized with its corresponding portion of the data block usage information from the storage manager 608 when data is striped.

In one embodiment, the RAID storage controller 702 is configured to pass along unused block information to the appropriate sub-controllers 705 and/or storage devices 706. In this embodiment, the block usage utility 606 communicates data block usage information to the RAID storage controller 702. The RAID storage controller 702 may then communicate the data block usage information or unused block information to each sub-controller 705 and/or storage device 706. The RAID storage controller 702 may also determine the portion of the data block usage information to send to each sub-controller 705/storage device 706. Similarly, in one embodiment, the block usage synchronizer 610 may synchronize the data block usage information on the RAID storage controller 702, which then updates the unused blocks for each storage device 706 or notifies the sub-controller 705 for each storage device 706 of the unused blocks. The unused block information for each storage device 706 in the RAID configuration 704 may be maintained by the sub-controllers 705 or the RAID storage controller 702 or by both in cooperation with each other.

In one embodiment, the block usage utility 606 communicates data block usage information/unused block information to the RAID storage controller 702 and also directs the RAID storage controller 702 regarding one or more portions of the data block usage information/unused block information to send to each sub-controller 705/storage device 706.

In another embodiment, the block usage utility 606 directly communicates the data block usage information/unused block information to the sub-controller 705 managing each storage device 706. The sub-controller 705 receives the data block usage information/unused block information for the blocks stored on the storage device 706 under its control. Likewise, the block usage synchronizer 610 may also directly synchronize data block usage information for each storage device 706 of the RAID by communicating directly with the sub-controller 705 for each storage device 706.

In certain embodiments, the block usage utility 606 directly communicates the data block usage information/unused block information to one sub-controller 705a which then acts as a master sub-controller 705 and communicates the data block usage information/unused block information to the other sub-controllers 705b-n. Similarly, the block usage synchronizer 610 may also synchronize data block usage information with a master sub-controller 705a that directs the other sub-controllers 705b-n accordingly.

The block usage utility 606/block usage synchronizer 610 may determine a RAID configuration 704 (also referred to as a device layout) of the RAID storage controller 702 and communicate data block usage information/unused block information or synchronize data block usage information based on the determined RAID configuration. In another embodiment, the RAID configuration is predetermined.

In one embodiment, the RAID configuration 704 comprises a RAID 0 configuration that stores data as a stripe across two or more storage devices 706. In this RAID configuration, as is known in the art, each storage device 706 stores a portion of the data for the stripe. Similarly, data block usage information pertaining to data that spans multiple storage devices 706 in the stripe is divided among the storage devices 706 of the stripe. In one embodiment, the block usage utility 606/block usage synchronizer 610 identifies portions of the data block usage information corresponding to data blocks stored on each storage device 706 and then sends a message or synchronizes with the appropriate storage controller block usage information based on the blocks stored on each storage device 706.

In one embodiment, the RAID configuration 704 comprises a RAID 1 configuration that mirrors data stored on a first storage device 706a to a second storage device 706b or that mirrors data stored on a first plurality of storage devices 706a-b to a second plurality of storage devices 706c-d. The block usage utility 606/block usage synchronizer 610 may communicate similar unused block information to or make similar synchronization changes of block usage information for the first storage device 706a and the second (mirror) storage device 706b or for the first plurality of storage devices 706a-b and the second (mirror) plurality of storage devices 706c-d.

In one embodiment, the RAID configuration 704 comprises a RAID 5 configuration that stores data as a stripe across three or more storage devices 706a-c. The stripe comprises two or more data strides and a distributed parity data stride and each data stride is stored on a storage device 706. For example, a first storage device 706a and a second storage device 706b may each store a data stride and a third storage device 706c may store a parity data stride. The sub-controller 705 for each storage device 706 storing a particular stride may maintain the data block usage information for that particular stride.

The parity calculation of the parity data stride is dependent on the data in each stride forming the stripe. In one embodiment, as blocks of a stripe change state from used to unused, the parity stride may be recalculated and rewritten. In another embodiment, the block usage utility 606/block usage synchronizer 610 determines that each data stride in the stripe has no used blocks. If all of the data blocks of the data strides in the stripe are unused, the block usage utility 606 may then communicate that the stripe is unused and thus overhead in managing the parity data stride is avoided.

Similarly, the block usage synchronizer 610 may synchronize the data block usage information for the storage devices 706 storing data strides of the stripe without affecting the parity calculation of the parity data stride because the whole stripe is unused. In certain embodiments, after determining that the stripe has no used blocks, the block usage utility 606/block usage synchronizer 610 designates data block usage information corresponding to the stripe as unused. The data block usage information corresponding to the stripe may be maintained by the RAID controller 702 and/or the sub-controllers 705.

Figure 8:
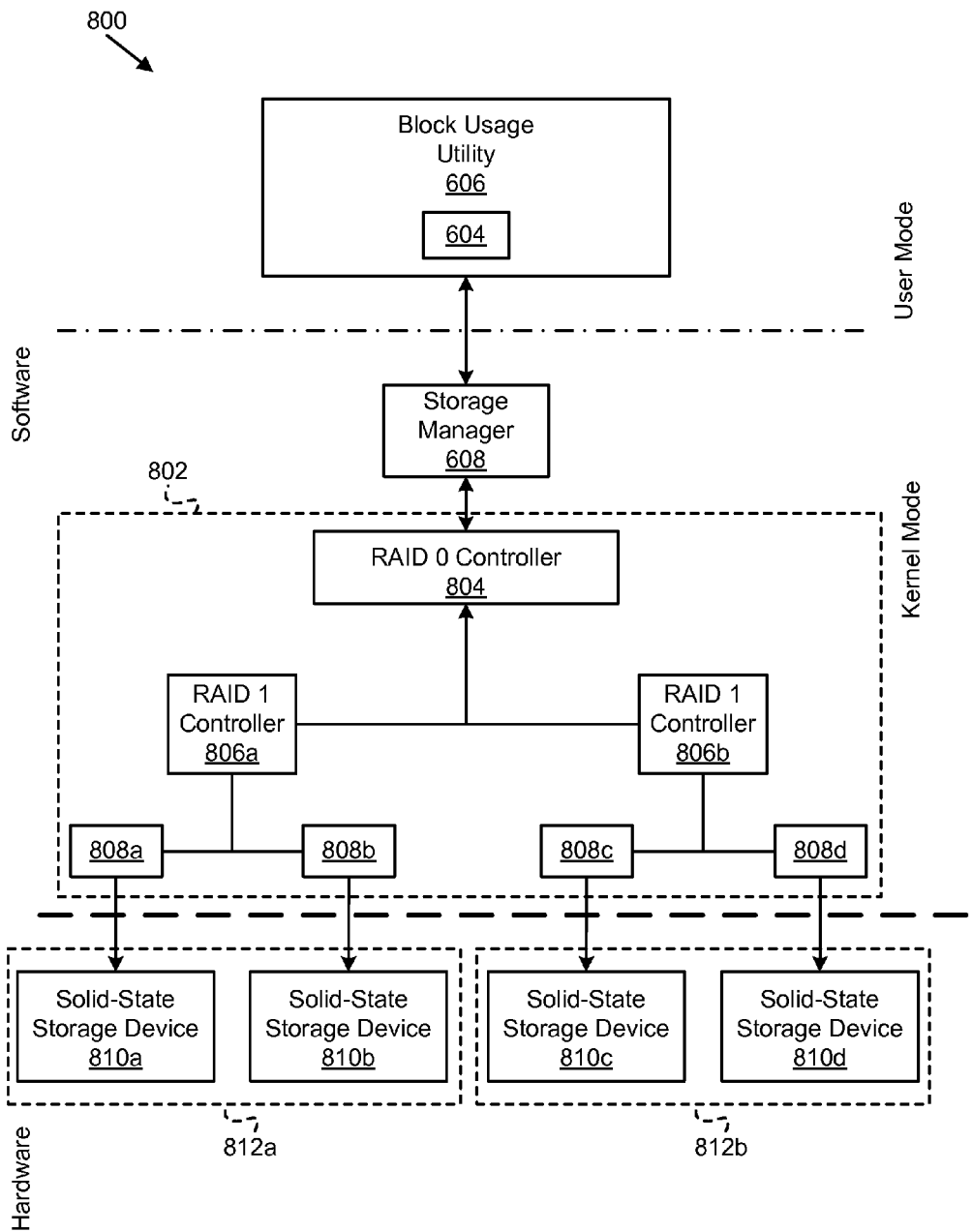
FIG. 8 is a schematic block diagram illustrating another embodiment of a system for data block usage information synchronization for a non-volatile storage volume using a RAID controller in accordance with the present invention.

FIG. 8 is a schematic block diagram illustrating another embodiment of a system 800 for data block usage information synchronization for a non-volatile storage volume using a RAID controller in accordance with the present invention. Specifically, FIG. 8 depicts one embodiment of a RAID 10 (1+0) configuration. FIG. 8 includes similar components as FIG. 6 and FIG. 7, specifically a block usage utility 606, a block map 604, and a storage manager 608. FIG. 8 also includes a RAID storage controller 802 managing four solid-state storage devices 810 in a RAID 10 configuration. In the depicted embodiment, the RAID storage controller 802 includes a top-level RAID 0 controller 804 with sub-RAID 1 controllers 806, each controlling sub-controllers 808 in communication with the storage devices 810. In one embodiment, the sub-controllers 808 may be similar to the sub-controllers 705 described above in relation to FIG. 7. In addition, although four storage devices 810 are depicted, a RAID 10 configuration may include four or more storage devices 810.

The RAID 10 configuration may mirror a stride of data between two or more storage devices 810a,b and storage devices 810c,d using a RAID 1 configuration and store stripes of data across two or more storage device sets 812 using a RAID 0 configuration. For example, storage device 810a may include a first data stride mirrored onto storage device 810b and storage device 810c may include a second data stride mirrored onto storage device 810d. In one embodiment, the block usage utility 606/block usage synchronizer 610 identifies portions of the data block usage information corresponding to data blocks stored in each data stride, sends a message to the corresponding RAID 0 controller 804, RAID 1 controller 806, and/or sub-controller 808 or synchronizes data block usage information based on the blocks stored on each data stride, and then sends a similar message or performs similar synchronization operations for the mirrored data strides.

Figure 9:
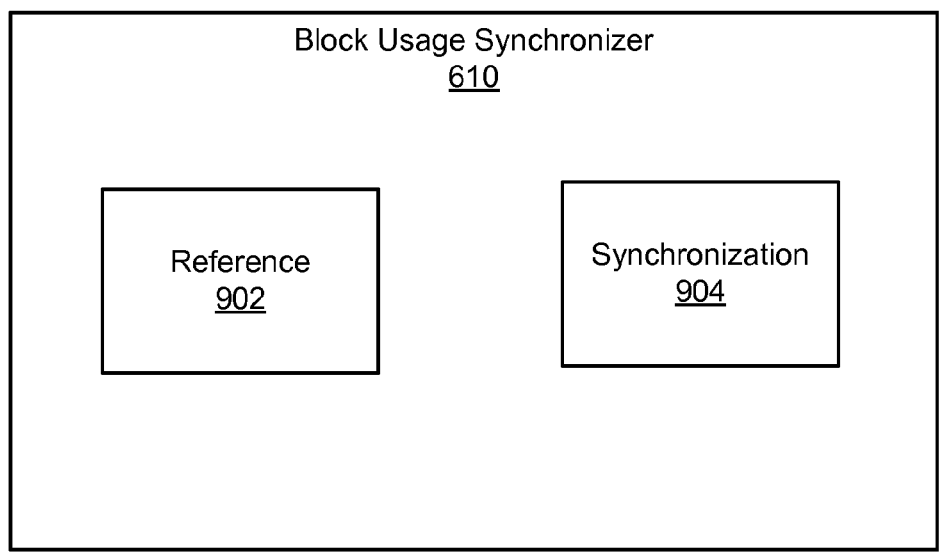
FIG. 9 is a schematic block diagram illustrating one embodiment of an apparatus for data block usage information synchronization for a non-volatile storage volume in accordance with the present invention.

FIG. 9 is a schematic block diagram illustrating one embodiment of an apparatus for data block usage information synchronization for a non-volatile storage volume in accordance with the present invention. The apparatus depicts one embodiment of the block usage synchronizer 610 in FIG. 6. The apparatus includes a reference module 902 and a synchronization module 904 which are described below. The description of the apparatus also refers to elements of FIG. 6, like numbers referring to like elements.

The reference module 902 facilitates access to data block usage information maintained by the storage manager 608. Specifically, the reference module 902 may reference, retrieve, copy, access, and/or create a pointer to data block usage information which may include unused or unallocated data block information maintained by the storage manager 608. The reference module 902 may reference this information for data blocks (associated with logical block addresses) of a non-volatile storage volume managed by a storage manager 608 or other non-volatile storage media including solid-state storage media 110.

In one embodiment, the reference module 902 references data block usage information for a set of logical block addresses for the non-volatile storage volume. In certain embodiments, the reference module 902 references data block usage information for a subset of logical blocks from a total number of logical blocks maintained by the storage manager 608. For example, the reference module 902 may reference a set of logical blocks, a group of logical blocks, a range of logical blocks, logical blocks associated with a volume, and the like.

The non-volatile storage volume may be a block-oriented volume comprising non-volatile storage media that stores a plurality of data blocks. In one embodiment, the non-volatile storage volume is a flash storage volume including one or more flash memory storage media. In one embodiment, the non-volatile storage volume is a storage device such as a hard disk drive or a solid-state storage drive. In one embodiment, the non-volatile storage volume is a live/online/mounted volume actively servicing storage requests.

As described above, in one embodiment, the storage manager 608 maintains the data block usage information for the storage client 607. In other embodiments, the storage manager 608 stores, records, provides and/or manages the data block usage information for logical blocks stored by one or more storage clients 607 and/or storage managers 608.

As stated above, the data block usage information may include the identity of used blocks or allocated blocks, unused blocks or free blocks, freed blocks, or unallocated blocks that the storage manager 608 has not allocated. In one embodiment, the reference module 902 references data block usage information comprising freed blocks unallocated by the storage manager 608 within a certain period of time or subsequent to a certain event. For example, the reference module 902 may reference data block usage information for freed blocks unallocated since the last time the reference module 902 referenced unallocated data block usage information.

In one embodiment, referencing data block usage information requires a plurality of steps. The reference module 902 may first reference data block usage information providing the identity of allocated blocks. The reference module 902 may then determine the identity of unused, or unallocated data blocks. The reference module 902 may then determine if the unused blocks are recently freed or have never been allocated.

In one embodiment, the reference module 902 references data block usage information by way of a storage Application Programming Interface ("API") of the storage manager 608. Alternatively, the reference module 902 references data block usage information by way of a storage Application Programming Interface ("API") of the storage client 607. In one embodiment, the storage API is a pre-existing API included with the storage manager 608. In certain embodiments, the storage API is not intended for deallocation commands or block synchronization. In one embodiment, the storage API is a defragmentation API for block-oriented storage devices 102.

In one embodiment, the reference module 902 operates in kernel mode and the reference module 902 references data block usage information, in kernel mode, through the API. In another embodiment, a portion of the reference module 902 operates in user mode, such as in the block usage synchronization utility 606, and references the API in user mode. In this embodiment, the portion of the reference module 902 in user mode provides, copies or otherwise makes available, a pointer to the data block usage information or a copy of the data block usage information to the portion of the reference module 902 in kernel mode.

As stated above, the reference module 902 may reference the data block usage information as a block map 604 including a bit map that uses bits to represent allocated blocks or unallocated blocks, although other data structures besides a block map may be used. The reference module 902 may request a block map 604 for a specific set of logical blocks.

The synchronization module 904 synchronizes data block usage information managed by the storage controller 616 with the data block usage information maintained by the storage manager 608. Data block usage information managed by the storage controller 616 may include information in the logical-to-physical translation layer 512 regarding logical block address to physical block address mapping. As stated above, in one embodiment, the storage manager 608 and the storage controller 616 communicate through a block-device interface and the storage controller 616 uses a logical-to-physical translation layer 512 that maps logical block addresses to physical block addresses of data stored on solid-state storage media 110. As a result, in this embodiment, the storage manager 608 maintains the data block usage information separate from data block usage information managed by the storage controller 616 and the data block usage information of the storage manager 608 and the data block usage information of the storage controller 616 can become unsynchronized, particularly when the storage manager 608 and/or block-device interface does not support deallocation message passing.

The synchronization module 904, in one embodiment, uses the data block usage information, which represents unallocated or unused logical data blocks, and deallocates the corresponding physical blocks on the non-volatile solid-state storage media 110 managed by the storage controller 616. The synchronization module 904 may also deallocate the corresponding physical blocks or cause the corresponding physical blocks to be deallocated. The synchronization module 904 may directly deallocate the physical blocks. In another embodiment, the synchronization module 904 issues a command or sends a message for the storage controller 616 to deallocate the physical blocks. In a further embodiment, the storage controller 616 returns a confirmation when the physical blocks have been successfully deallocated. Those of skill in the art recognize various ways that the synchronization module 904 can deallocate the physical blocks in relation to the logical block identifiers or addresses including updating of flags or other metadata relating to the data block usage status.

In one embodiment, the synchronization module 904 synchronizes the logical-to-physical translation layer 512 maintained by the storage controller 616. Specifically, in one embodiment, the synchronization module 904 deallocates unused blocks by removing entries for the unused blocks in a logical-to-physical map or index or by removing nodes for the unused blocks in a logical-to-physical tree data structure. In another embodiment, the synchronization module 904 causes the storage controller 616 to deallocate the unused blocks by removing, marking or updating entries for the unused blocks in the logical-to-physical map or index.

Referring also to FIG. 7, in one embodiment, the storage controller 616 includes a RAID storage controller 702 storing data in a RAID configuration 704. The synchronization module 904 may synchronize the data block usage information managed for the storage devices 706 in the RAID array with the data block usage information from the storage manager 608. In one embodiment, the synchronization module 904 determines a RAID configuration 704 of either the RAID storage controller 702 or RAID storage controller 702 and sub-controllers 705. The synchronization module 904 may then synchronize the data block usage information based on the determined RAID configuration 704. The RAID configuration 704 may include information on the types of volumes in the RAID array, the RAID configuration (such as RAID 0, RAID 1), the number of storage devices 706, and the like.

As described above, the synchronization module 904 may synchronize data block usage information by communicating, signaling, or sending a message to the RAID storage controller 702. For example, the synchronization module 904 may communicate with the RAID storage controller 702 to synchronize one or more storage devices 706 in the RAID array. The RAID storage controller 702 may identify and/or deallocate unused blocks in each appropriate storage device 706 in the RAID array. In another embodiment, the synchronization module 904 may also communicate, signal, or send a message to the RAID storage controller 702 and indicate the appropriate storage device 706 and portion of the data block usage information for each storage device 706 in the RAID array.

In another embodiment, the synchronization module 904 communicates, signals, or sends a message directly to a storage controller 616 managing a storage device 706 in the RAID array to synchronize the data block usage information.

In one embodiment, the RAID configuration 704 comprises a RAID 0 configuration that stores data as a stripe across two or more storage devices 706. The synchronization module 904 may synchronize the data blocks of a storage device 706 in the RAID array with data block usage information for the data blocks of the storage device 706. Specifically, the synchronization module 904 may identify a first portion of the data block usage information from the storage manager 608 that corresponds to data blocks stored on a first storage device 706*a* of the RAID array. The synchronization module 904 may identify a second portion of the data block usage information corresponding to data blocks stored on a second storage device 706*b*.

The synchronization module 904 may synchronize data block usage information managed for the first storage device 706*a* with the first portion of the data block usage information from the storage manager 608. The synchronization module 904 may also synchronize data block usage information managed for the second storage device 706*b* with the second portion of the data block usage information from the storage manager 608. As a result, the synchronization module 904 synchronizes data block usage information for each storage device 706 with the portion of the data block usage information particular to the blocks stored by each storage device 706.

In one embodiment, the RAID configuration 704 comprises a RAID 1 configuration. In this embodiment, the synchronization module 904 also synchronizes one or more mirror storage devices 706. Specifically, the synchronization module 904 may synchronize data block usage information managed for a first storage device 706*a* with the data block usage information from the storage manager 608. The synchronization module 904 may also synchronize data block usage information managed for a second storage device 706*b* (storing mirrored data of the first storage device 706*a*) with the data block usage information of the storage manager 608. However, in one embodiment, a storage device 706*a* and a mirror storage device 706*b* may share common data block usage information (such as a common logical-to-physical mapping tree). Consequently, when the synchronization module 904 synchronizes such storage devices 706, the mirror storage device 706*b* is automatically synchronized when the synchronization module 904 synchronizes the mirrored storage device 706*a*. Therefore, in this embodiment, the synchronization module 904 would not actively synchronize the mirror storage device 706*b*.

In one embodiment, the RAID configuration 704 comprises a RAID 5 configuration that stores data as a stripe across three or more storage devices 706 and includes a distributed parity stride along with two or more data strides. The synchronization module 904 may ensure that parity calculations for the parity data stride remain accurate. Specifically, the synchronization module 904, in one embodiment, determines, based on the data block usage information from the storage manager 608, that each data stride in the stripe has no used blocks. The synchronization module 904 may synchronize data block usage information managed for these data strides of the stripe with a corresponding portion of the data block usage information of the storage manager 608 by designating or identifying the blocks in the stripe as unused. Therefore, if the entire stripe (not including the parity stride) is made up of unused blocks, the synchronization module 904 may identify the entire stripe as unused without destroying the parity calculation for the parity data stride.

Referring now to FIGS. 8 and 9, in one embodiment, the RAID configuration comprises a RAID 10 configuration that mirrors a stride of data between two or more storage devices 810*a,b* using a RAID 1 configuration and that stores stripes of data across two or more storage device sets 812 using a RAID 0 configuration. The synchronization module 904 may synchronize data block usage information for each storage device 810*a,c* and also synchronize data block usage information for each of the mirror storage devices 810*b,d*.

Specifically, the synchronization module 904, in one embodiment, identifies a first portion of the data block usage information from the storage manager 608 corresponding to data blocks stored in a first stride managed by the RAID storage controller 802. For example, a sub-controller 808*a* may maintain data block usage information for the first stride on a first storage device 810*a*. The synchronization module 904 may identify a second portion of the data block usage information from the storage manager 608 corresponding to data blocks stored on a second stride managed by the RAID storage controller 802. For example, a sub-controller 808*c* may maintain data block usage information for the second stride on a second storage device 810*c*. The synchronization module 904 may synchronize data block usage information managed for the first stride with the first portion of the data block usage information from the storage manager 608. The synchronization module 904 may synchronize data block usage information managed for the second stride with the second portion of the data block usage information from the storage manager 608.

In one embodiment, the synchronization module 904 synchronizes the data block usage information for the storage devices 810*b,d* mirroring the first and second storage devices 810*a,c*. In another embodiment, as stated above, a storage device 810*a, c* and a mirror storage device 810 *b,d* may share common data block usage information. Consequently, when the synchronization module 904 synchronizes a storage device 810*a,c*, the mirrored storage device 810*b,d* is synchronized also.

Figure 10:
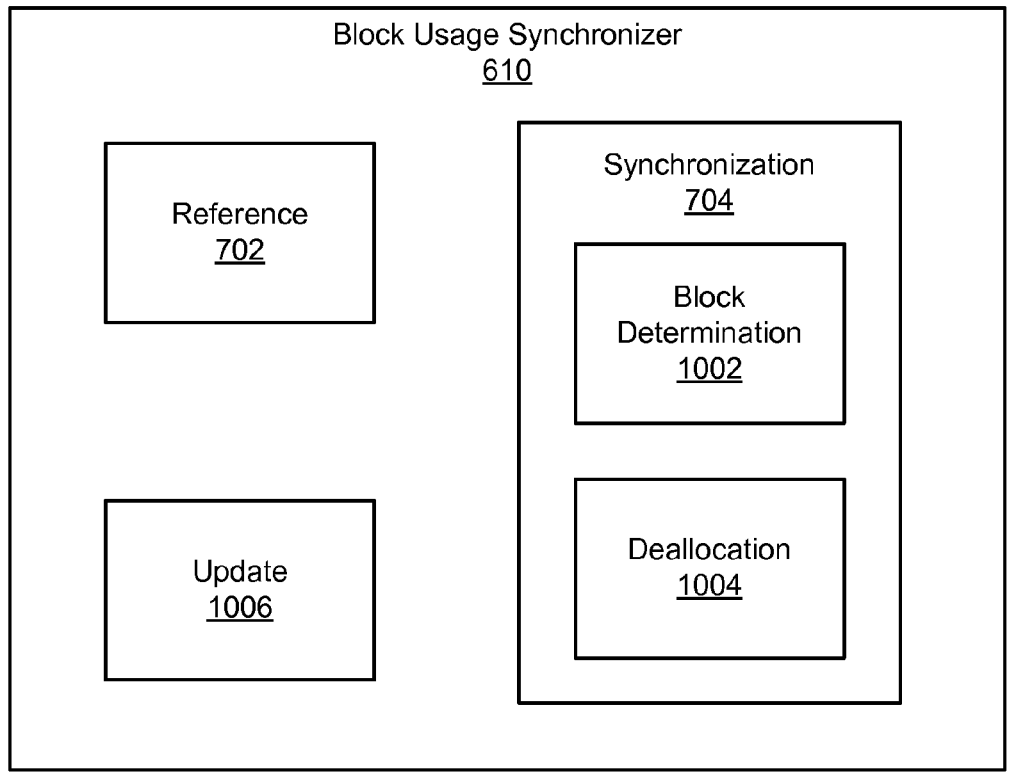
FIG. 10 is a detailed schematic block diagram illustrating another embodiment of an apparatus for data block usage information synchronization for a non-volatile storage volume in accordance with the present invention.
Figure 10:
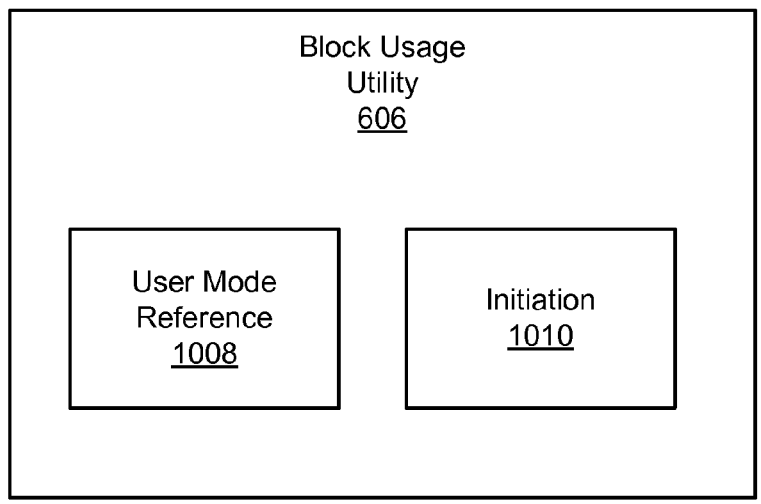

FIG. 10 is a detailed schematic block diagram illustrating another embodiment of an apparatus for data block usage information synchronization for a non-volatile storage volume in accordance with the present invention. The apparatus includes the reference module 902 and the synchronization module 904, wherein these modules include substantially the same features as those described above in relation to FIG. 9. Additionally, the synchronization module 904 includes a block determination module 1002 and a deallocation module 1004, and the apparatus includes an update module 1006 and a block usage utility 606 with a user mode reference module 1008 and an initiation module 1010. The description of the apparatus also refers to elements of FIGS. 6 and 9, like numbers referring to like elements.

The block determination module 1002 determines one or more unused blocks from the data block usage information. In one embodiment, the block determination module 1002 determines unused blocks by referencing bits in the bit map 604. The block map 604 may be a bit map with each bit representing an allocable block and the binary value for the bit representing whether the allocable block is an allocated block or an unallocated block. If the block map 604 shows allocated blocks, the determination module 1002 may determine unallocated blocks from the allocated block information.

The deallocation module 1004, directly or indirectly, deallocates physical blocks in the storage controller 616 that correspond to unused logical blocks identified from the data block usage information from the storage manager 608. By deallocating the corresponding physical blocks, the deallocation module 1004 synchronize data block usage information managed by the storage controller 616 with the data block usage information maintained by the storage manager 608.

In one embodiment, the deallocation module 1004 sends a message directly to the storage controller 616 directly managing the non-volatile storage volume. The message indicates to the storage controller 616 unused blocks identified by the storage manager 608. The storage controller 616 deallocates the unused blocks identified by the storage manager 608 in response to the message.

For example, the deallocation module 1004 may send a message indicating unused logical blocks to the storage controller 616. The storage controller 616 may then deallocate the physical blocks that are mapped to the logical blocks within the mapping used by the logical-to-physical translation layer 512 in response to the message. Those of skill in the art recognize a variety of different techniques for deallocating the logical blocks in a logical-to-physical index (See FIG. 2). In one embodiment, the storage controller 616 deallocates a logical block by removing an entry for the logical block from the logical-to-physical index, map, or similar data structure. In certain embodiments, the storage controller 616 sends a reply or confirmation to the deallocation module 804 indicating that the blocks have been successfully deallocated.

In one embodiment, the deallocation module 1004 deallocates unused blocks in data block usage information maintained by the storage controller 616 corresponding to the unused blocks in the data block usage information from the storage manager 608. If the storage controller 616 already shows the block as unallocated or unused, marking the block as unallocated or unused again causes no ill effects. In certain embodiments, simply updating the data block usage information maintained by the storage controller 616 may be more efficient than checking first to determine if the data block usage information differs.

In another embodiment, the deallocation module 1004 first determines whether the storage controller 616 indicates particular blocks as used blocks in contrast to the storage manager 608 showing the blocks as unused. Specifically, in certain embodiments, the deallocation module 1004 deallocates blocks that the storage controller 616 had maintained as used blocks. In these embodiments, the deallocation module 1004 determines that the storage controller 616 identifies unused blocks indicated by the data block usage information as used blocks and deallocates the used blocks identified by the storage controller 616 corresponding to the one or more unused blocks.

As stated above, in certain embodiments, the logical-to-physical translation layer 512 depicted in FIG. 5 is a tree with nodes that represent logical block addresses and comprise corresponding physical block addresses. In one embodiment, the deallocation module 1004 deallocates unused blocks by removing entries for the unused blocks in the logical-to-physical map. In another embodiment, the deallocation module 1004 causes the storage controller 616 to deallocate the unused blocks by removing entries for the unused blocks in the logical-to-physical map.

The update module 1006 updates data block usage information to account for operations of a live storage volume/partition actively serving storage requests. In one embodiment, the update module 1006 monitors in-flight storage operations that modify the data block usage information. As described above, these in-flight storage operations may be executed by the storage controller 616 subsequent to referencing the data block usage information. These in-flight storage operations may be executed by the storage controller 616 prior to synchronizing the data block usage information.

In one embodiment, these in-flight storage operations include the storage operations executed by the storage controller 616 subsequent to referencing the block map 604 and executed by the storage controller 616 prior to deallocating the unused blocks as indicated by the storage manager 608. These in-flight storage operations may not be included in the data block usage information, having been launched or queued for execution before the data block usage information was accessed. However, these in-flight storage operations may still modify blocks that change the data block usage information because they are executed before the data block usage information is synchronized (the unused blocks as indicated by the storage manager 608 are deallocated or marked as unused). Therefore, the update module 1006 accounts for these in-flight storage operations.

In one embodiment, the update module 1006 monitors storage operations on data blocks represented in the block map 604. Specifically, in one embodiment, the update module 1006 monitors the in-flight storage operations for the particular set of data blocks for the block map 604 referenced by the reference module 702.

The update module 1006 records data block usage information for the storage operations that change unused blocks of the block map 604 to used blocks. In one embodiment, the update module 1006 records the data block usage information of these storage operations in an in-flight block map 612 described above.

The user mode reference module 1008 facilitates access to the data block usage information when the storage API is accessible in user mode. The user mode reference module 1008 resides in the block usage utility 606 and references the storage API in user mode. For example, in certain embodiments, the user mode reference module 1008 calls a storage API function. In one embodiment, the user mode reference module 1008 provides, copies, or otherwise makes available the data block usage information or a pointer to the data block usage information to the user mode reference module 1008 in kernel mode. In another embodiment, the user mode reference module 1008 provides, copies, or otherwise makes available the data block usage information or a pointer to the data block usage information to the synchronization module 904.

The initiation module 1010 initiates the processes of the block usage synchronizer 610. Referring to FIGS. 6 and 10, in certain embodiments, the initiation module 1010 initiates the block usage synchronizer 610 in response to one or more predetermined events. For example, the initiation module 1010 may initiate the block usage synchronizer 610 in response to a performance threshold, an amount of storage space dropping below a threshold level, a certain number of file deletions, following a startup sequence, a dual boot transition phase, and the like.

In certain embodiments, the initiation module 1010 may initiate the block usage synchronizer 610 at a predetermined time interval. For example, the initiation module 1010 may initiate the block usage synchronizer 610 at a predetermined time every day or every hour, after a certain amount of "up" time by the computer system, and the like. The initiation module 1010 may also determine a set of logical blocks for the block usage synchronizer 610 and send an indication of these logical blocks to the reference module 902. The initiation module 1010 may select sets of logical block addresses for analysis during a scan of one or more volumes.

Figure 11:
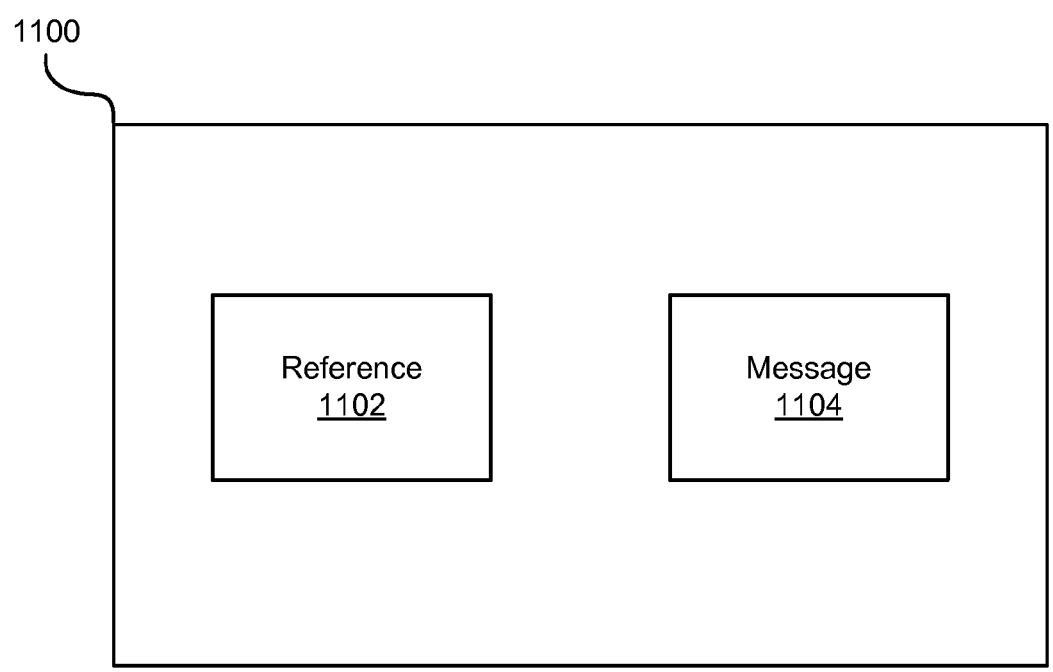
FIG. 11 is a schematic block diagram illustrating an embodiment of an apparatus for data management on non-volatile storage media managed by a storage manager in accordance with the present invention.

FIG. 11 is a schematic block diagram illustrating an embodiment of an apparatus 1100 for data management on non-volatile storage media maintained by a storage manager 608 in accordance with the present invention. The apparatus 1100 depicts one embodiment of the block usage utility 606 in FIG. 6. The apparatus 1100 includes a reference module 1102 and a message module 1104. The description of the apparatus 1100 also refers to elements of FIG. 6, like numbers referring to like elements.

The reference module 1102 facilitates access to data block usage information managed by the storage manager 608. Specifically, the reference module 1102 may reference, retrieve, copy, access, and/or create a pointer to data block usage information of the storage manager 608. The reference module 1102 may be similar to the reference module 902 depicted in FIG. 9. In one embodiment, the reference module 1102 operates in user mode and references data block usage information in user mode. In another embodiment, the reference module 1102 operates in kernel mode and references data block usage information from kernel mode.

In one embodiment, the reference module 1102 references data block usage information for a set of logical block addresses for the non-volatile storage volume. In certain embodiments, the reference module references data block usage information for a subset of logical blocks from a total number of logical blocks for a volume maintained by the storage manager 608. For example, the reference module may reference data block usage information for a set of logical blocks, a group of logical blocks, a range of logical blocks, and the like.

In one embodiment, the reference module 1102 references the data block usage information by way of a storage API of the storage manager 608. In one embodiment, the reference module 1102 references a block map, such as block map 604, defining data block usage information for the logical data blocks selected by the reference module 1102. The reference module 1102 may request a block map 604 for a specific set of logical blocks. One or more events may trigger or activate the reference module 1102. In addition, or alternatively, the reference module 1102 may operate according to a predetermined schedule.

The data block usage information may include the identity of free blocks, freed blocks, or blocks that the storage manager 608 has not allocated. In one embodiment, the reference module 1102 references freed blocks deallocated by the storage manager 608 within a certain period of time or subsequent to a certain event.

In one embodiment, referencing data block usage information includes a plurality of steps. The reference module 1102 may first reference data block usage information showing the identity of allocated logical blocks. The reference module 1102 may next determine the identity of unused, or unallocated data blocks. The reference module 1102 may then determine if the unused blocks are recently freed blocks or logical blocks that have never been allocated.

In one embodiment, the reference module 1102 determines one or more unused blocks from the block map 604. The unused blocks may be logical blocks. In one embodiment, the reference module 1102 determines unused blocks by reading bits in the bit map 604. Each bit may, depending on the embodiment, represent a used block (one that corresponds to valid data), or an unused block.

In one embodiment, the reference module 1102 does not determine unused blocks from the block map 604. In this embodiment, the reference module 902 receives a list of unused blocks from the storage manager 608 which the reference module 902 passes to the message module 1104 directly without the need to determine unused blocks.

The message module 1104 communicates the data block usage information to the storage controller 616. In one embodiment, the message module 1104 sends a message directly to the storage controller 616 managing the non-volatile storage media. The message may include unused block information identifying to the storage controller 616 the unused logical blocks that the storage manager 608 identifies. The message module 1104 may receive a list of unused blocks directly from the reference 1102 module. In one embodiment, the message module 1104 sends a message for each logical block identified that is no longer in use as defined by the storage manager 608. In another embodiment, the message module 1104 sends a message for a set of logical blocks.

In certain embodiments, the message complies with an interface operable to communicate storage information between the storage manager 608 and the storage controller 616. In one embodiment, the message is a Trim message or command. In one embodiment, the message comprises a notification passing the block usage information to the storage controller 616. In one embodiment, the message comprises a notification passing unused block information to the storage controller 616. The unused block information may include the unused blocks identified by the storage manager. In certain embodiments, the notification includes no requirement for action by the storage controller 616 in accordance with the interface. As a result, the storage controller 616 may or may not deallocate the physical blocks identified from the unused block information. In accordance with the interface, the storage controller 616 determines if deallocating the physical blocks is advantageous.

In one embodiment, according to an interface, the message includes a directive passing block usage information and/or unused block information to the storage controller 616. The block usage information and/or unused block information may include the unused blocks identified by the storage manager. In this embodiment, the directive requires the storage controller 616 to erase the non-volatile storage media comprising the unused blocks in accordance with the interface. As a result, the message module 1104 may ensure that the storage controller 616 erases non-volatile storage media corresponding to the unused blocks. In one embodiment, the storage controller 616 passes a response, message, or confirmation that indicates the storage controller 616 has complied with the directive and erased the non-volatile storage media.

In one embodiment, the storage controller 616 may delay or defer performing the erase operation of the non-volatile storage media comprising the unused blocks until later in time or until the storage media for the unused blocks is needed. Instead, the storage controller 616 may update the logical-to-physical map to mark the appropriate logical blocks as unused blocks. In certain embodiments, marking the logical blocks as unused is sufficient to erase the logical blocks without erasing the media because the storage controller 616 is configured to respond to read requests for those logical blocks with an indication that no data exists for example by returning all zeros or null values instead of the data stored on the non-volatile storage media. In certain embodiments the marking that the logical blocks as unused may be lost due to not recording the marking in non-volatile memory prior to a power loss. Consequently, when the storage controller 616 reconstructs an index used by the logical-to-physical translation layer 512 by scanning the solid-state storage media 110 in the order that the data was written, the storage controller 616 may still identify the logical blocks as used. However, the storage manager 608 indicates the logical blocks as unused so no read requests will be made for these logical blocks.

In one embodiment, according to an interface, the message includes a purge instruction passing the block usage information and/or unused block information to the storage controller 616. The block usage information and/or unused block information may include the unused blocks identified by the storage manager. In this embodiment, the purge instruction requires the storage controller 616 to perform an erase operation on the non-volatile storage media comprising the unused blocks and to overwrite the unused blocks one or more times using a predefined pattern in accordance with the interface. In one embodiment, the storage controller 616 uses one or more iterations of writing one or more different data patterns in order to completely alter the binary values in the unused blocks to ensure that the original data is unrecoverable.

As a result, the message module 1104 ensures that the storage controller 616 overwrites data corresponding to the unused blocks. Advantageously, the storage controller 616 may overwrite sensitive data to prevent the chance of unauthorized access. In one embodiment, the purge instruction requires the storage controller 616 to identify and overwrite previous versions of data stored in earlier locations in a log-based storage format, as described above, to ensure a complete overwrite and secure erasure of the data. In one embodiment, the storage controller 616 passes a response, message, or confirmation that indicates the storage controller 616 has complied with the purge instruction and overwritten the non-volatile storage media.

Referring also to FIG. 7, in one embodiment, the storage controller 616 includes a RAID storage controller 702 storing data in a RAID configuration 704. The message module 1104 may send one or more messages communicating the unused blocks identified by the storage manager 608 to a RAID storage controller 702 or to one or more sub-controllers 705. In one embodiment, the message module 1104 determines a RAID configuration 704 of either the RAID storage controller 702 or the RAID storage controller 702 and sub-controllers 705. The message module 1104 may then send messages to communicate the unused blocks based on the determined RAID configuration 704.

As described above, the message module 1104 may send a message to the RAID storage controller 702 if the RAID storage controller 702 is configured to update unused block information for the appropriate storage device 706 in the RAID array. In another embodiment, the message module 1104 may send a message directly to a sub-controller 705 managing a storage device 706 in the RAID array.

In one embodiment, the RAID configuration 704 comprises a RAID 0 configuration that stores data as a stripe across two or more storage devices 706. The message module 1104 may send a message to a sub-controller 705 of a storage device 706 in the RAID array with unused block information specific to that storage device 706. Specifically, the message module 1104 may identify a first portion of the block map 604 that corresponds to data blocks stored on a first storage device 706a managed by a RAID controller 702 or sub-controller 705. The message module 1104 may identify a second portion of the block map 604 corresponding to data blocks stored on a second storage device 706b.

The message module 1104 may send a first message to the RAID controller 702 or sub-controller 705a identifying one or more unused blocks on the first storage device 706a identified by the first portion of the block map 604. The message module 1104 may send a second message to the RAID controller 702 or sub-controller 705b identifying one or more unused blocks on the second storage device 706b identified by the second portion of the block map 604. As a result, the message module 1104 may customize the messages sent to the RAID controller 702 or sub-controller 705 for each storage device 706.

In one embodiment, the RAID configuration 704 comprises a RAID 1 configuration with one or more mirrored storage devices 706. In this embodiment, the message module 1104 may also send a message to the RAID controller 702 or sub-controller 705 managing one or more mirror devices 706. Specifically, the message module 1104 may send a first message to the RAID controller 702 or sub-controller 705 managing a first storage device 706a, the message identifying one or more unused blocks on the first storage device 706a identified by the block map 604. The message module 1104 may send a second message to the RAID controller 702 or sub-controller 705 managing the second storage device 706b (storing mirrored data of the first storage device 706a) identifying one or more unused blocks on the second storage device 706b identified by the block map 604.

However, as described above, in one embodiment, a storage device 706a and a mirrored storage device 706b may share common data block usage information. Consequently, the message for one storage device 706a may have equal applicability to the mirror storage device 706b without the need for additional messages.

In one embodiment, the RAID configuration 704 comprises a RAID 5 configuration that stores data as a stripe across three or more storage devices 706 and includes a distributed parity stride along with two or more data strides. To maintain parity integrity, the message module 1104, in one embodiment, determines, based on the block map 604, that each data stride in the stripe has no used blocks. The message module 1104 may send a message to the RAID storage controller 702 designating data blocks corresponding to the stripe as unused.

Referring now to FIGS. 8 and 11, in one embodiment, the RAID configuration comprises a RAID 10 configuration that mirrors a stride of data between two or more storage devices 810a,b using a RAID 1 configuration and that stores stripes of data across two or more storage device sets 812 using a RAID 0 configuration. The message module 1104 may send messages particular to the stride on each storage device 810a,b and also send messages communicating unused blocks for the mirror storage devices 810c,d.

Specifically, the message module 1104, in one embodiment, identifies a first portion of the block map 604 corresponding to data blocks stored in a first stride managed by the RAID storage controller 802. For example, a sub-controller 808a may maintain data block usage information for data blocks of the first stride on a first storage device 810a. The message module 1104 may identify a second portion of the block map 604 corresponding to data blocks stored in a second stride managed by the RAID storage controller 802. For example, a sub-controller 808c may maintain data block usage information for data blocks of the second stride on a second storage device 810c. The message module 1104 may send a first message to the sub-controller 808a managing the first stride identifying one or more unused blocks in the first stride identified by the first portion of the block map 604. The message module 1104 may also send a second message to the sub-controller 808c managing the second stride identifying one or more unused blocks in the second stride identified by the second portion of the block map 604.

In one embodiment, the message module 1104 also sends messages for the storage devices 810b,d mirroring the first and second storage devices 810a,c. In another embodiment, as stated above, a storage device 810a,b and a mirrored storage device 810b,d may share common data block usage information.

Figure 12:
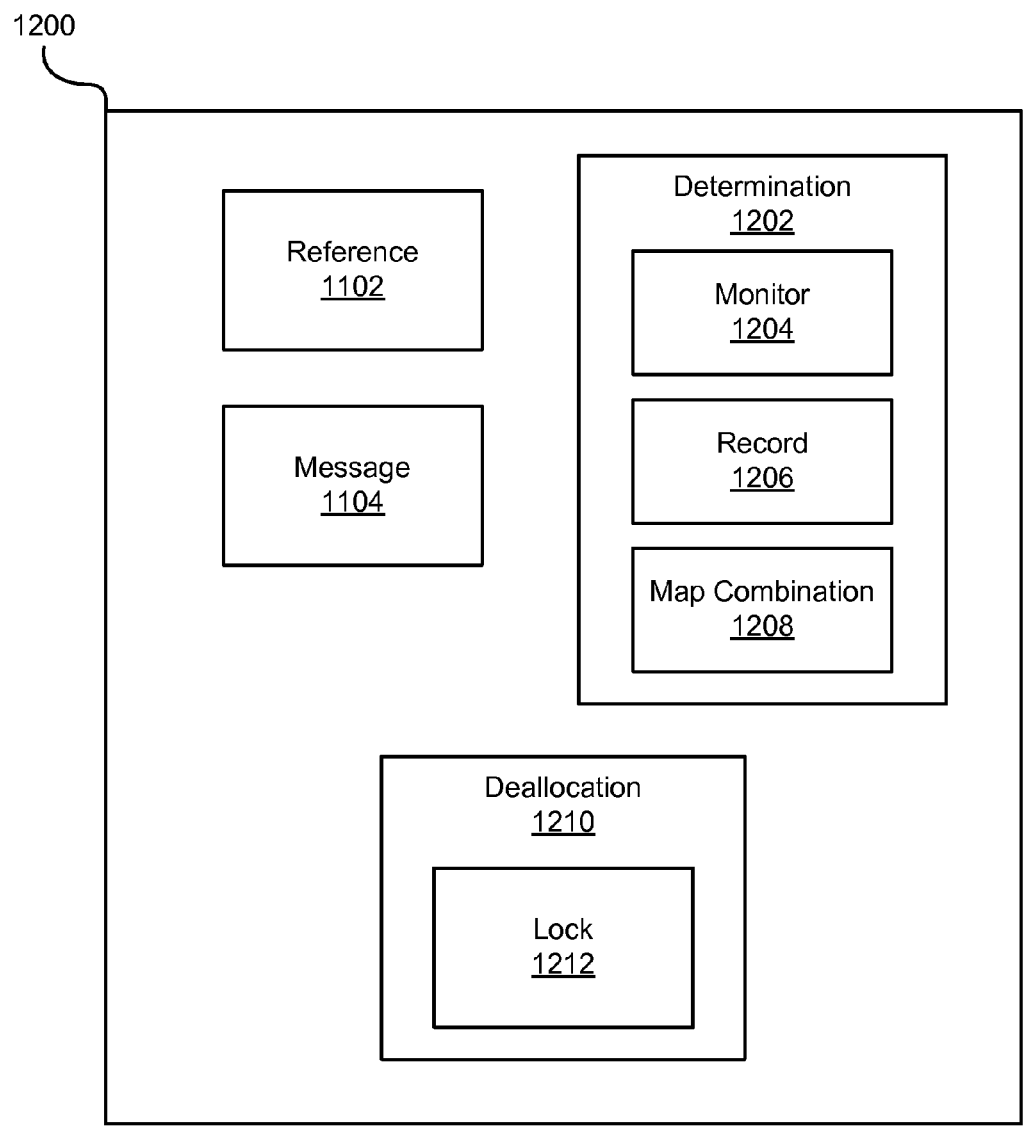
FIG. 12 is a detailed schematic block diagram illustrating another embodiment of an apparatus for data management on non-volatile storage media managed by a storage manager in accordance with the present invention.

FIG. 12 is a detailed schematic block diagram illustrating another embodiment of an apparatus 1200 for data management on non-volatile storage media managed by a storage manager 608 in accordance with the present invention. The apparatus 1200 includes the reference module 1102 and the message module 1104, wherein these modules include substantially the same features as described in relation to FIG. 11. Additionally, the apparatus 1200 includes a determination module 1202 that includes a monitor module 1204, a record module 1206, and a map combination module 1208. The apparatus 1200 includes a deallocation module 1210 that includes a lock module 1212. The description of the apparatus 1200 also refers to elements of FIGS. 6 and 11, like numbers referring to like elements.

The determination module 1202 determines one or more unused blocks from the block map 604. The unused blocks may be logical blocks. In one embodiment, the determination module 1202 determines unused blocks by reading bits in the bit map 604. Each bit may, depending on the embodiment, represent a used block (one that corresponds to valid data), or an unused block.

The monitor module 1204 monitors storage operations on data blocks represented by the block map 604 to account for operation of a live volume actively servicing storage requests. Specifically, in one embodiment, the monitor module 1204 monitors the in-flight storage operations for the particular set of data blocks for the block map 604 referenced by the reference module 1102. These in-flight storage operations include the storage operations executed by the storage controller 616 subsequent to referencing the block map 604 and executed by the storage controller 616 prior to deallocating the unused blocks.

The record module 1206 records data block usage information for the in-flight storage operations that change unused blocks of the block map 604 to used blocks. In one embodiment, the record module 1206 records the data block usage information of these storage operations in an in-flight block map 612 as described above. The record module 1206 may record the logical block addresses of logical blocks affected by the in-flight storage operations monitored by the monitor module 1204. In one embodiment, the in-flight block map 612 is a bit map having the same size and structure as the block map 604. Accordingly, the record module 1206 may record used blocks by setting a corresponding bit in the in-flight block map 612.

The map combination module 1208 updates the block map 604 (See FIG. 6) to reflect changes from in-flight storage operations. In one embodiment, the map combination module 1208 combines the block map 604 and the in-flight block map 612 to identify the unused blocks of the data blocks. In one embodiment, the map combination module 1208 combines the block map and the in-flight block map 612 into a combined block map 614 that identifies the unused blocks of the data blocks being monitored. In one embodiment, the block map 604 is 'OR'ed with the in-flight block map 612 to combine the maps and determine updated data block usage information.

The deallocation module 1210 deallocates unused physical blocks to synchronize the data block usage information managed by the storage controller 616 with the data block usage information maintained by the storage manager 608. In certain embodiments, the deallocation module 1210 deallocates blocks that the storage controller 616 maintains as used blocks, or blocks that hold data that the storage controller 616 is preserving. Specifically, in one embodiment, the deallocation module 1210 deallocates used blocks identified by the storage controller 616 corresponding to unused blocks identified by the storage manager 608 based on data block usage information. In another embodiment, the deallocation module 1210 determines that the storage controller 616 identifies used blocks indicated by the data block usage information as unused blocks and deallocates the used blocks identified by the storage controller 616 corresponding to the one or more unused blocks.

In one embodiment, the deallocation module 1210 deallocates blocks by removing entries for the unused blocks in the logical-to-physical map. In another embodiment, the deallocation module 1210 signals the storage controller 616 to perform the deallocation. In one embodiment, the deallocation module 1210 updates unused block information and/or data block usage information recorded on the non-volatile storage media in place of or in addition to updates to the unused block information and/or data block usage information in the logical-to-physical map. In this embodiment, the deallocation module 1210 may indicate, in log-based storage, that the unused blocks are deallocated and available for storage space recovery. The deallocation module 1210 may update a storage space recovery data structure stored in volatile memory or in non-volatile memory. The storage space recovery data structure may track for the storage controller 506 which physical parts of the storage media are available for storage space recovery. For example, the storage space recovery data structure may record which logical erase blocks ("LEB") or parts of LEBs are available for data recovery. In one embodiment, the deallocation module 1210 updates the storage space recovery data structure in response to, or in conjunction with, deallocating blocks by removing entries for the unused blocks in the logical-to-physical map.

The lock module 1212 maintains data integrity during changes to the logical-to-physical translation layer 512 of the storage controller 616. In one embodiment, the lock module 1212 obtains a lock on the logical-to-physical map data structure managed by the storage controller 616 prior to updating the block map 604 to include in-flight storage operations. The lock module 1212 releases the lock on the logical-to-physical map subsequent to the storage controller 616 deallocating the unused blocks. The lock module 1212 ensures that changes to the logical-to-physical map are synchronized so as to not cause errors or data failures from other processes accessing the logical-to-physical map. In one embodiment, the lock module 1212 obtains the lock before the map combination module 1208 combines the block map 604 and the in-flight block map 612 so that no other in-flight operations modify the logical-to-physical map.

Figure 13A:
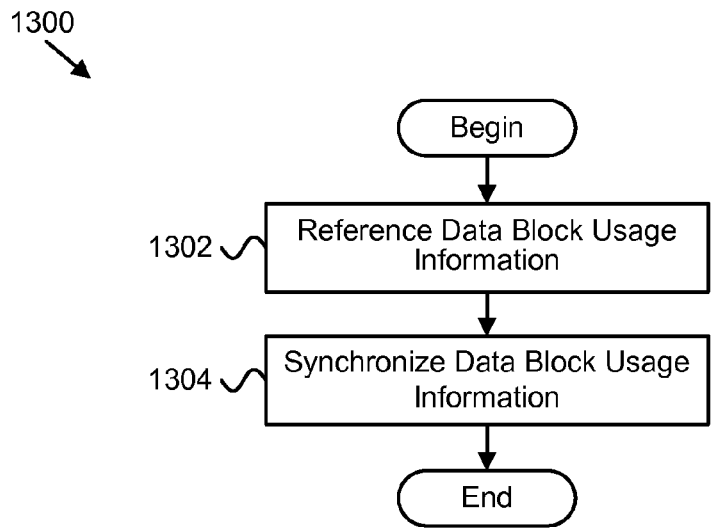
FIG. 13A is a schematic flow chart diagram illustrating one embodiment of a method for data block usage information synchronization for a non-volatile storage volume in accordance with the present invention.

FIG. 13A is a schematic flow chart diagram illustrating one embodiment of a method 1300 for data block usage information synchronization for a non-volatile storage volume in accordance with the present invention. The description of the method 1300 refers to elements of FIGS. 6 and 9, like numbers referring to like elements.

The method 1300 begins and the reference module 902 references 1302 data block usage information for data blocks of a non-volatile storage volume managed by a storage manager 608. The storage manager 608 maintains the data block usage information, which the reference module 902 may reference through a storage API of the storage manager 608. In certain alternative embodiments, reference module 902 determines unused or unallocated data block information from the data block usage information and provides the unused or unallocated data block information to the synchronization module 904.

Next, the synchronization module 904 synchronizes 1304 data block usage information managed by a storage controller 616 with the data block usage information maintained by the storage manager 608. The storage manager 608 maintains the data block usage information separate from data block usage information managed by the storage controller 616. The synchronization module 904 may synchronize the data block usage information based on a RAID configuration 704 if the storage controller 616 is a RAID storage controller 702. Then, the method 1300 ends.

Figure 13B:
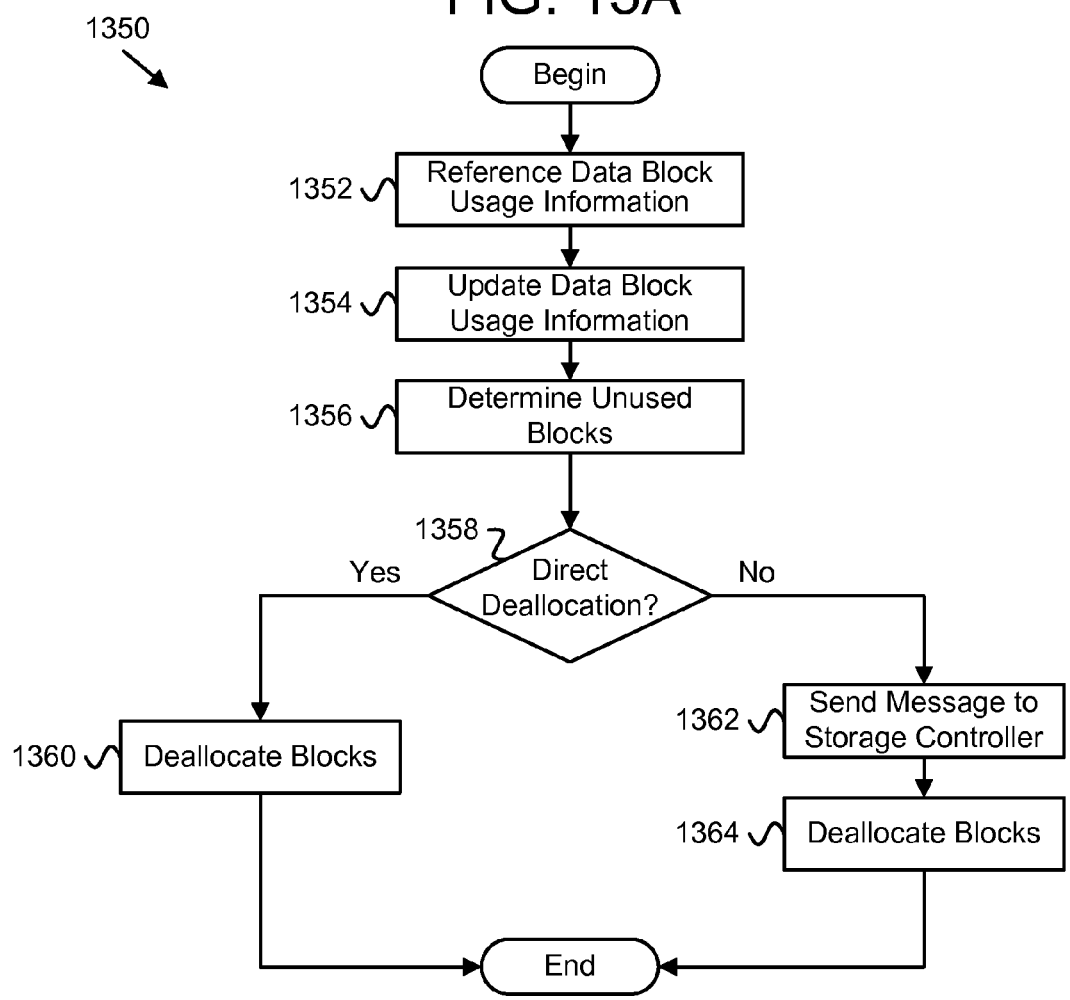
FIG. 13B is a detailed schematic flow chart diagram illustrating another embodiment of a method for data block usage information synchronization for a non-volatile storage volume in accordance with the present invention.

FIG. 13B is a detailed schematic flow chart diagram illustrating another embodiment of a method 1350 for data block usage information synchronization for a non-volatile storage volume in accordance with the present invention. The description of the method 1350 refers to elements of FIGS. 6, 9, and 10, like numbers referring to like elements.

The method 1350 begins and the reference module 902 references 1352 data block usage information for data blocks of a non-volatile storage volume managed by a storage manager 608. Next, the update module 1006 updates 1354 the data block usage information based on storage operations that modify the data block usage information. These "in-flight" storage operations are those operations that are executed by the storage controller 616 subsequent to referencing the data block usage information and executed by the storage controller 616 prior to synchronizing the data block usage information.

The block determination module 1002 then determines 1356 one or more unused blocks from the data block usage information, which includes the data block usage information from the in-flight storage operations. The block determination module 1002, in certain embodiments, may determine the unused blocks as those that are freed blocks versus those that are free blocks. If the deallocation module 1004 is configured to directly perform deallocation 1358 on the blocks, the deallocation module 1004 deallocates 1360 used blocks identified by the storage controller 616 corresponding to unused blocks identified by the data block usage information.

Alternatively, the deallocation module 1004 sends 1362 a message directly to the storage controller 616 directly managing the non-volatile storage volume. The message indicates unused blocks identified by the data block usage information obtained from the storage manager 608 and updated by the update module 1006. The storage controller 616 then deallocates 1364 the identified unused blocks in response to the message and the method 1350 ends.

Figure 14:
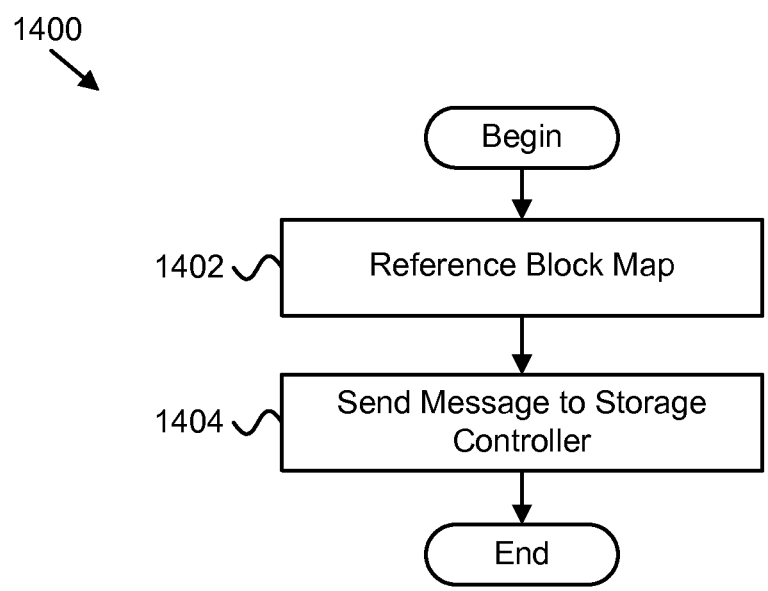
FIG. 14 is a schematic flow chart diagram illustrating an embodiment of a method for data management on non-volatile storage media managed by a storage manager in accordance with the present invention.

FIG. 14 is a schematic flow chart diagram illustrating an embodiment of a method 1400 for data management on non-volatile storage media managed by a storage manager 608 in accordance with the present invention. The description of the method 1400 refers to elements of FIGS. 6 and 11, like numbers referring to like elements.

The method 1400 begins and the reference module 1102 references 1402 a block map defining data block usage information for data blocks of non-volatile storage media managed by a storage manager 608. The block map 604 is maintained by the storage manager 608 and may be referenced through functionality provided by the storage manager 608. Next, the message 1104 module sends 1404 a message directly to a storage controller 616. The message includes unused block information indicating to the storage controller 616 the unused blocks identified by the data block usage information of the block map 604. The message module 1104 may send one or more messages to one or more RAID storage controllers 702 and/or sub-controllers 705 based on a RAID configuration. Then, the method 1400 ends. Depending on the type of message sent, the storage controller 616 may then determine whether to act on the unused block information in the message, comply with the message and act, and/or comply with the message by performing a secure erase of the data on the media for the unused block information.

Figure 15:
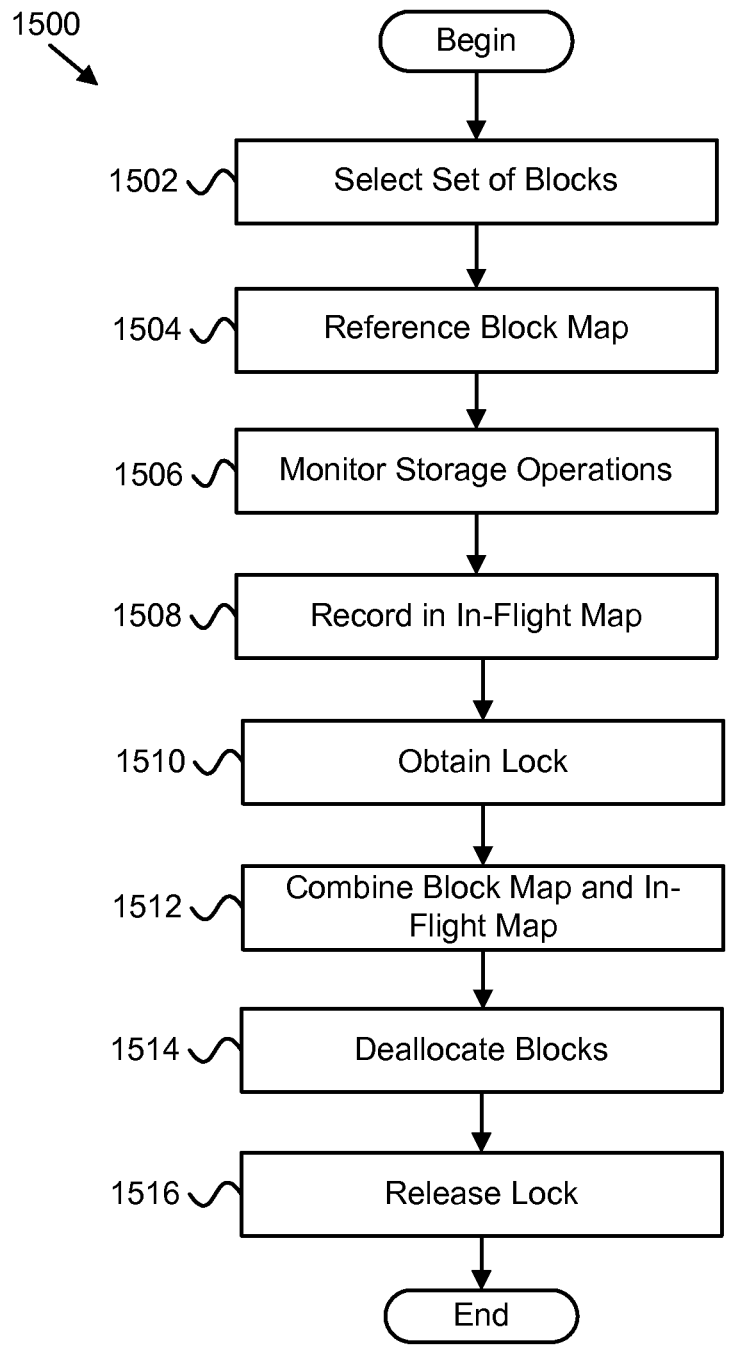
FIG. 15 is a detailed schematic flow chart diagram illustrating another embodiment of a method for data management on non-volatile storage media managed by a storage manager in accordance with the present invention.

FIG. 15 is a detailed schematic flow chart diagram illustrating another embodiment of a method 1500 for data management on non-volatile storage media managed by a storage manager 608 in accordance with the present invention. The description of the method 1500 refers to elements of FIGS. 6, 11 and 12, like numbers referring to like elements.

The method 1500 begins and the reference module 1102 selects 1502 a set of logical blocks for analysis. For example, the reference module 1102 may select a set of logical blocks during a progressive scan of logical block addresses of a volume.

Then, the reference module 1102 references 1504 a block map 604 defining data block usage information for a set of data blocks of non-volatile storage media managed by a storage manager 608. The non-volatile storage media may be solid-state storage media 110 such as flash. The block map 604 is maintained by the storage manager 608 and may be referenced calling a function of a storage API of the storage manager 608.

Next, the monitor module 1204 monitors 1506 storage operations on data blocks represented by the block map 604 to detect in-flight operations, or operations executed by the storage controller 616 subsequent to referencing the block map 604 and executed by the storage controller 616 prior to deallocating blocks for a storage volume. The record module 1206 then records 1508, in an in-flight block map 612, data block usage information for the monitored in-flight storage operations that change unused blocks to used blocks.

Next, the lock module 1212 obtains 1510 a lock on a logical-to-physical map or other address mapping index. In one embodiment, the lock module 1212 obtains the lock on the logical-to-physical map to keep other in-flight storage operations from simultaneously updating the logical-to-physical map and/or the combined block map 614. The map combination module 1208 then combines 1512 the block map 604 and the in-flight block map 612 into a combined block map 614 to update the one or more unused blocks of the data blocks. As a result, the data block usage information provided by the storage manager 608 as a snapshot is updated to account for operations executed before the storage controller 616 or deallocation module 1210 deallocates in accordance with the data block usage information.

The storage controller 616 deallocates 1514 the unused blocks identified by the combined block map 614. The storage controller 616 may deallocate the unused blocks in response to a message sent by the message module 1104 identifying the unused blocks. Alternatively, the deallocation module 1210 may directly deallocate 1514 used blocks on the storage controller 616 that correspond to the unused block information identified by determination module 1202. The lock module 1212 releases 1516 the lock on the logical-to-physical mapping and the method 1500 ends. The method 1500 may be repeated for various sets of logical blocks during, for example, a progressive scan of logical block addresses in one or more volumes.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
referencing logical block usage information of a storage manager in response to one or more of a trigger condition and a pre-determined schedule, wherein the logical block usage information is maintained by the storage manager and is configured to associate objects managed by the storage manager with respective logical block addresses corresponding to a non-volatile storage volume managed by a storage controller, wherein data of the objects are stored on the non-volatile storage volume, and wherein the storage controller is configured to maintain logical-to-physical block usage information that translates logical block addresses to corresponding physical storage locations within the non-volatile storage volume; and synchronizing the logical-to-physical block usage information maintained by the storage controller in response to the referenced logical block usage information maintained by the storage manager, wherein the logical-to-physical block usage information is maintained by the storage controller separate from the logical block usage information maintained by the storage manager, and wherein synchronizing the logical-to-physical block usage information comprises identifying a logical block address that was previously associated with an object managed by the storage manager, such that the identified logical block address translates to a physical storage location in the logical-to-physical block usage information maintained by the storage controller, and issuing a message to the storage controller indicating that the identified logical block address no longer references object data.

2. The method of claim 1, wherein synchronizing the logical-to-physical block usage information further comprises,
   determining that one or more logical block addresses not in use to reference object data based on the referenced logical block usage information; and
   sending a message directly to the storage controller that indicates the one or more determined logical block addresses.

3. The method of claim 1, wherein synchronizing the logical-to-physical block usage information further comprises removing a mapping between a physical storage location and a logical block address.

4. The method of claim 1, wherein synchronizing the logical-to-physical block usage information further comprises removing an entry from an index maintained by the storage controller that associates an unused logical block address with a physical address within the non-volatile storage volume.

5. The method of claim 1, further comprising updating an in-flight index in response to storage operations executed by the storage controller subsequent to referencing the logical block usage information and executed by the storage controller prior to synchronizing the logical-to-physical block usage information in response to the referenced logical block usage information.

6. The method of claim 1, wherein referencing the logical block usage information comprises referencing the logical block usage information by way of a storage Application Programming Interface ("API") of the storage manager.

7. The method of claim 1, wherein the non-volatile storage volume comprises a live volume actively servicing storage requests.

8. The method of claim 1, wherein the storage controller comprises a redundant array of independent drives ("RAID") controller configured to store data in a RAID configuration on two or more storage devices, and wherein synchronizing the logical-to-physical block usage information comprises synchronizing logical-to-physical block usage information of the two or more storage devices in response to the referenced logical block usage information, the two or more storage devices managed by the RAID controller.

9. The method of claim 8, further comprising,
   determining a RAID configuration of the RAID controller; and
   synchronizing logical-to-physical block usage information managed for the two or more storage devices in response to the referenced logical block usage information based on the determined RAID configuration.

10. The method of claim 8, wherein the RAID controller manages one or more sub-controllers, each sub-controller storing data on the two or more storage devices.

11. The method of claim 8, wherein the RAID configuration comprises a RAID 0 configuration that stores data as a stripe across the two or more storage devices, wherein synchronizing the logical-to-physical block usage information comprises,
   identifying a first portion of the referenced logical block usage information corresponding to data blocks stored on a first storage device;
   identifying a second portion of the referenced logical block usage information corresponding to data blocks stored on a second storage device;
   synchronizing logical-to-physical block usage information managed for the first storage device with the first portion of the referenced logical block usage information; and
   synchronizing logical-to-physical block usage information managed for the second storage device with the second portion of the referenced logical block usage information.

12. The method of claim 8, wherein the RAID configuration comprises a RAID 1 configuration that mirrors data stored on a first storage device to a second storage device, wherein synchronizing the logical-to-physical block usage information comprises,
   synchronizing logical-to-physical block usage information managed for the first storage device with the referenced logical block usage information; and
   synchronizing logical-to-physical block usage information managed for the second storage device with the referenced logical block usage information.

13. The method of claim 8, wherein the RAID configuration comprises a RAID 5 configuration that stores data as a stripe across three or more storage devices, the stripe comprising two or more data strides and a distributed parity data stride, each data stride stored on a storage device and each data stride comprising one or more data blocks, wherein synchronizing the logical-to-physical block usage information comprises,
   determining that each data stride in the stripe comprises no object data based on the referenced logical block usage information; and
   synchronizing logical-to-physical block usage information managed by the RAID controller for the stripe by designating data blocks of the second data block usage information corresponding to the stripe as unused.

14. The method of claim 8, wherein the RAID configuration comprises a RAID 10 configuration that mirrors a stride of data between two or more storage devices using a RAID 1 configuration and that stores stripes of data across two or more storage device sets using a RAID 0 configuration, wherein synchronizing logical-to-physical block usage information comprises,
   identifying a first portion of the referenced logical block usage information corresponding to data blocks stored in a first stride managed by the RAID controller;

identifying a second portion of the referenced logical block usage information corresponding to data blocks stored in a second stride managed by the RAID controller;

synchronizing logical-to-physical block usage information managed for the first stride with the first portion of the referenced logical block usage information; and synchronizing logical-to-physical block usage information managed for the second stride with the second portion of the referenced logical block usage information.

15. A computer program product comprising a non-transitory computer readable storage medium having computer usable program code executable to perform operations, comprising:

referencing a block map defining logical block usage information pertaining to logical data blocks corresponding to a non-volatile storage medium in response to one or more of a trigger condition and a pre-determined schedule, the block map maintained by a storage manager to associate file data managed by the storage manager with respective logical data blocks, wherein the non-volatile storage medium is managed by a storage controller, and wherein the storage controller is configured to map logical data blocks to physical blocks on the non-volatile storage medium;

identifying a set of one or more logical data blocks that are not associated with file data managed by the storage manager by use of the referenced block map, wherein one or more of the identified logical data blocks are associated with respective physical blocks on the non-volatile storage medium by the storage controller; and sending a message to the storage controller managing the non-volatile storage medium, the message indicating the identified set of logical data blocks that are not associated with file data managed by the storage manager.

16. The computer program product of claim 15, the operations further comprising invalidating data stored on one or more physical blocks on the non-volatile storage medium that are mapped to logical data blocks indicated in the message.

17. The computer program product of claim 15, the operations further comprising removing an entry corresponding to the set of logical data blocks that are not associated with file data managed by the storage manager from a logical-to-physical map maintained by the storage controller.

18. The computer program product of claim 15, wherein the file data comprises one of: data of a file, a file object, a directory, and file system metadata.

19. The computer program product of claim 18, wherein identifying the set of logical data blocks that are not associated with the file data managed by the storage manager further comprises, monitoring storage operations pertaining to the logical data blocks subsequent to referencing the block map and prior to sending the message to the storage controller; and updating the set of logical data blocks that are not associated with the file data managed by the storage manager in response to the monitored storage operations, such that the message sent to the storage controller indicates the updated set of logical data blocks that are not associated with the file data.

20. The computer program product of claim 19, the operations further comprising recording logical block usage information corresponding to the monitored storage operations in an in-flight block map, wherein updating the set of logical data blocks that are not associated with the file data managed by the storage manager comprises combining the referenced block map and the in-flight block map.

21. The computer program product of claim 15, the operations further comprising:

obtaining a lock on a logical-to-physical map maintained by the storage controller to associate logical data blocks with physical blocks on the non-volatile storage medium prior to identifying the set of logical data blocks that are not associated with file data managed by the storage manager; and releasing the lock on the logical-to-physical map subsequent to the storage controller deallocating one or more mappings between physical blocks on the non-volatile storage medium and logical data blocks that are not associated with file data managed by the storage manager.

22. The computer program product of claim 15, wherein the message complies with an interface that communicates notifications to the storage controller, the notifications identifying logical data blocks that are not associated with file data managed by the storage manager, wherein the notifications comprise no requirement for action by the storage controller in accordance with the interface.

23. The computer program product of claim 15, wherein the message complies with an interface for communicating directives to the storage controller, the directives identifying logical data blocks, wherein the directives require the storage controller to erase physical blocks on the non-volatile storage medium that comprise data associated with logical data blocks specified in the directives in accordance with the interface.

24. The computer program product of claim 15, wherein the message complies with an interface to communicate information pertaining to the logical data blocks to the storage controller, the message comprising a purge instruction that requires the storage controller to erase data associated with the set of logical data blocks indicated in the message from the non-volatile storage medium in accordance with the interface.

25. The computer program product of claim 15, wherein the storage controller comprises a redundant array of independent drives ("RAID") controller storing data in a RAID configuration on two or more storage devices managed by the RAID controller.

26. The computer program product of claim 25, wherein sending the message to the storage controller comprises sending one or more messages communicating the set of logical data blocks that are not associated with the file data managed by the storage manager to one or more sub-controllers.

27. The computer program product of claim 25, wherein the RAID configuration comprises a RAID 0 configuration that stores data as a stripe across the two or more storage devices, the operations further comprising, identifying a first portion of the referenced block map corresponding to logical data blocks associated with physical blocks of a first storage device managed by the RAID controller;

identifying a second portion of the referenced block map corresponding to logical data blocks associated with physical blocks of a second storage device managed by the RAID controller; and wherein sending the message to the storage controller comprises, sending a first message to the RAID controller, the first message identifying one or more logical data blocks that are not associated with file data managed by the storage manager and are identified by the first portion of the referenced block map, and sending a second message to the RAID controller, the second message identifying one or more logical data blocks that are not associated with file data managed by the storage manager and are identified by the second portion of the referenced block map.

28. The computer program product of claim 25, wherein the RAID configuration comprises a RAID 1 configuration that mirrors data stored on a first storage device to a second storage device, wherein sending the message to the storage controller comprises, sending a first message to the RAID controller managing the first storage device, the first message identifying the set of logical data blocks that are not associated with file data managed by the storage manager and are associated with physical blocks of the first storage device; and sending a second message to the RAID controller managing the second storage device, the second message identifying the set of logical data blocks that are not associated with file data managed by the storage manager and are associated with physical blocks of the second storage device.

29. The computer program product of claim 25, wherein the RAID configuration comprises a RAID 5 configuration that stores data as a stripe across three or more storage devices, the stripe comprising two or more data strides and a distributed parity data stride, each data stride stored on a storage device and each data stride comprising one or more data blocks, the operations further comprising, determining that each data stride in the stripe comprises no logical data blocks in use to reference file data managed by the storage manager based on the referenced block map; and wherein sending the message to the storage controller comprises sending the message to the RAID controller, the message designating physical data blocks corresponding to the stripe as unused.

30. The computer program product of claim 25, wherein the RAID configuration comprises a RAID 10 configuration that mirrors a stride of data between two or more storage devices using a RAID 1 configuration and that stores stripes of data across two or more storage device sets using a RAID 0 configuration, the operations further comprising, identifying a first portion of the referenced block map corresponding to logical data blocks associated with physical blocks in a first stride managed by the RAID controller; and identifying a second portion of the referenced block map corresponding to logical data blocks associated with physical blocks in a second stride managed by the RAID controller;

wherein sending the message to the storage controller comprises, sending a first message to the RAID controller managing the first stride, the message identifying one or more logical data blocks that are not associated with file data managed by the storage manager and are associated with physical blocks in the first stride, and sending a second message to the RAID controller managing the second stride, the second message identifying one or more logical data blocks that are not associated with file data managed by the storage manager and are associated with physical blocks in the second stride.

31. A system, comprising:
a processor;
a memory in communication with the processor;
a block-oriented volume comprising a plurality of logical blocks in communication with the memory, wherein the block-oriented volume corresponds to a non-volatile storage device;
a storage controller that stores data corresponding to the logical blocks of the block-oriented volume on the non-volatile storage device, and maintains a logical-to-physical translation layer that associates logical blocks of the block-oriented volume with corresponding physical storage locations of the non-volatile storage device;
a storage manager that maintains a block map defining logical block usage information pertaining to the block-oriented volume, wherein the logical block usage information associates logical blocks of the block-oriented volume with files managed by the storage manager, and wherein the logical-to-physical translation layer maintained by the storage controller associates logical blocks corresponding to the files managed by the storage manager with physical storage locations of the non-volatile storage device storing data of the files; and
a block usage synchronizer that determines logical block usage information pertaining to the block-oriented volume by use of the block map maintained by the storage manager in response to one or more of a trigger condition and a pre-determined schedule, and synchronizes the logical-to-physical translation layer maintained by the storage controller based on the determined logical block usage information by deallocating an association between a physical storage location of the non-volatile storage device and a logical block of the block-oriented volume that the determined logical block usage information indicates is not in use to reference data of a file managed by the storage manager.

32. The system of claim 31, wherein the system further comprises an interface for communicating storage information to the storage controller, and wherein the block usage synchronizer is configured to send a message complying with the interface to the storage controller, the message prompting the storage controller to synchronize logical-to-physical block usage information managed by the storage controller based on the determined logical block usage information.

33. The system of claim 31, wherein the block usage synchronizer is initiated in response to one or more predetermined events.

34. The system of claim 31, wherein the block usage synchronizer is initiated at a predetermined time interval.

35. An apparatus, comprising:
a reference module that references logical block usage information of a storage manager in response to one or more of a trigger condition and a pre-determined schedule, wherein the logical block usage information is maintained by the storage manager and is configured to associate objects managed by the storage manager with respective logical block addresses corresponding to a non-volatile storage volume managed by a storage controller, wherein data of the objects are stored on the non-volatile storage volume, and wherein the storage controller is configured to maintain logical-to-physical block usage information that translates logical block addresses to corresponding physical storage locations within the non-volatile storage volume; and
a block usage synchronizer that synchronizes the logical-to-physical block usage information maintained by the storage controller in response to the referenced logical block usage information maintained by the storage manager, wherein the logical-to-physical block usage information is maintained by the storage controller separate from the logical block usage information maintained by the storage manager, wherein synchronizing the logical-to-physical block usage information comprises identifying a logical block address that was previously associated with an object managed by the storage manager, such that the identified logical block address translates to a physical storage location in the logical-to-physical block usage information maintained by the storage controller, and issuing a message to the storage controller indicating that the identified logical block address no longer references object data.

36. The apparatus of claim 35, wherein the storage manager is configured to deallocate a physical address mapped to the identified logical block address in response to the message.

37. The apparatus of claim 35, wherein the reference module is configured to reference the logical block usage information through a defragmentation interface.

* * * * *